US010436984B2

(12) United States Patent
Clatanoff et al.

(10) Patent No.: US 10,436,984 B2
(45) Date of Patent: Oct. 8, 2019

(54) OPTICAL FIBER SPLICE ELEMENT AND OPTICAL NETWORK

(71) Applicant: 3M INNOVATIVE PROPERTIES COMPANY, St. Paul, MN (US)

(72) Inventors: William J. Clatanoff, Austin, TX (US); Donald K. Larson, Cedar Park, TX (US); Daniel J. Treadwell, Austin, TX (US); William G. Allen, Austin, TX (US); Raman K. Selli, Austin, TX (US); Victor J. Borer, Austin, TX (US); Kathleen M. Humpal, Stillwater, MN (US); Melissa A. Lackey, Woodbury, MN (US); Brant U. Kolb, Afton, MN (US); Paul D. Pennington, Farmington, MN (US); Mark J. Hendrickson, Minneapolis, MN (US); Wendy L. Thompson, Roseville, MN (US); Wayne S. Mahoney, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/695,854

(22) Filed: Sep. 5, 2017

(65) Prior Publication Data
US 2018/0067261 A1    Mar. 8, 2018

Related U.S. Application Data

(60) Provisional application No. 62/544,370, filed on Aug. 11, 2017, provisional application No. 62/478,269, (Continued)

(51) Int. Cl.
*G02B 6/38* (2006.01)
*G02B 6/255* (2006.01)
(Continued)

(52) U.S. Cl.
CPC ............ *G02B 6/2553* (2013.01); *B01J 21/08* (2013.01); *B01J 35/023* (2013.01);
(Continued)

(58) Field of Classification Search
None
See application file for complete search history.

(56) References Cited

U.S. PATENT DOCUMENTS 3,810,802 A    5/1974  Buhite et al.
3,864,018 A    2/1975  Miller
(Continued)

FOREIGN PATENT DOCUMENTS

WO    WO 2013/009984    1/2013
WO    WO 2014-151179    9/2014
(Continued)

OTHER PUBLICATIONS

Klein, L.C., et al.; "Sol-Gel Optical Materials", *Annual Review of Materials Science*, Aug. 1, 1993, vol. 23, No. 1, pp. 437-452.
(Continued)

*Primary Examiner* — Chad H Smith
(74) *Attorney, Agent, or Firm* — Johnathan L. Tolstedt

(57) ABSTRACT

An optical network comprises a fiber distribution cable and a terminal assembly. The terminal assembly receives a plurality of optical fibers from the fiber distribution cable and distributes one or more individual fibers to one or more single fiber bare-fiber holders that hold and protect each single fiber prepared and configured for splicing via an individual splicing element. The splicing element includes an alignment mechanism having a base plate and a clamp plate. At least one of the base plate and clamp plate is formed from a silica material and at least one of the base plate and clamp plate includes an alignment groove or channel configured to receive the first and second optical fibers in an
(Continued)

end-to-end manner. The splice element also comprises an optical adhesive disposed in at least a portion of the alignment groove, wherein the optical adhesive is curable via actinic radiation.

21 Claims, 18 Drawing Sheets

Related U.S. Application Data filed on Mar. 29, 2017, provisional application No. 62/428,215, filed on Nov. 30, 2016, provisional application No. 62/394,547, filed on Sep. 14, 2016, provisional application No. 62/382,944, filed on Sep. 2, 2016.

(51) Int. Cl.

| | | |
|---|---|---|
| *C09J 11/04* | (2006.01) | |
| *C09J 163/00* | (2006.01) | |
| *B01J 21/08* | (2006.01) | |
| *B01J 35/02* | (2006.01) | |
| *B01J 35/10* | (2006.01) | |
| *C04B 26/14* | (2006.01) | |
| *C09J 11/00* | (2006.01) | |
| *C04B 111/80* | (2006.01) | |

(52) U.S. Cl.
CPC ....... *B01J 35/1014* (2013.01); *B01J 35/1019* (2013.01); *B01J 35/1023* (2013.01); *C04B 26/14* (2013.01); *C09J 11/04* (2013.01); *C09J 163/00* (2013.01); *G02B 6/255* (2013.01); *G02B 6/2555* (2013.01); *G02B 6/2556* (2013.01); *G02B 6/2557* (2013.01); *G02B 6/2558* (2013.01); *G02B 6/3885* (2013.01); *C04B 2111/80* (2013.01); *C09J 11/00* (2013.01); *C09J 2205/31* (2013.01); *G02F 2202/28* (2013.01)

(56) References Cited

U.S. PATENT DOCUMENTS

| | | | |
|---|---|---|---|
| 3,919,037 | A | 11/1975 | Miller |
| 4,046,454 | A | 9/1977 | Pugh, III |
| 4,124,364 | A | 11/1978 | Dalgoutte |
| 4,148,559 | A | 4/1979 | Gauthier |
| 4,227,951 | A | 10/1980 | Mignien |
| 4,279,717 | A | 7/1981 | Eckberg et al. |
| 4,580,874 | A | 4/1986 | Winter et al. |
| 4,662,713 | A | 5/1987 | Davies et al. |
| 4,717,233 | A | 1/1988 | Szkaradnik |
| 4,973,126 | A | 11/1990 | Degani et al. |
| 5,042,902 | A | 8/1991 | Huebscher et al. |
| 5,125,917 | A | 6/1992 | Whealin |
| 5,435,816 | A | 7/1995 | Spurgeon et al. |
| 5,672,097 | A | 9/1997 | Hoopman |
| 5,753,346 | A | 5/1998 | Lier et al. |
| 5,946,991 | A | 9/1999 | Hoopman |
| 5,975,987 | A | 11/1999 | Hoopman et al. |
| 6,129,540 | A | 10/2000 | Hoopman et al. |
| 6,151,433 | A | 11/2000 | Dower et al. |
| 6,331,080 | B1 | 12/2001 | Cole et al. |
| 6,579,014 | B2 | 6/2003 | Melton et al. |
| 6,623,181 | B1 | 9/2003 | Daems |
| 6,648,520 | B2 | 11/2003 | McDonald et al. |
| 6,985,666 | B2 * | 1/2006 | Takano ................ G02B 6/3806 385/137 |
| 7,006,739 | B2 | 2/2006 | Elkins, II et al. |
| 7,088,893 | B2 | 8/2006 | Cooke et al. |
| 7,127,143 | B2 | 10/2006 | Elkins, II et al. |
| 7,264,402 | B2 | 9/2007 | Theuerkorn et al. |
| 7,280,733 | B2 | 10/2007 | Larson et al. |
| 7,369,738 | B2 | 5/2008 | Larson et al. |
| 7,775,726 | B2 | 8/2010 | Pepin et al. |
| 7,869,681 | B2 | 1/2011 | Battey et al. |
| 2001/0001623 | A1 | 5/2001 | Inada et al. |
| 2003/0091293 | A1 | 5/2003 | Murata et al. |
| 2003/0091493 | A1 | 5/2003 | Costa et al. |
| 2004/0036188 | A1 | 2/2004 | Arboix et al. |
| 2004/0057691 | A1 | 3/2004 | Doss et al. |
| 2004/0247261 | A1 | 12/2004 | Sato |
| 2008/0159696 | A1 | 7/2008 | Suzuki et al. |
| 2009/0303660 | A1 | 12/2009 | Nair et al. |
| 2009/0317047 | A1 | 12/2009 | Smith et al. |
| 2010/0002324 | A1 | 1/2010 | Rozhin et al. |
| 2010/0303418 | A1 | 12/2010 | Wang |
| 2012/0071586 | A1 | 3/2012 | Thunhorst et al. |
| 2012/0328248 | A1 | 12/2012 | Larson et al. |
| 2012/0328258 | A1 * | 12/2012 | Barron ................ G02B 6/4454 385/135 |
| 2013/0167502 | A1 | 7/2013 | Wilson et al. |
| 2014/0254986 | A1 | 9/2014 | Kmit et al. |
| 2015/0247979 | A1 | 9/2015 | Richmond et al. |
| 2016/0116699 | A1 | 4/2016 | Larson |

FOREIGN PATENT DOCUMENTS

| | | |
|---|---|---|
| WO | WO 2015-026843 | 2/2015 |
| WO | WO 2017-063106 | 4/2017 |
| WO | WO 2017-063107 | 4/2017 |
| WO | WO 2017-064588 | 4/2017 |

OTHER PUBLICATIONS

Poco, J.F., et al.; "A Rapid Supercritical Extraction Process for the Production of silica Aerogels", *MRS Proceedings*, Jan. 1, 1996, vol. 431, pp. 297-302.

MacChesney, J.B., et al., "Optical fibers by a hybrid process using sol-gel silica overcladding tubes", *Journal of Non-Crystalline Solids*, North-Holland Physics Publishing, Amsterdam, NL, Jun. 1, 1998, vol. 226, No. 3, pp. 232-238.

International Search Report for PCT/US2017/050103, dated Dec. 13, 2017, 6 pp.

Bommel, M.J., et al.; "Drying of silica gels with supercritical carbon dioxide", *Journal of Materials Science*, Jan. 1994, vol. 29, No. 4, pp. 943-948.

Francis, Alfred W.; "Ternary Systems of Liquid Carbon Dioxide", *Journal of Physical Chemistry*, Dec. 1954, vol. 58, No. 12, pp. 1099-1114.

McHugh, Mark A., et al; Supercritical Fluid Extraction: Principle and Practice, 2$^{nd}$ Ed.; Butterworth-Heinemann; 10 pp. (1986).

"OptiSheath® MultiPort Terminal", Corning, [On line] [Retrieved from internet on Sep. 20, 2017], URL <http://csmedia.corning.com/opcomm/Resource_Documents/product_family_specifications_rl/optisheath_multiport_terminal_NAFTA_AEN.pdf>, pp. 5.

"Fiber Indexing—Deploy FTTH much faster, while reducing costs", Commscope, [On line] [Retrieved from internet on Sep. 20, 2017], URL <http://www.commscope.com/fiber-indexing/>, pp. 3.

* cited by examiner

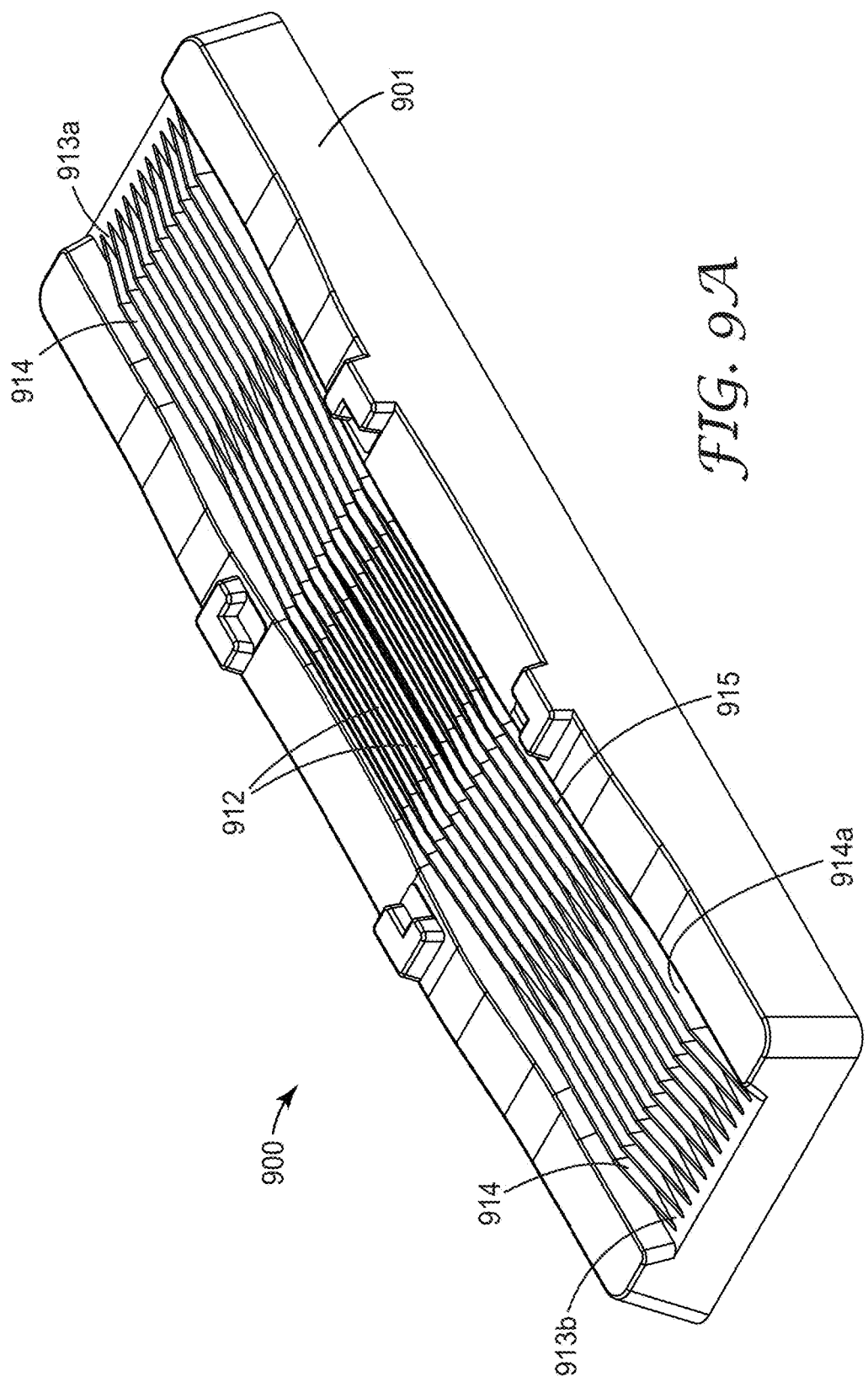

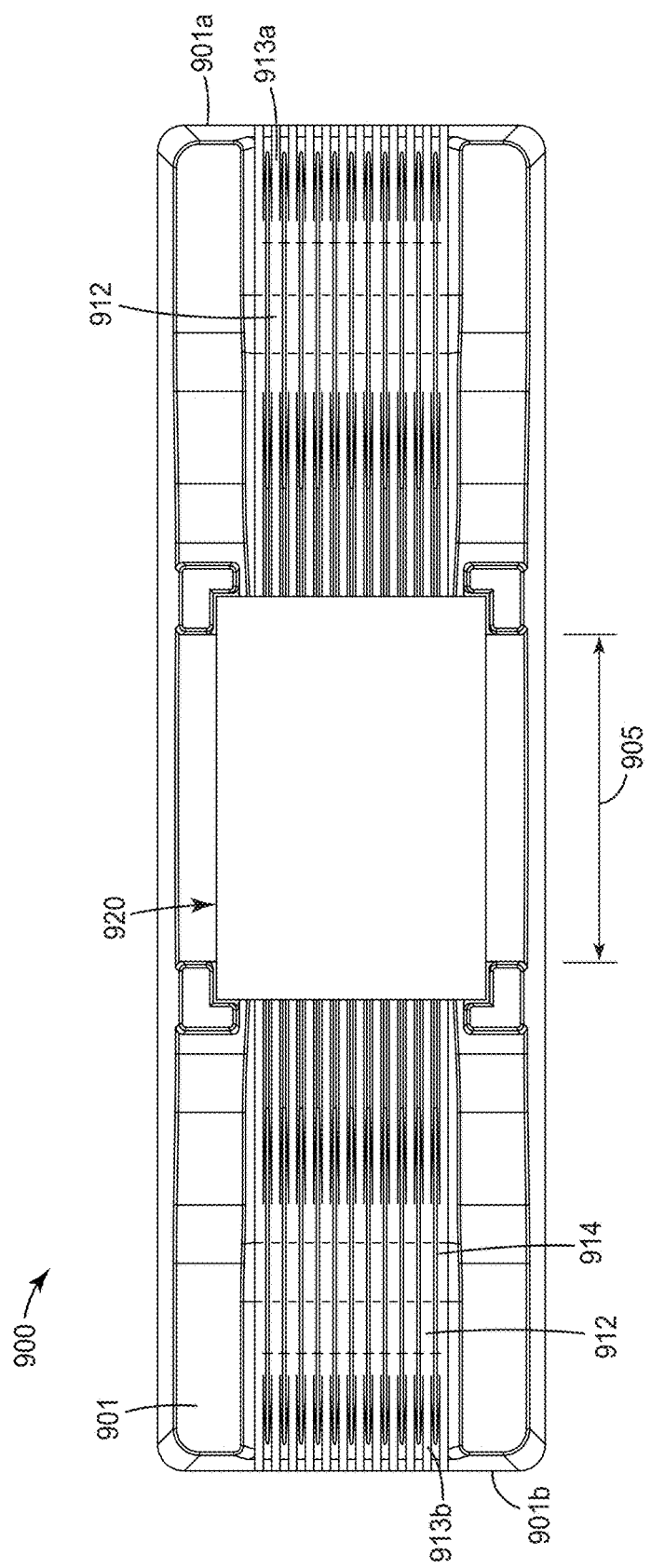

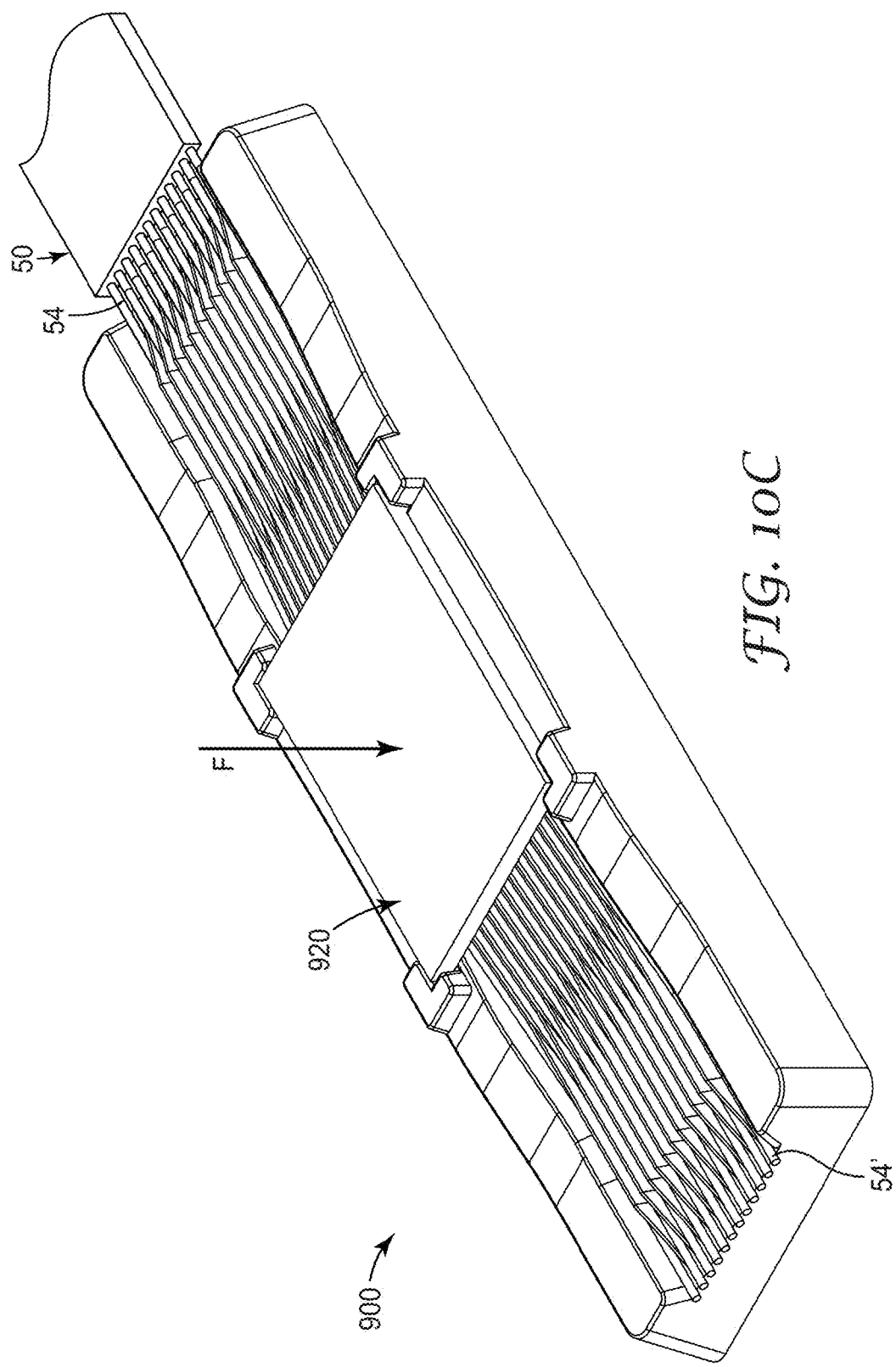

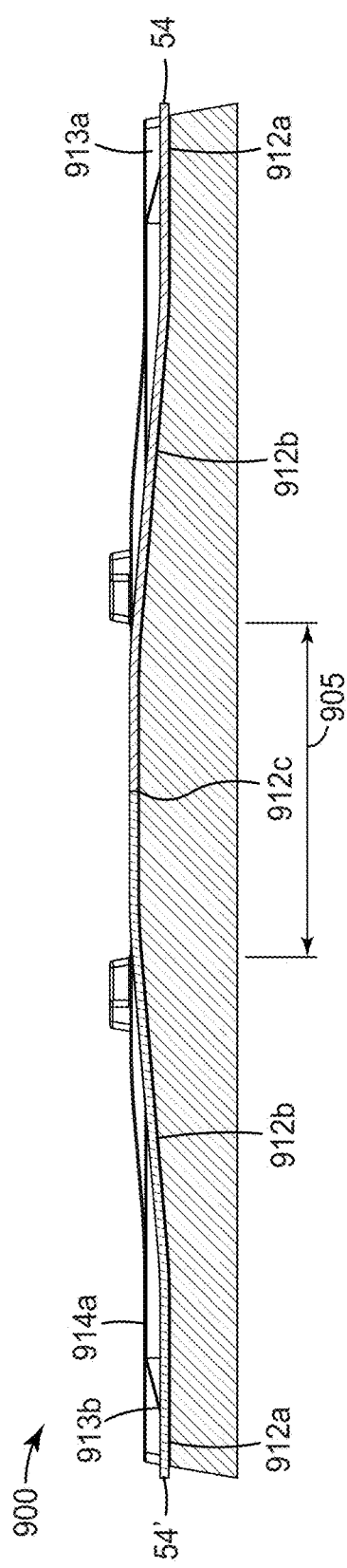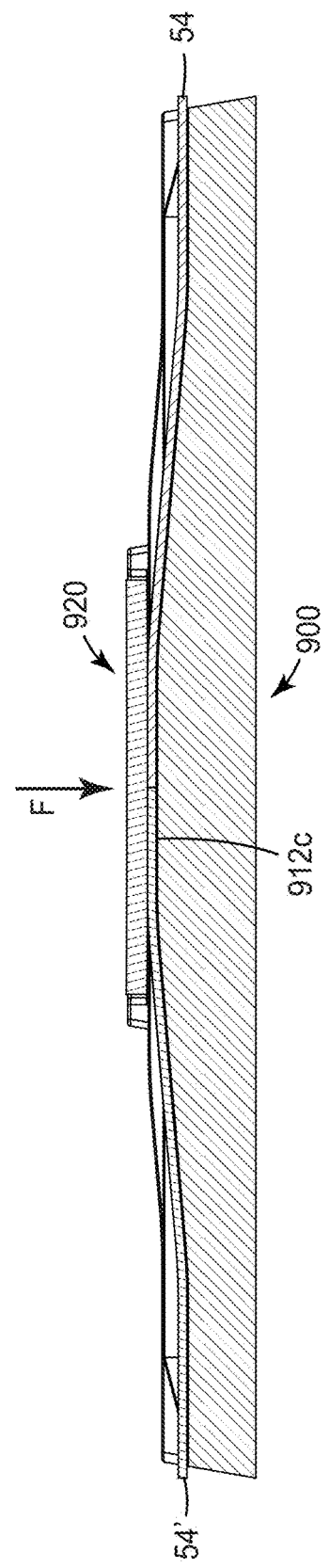

OPTICAL FIBER SPLICE ELEMENT AND OPTICAL NETWORK

BACKGROUND

Field of the Invention

The present invention is directed to a splice element for splicing a first and a second optical fiber.

Related Art

Communications service providers are faced with increasing demands to deliver faster and better service to their customers. Service providers can meet these needs for greater bandwidth by incorporating fiber optics in the access network, the communication connection to the end subscriber. Service providers have announced gigabit service offerings.

Ferrule type connectors offer test access sites, but have the drawback of higher optical loss 0.2 dB-0.3 dB, space, and require cleaning before every mate. If factory terminated, they require slack storage, due to their being purchased in standard units, leaving unsightly and bulky excess fiber coils.

Fusion machines create low loss, permanent, reliable, splices. The machines are expensive, $3000 to $10,000, sensitive instruments which are easily damaged. It is not economically feasible to purchase and train craft so that every FTTH installer has a machine.

Traditional gel type mechanical splices offer the convenience and quick learning curve to enable minimally trained craft to reliably, permanently splice fibers for FTTH networks. They offer insertion loss which is better than connectors, but poorer than fusion. Due to their use of index matching gels, there are a few drawbacks. The gels do not perfectly match the index of refraction of silica at the temperature extremes. This causes reflection from the joint which does not meet some telecommunication standards. In addition, the gel utilized is not a solid material, and therefore has no structural integrity.

Therefore, need exists for a splice element to address these issues.

SUMMARY

According to an embodiment of the present invention, an optical network comprises a fiber distribution cable and a terminal assembly. The terminal assembly receives a plurality of optical fibers from the fiber distribution cable and distributes one or more individual fibers to one or more single fiber bare-fiber holders that hold and protect each single fiber prepared and configured for splicing via an individual splicing element. The splicing element includes an alignment mechanism having a base plate and a clamp plate. At least one of the base plate and clamp plate is formed from a silica material and at least one of the base plate and clamp plate includes an alignment groove or channel configured to receive the first and second optical fibers in an end-to-end manner. The splice element also comprises an optical adhesive disposed in at least a portion of the alignment groove, wherein the optical adhesive is curable via actinic radiation.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 9A-9C are three views of a splice element according to a first embodiment of the invention.

FIGS. 10A-10C are three views of a splicing process utilizing the splice element of FIGS. 9A and 9B.

FIGS. 11A and 11B are two cross sectional views of the splice elements shown in FIGS. 10B and 10C, respectively.

Figure 1A:
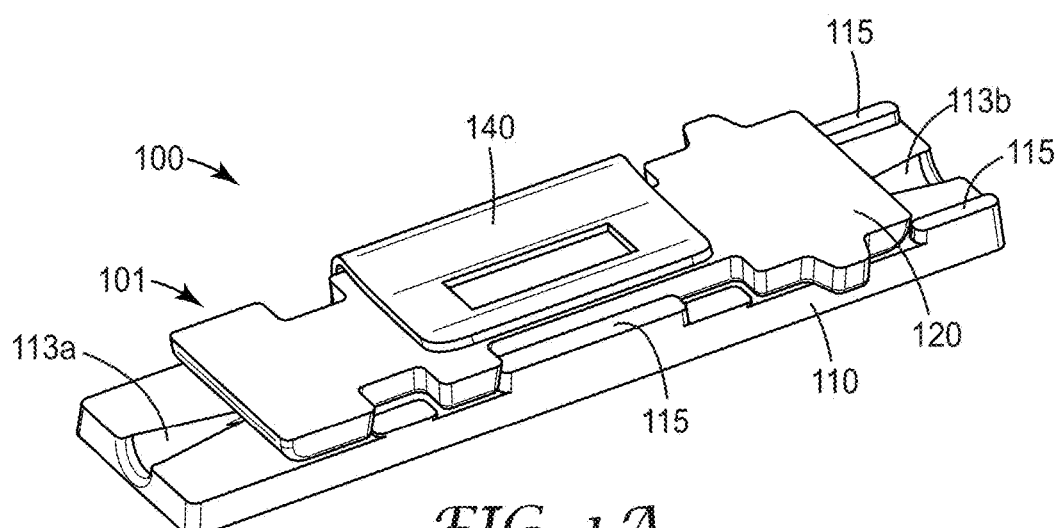
FIGS. 1A-1B are isometric and exploded views of a splice element according to a first embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

An embodiment described herein is directed to an optical fiber splice. The optical fiber splice comprises an alignment mechanism and an optical adhesive. The alignment mechanism can be formed using a sol casting resin to generate net shape silica ceramic parts. The light curable optical adhesive provides for a rapid and straightforward cure of a fiber splice using an eye-safe visible, e.g., blue, LED light source. The combination of these two materials provides for an optical fiber splice with very low optical loss in a standard outside plant environment that allow the splice to achieve near-fusion splice levels of optical loss and reflectivity performance, thus providing a reliable, low loss, permanent termination which may be accomplished by a minimally trained craft person.

Figure 1B:
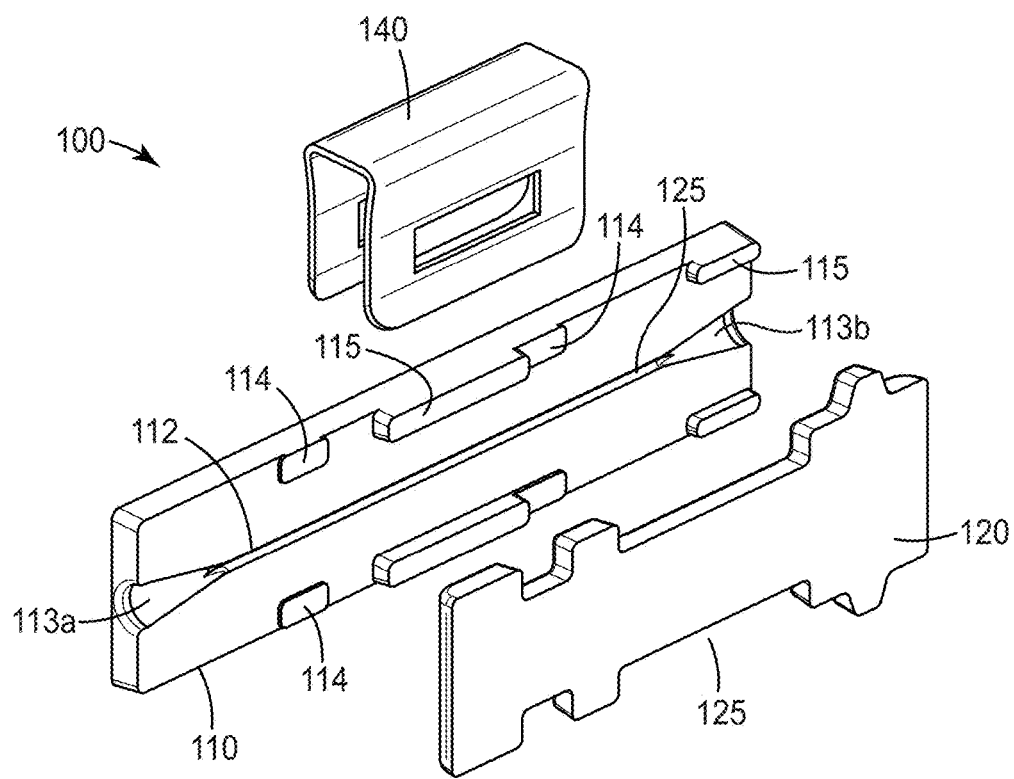

In a first embodiment, FIG. 1A shows a splice element 100. The splice element 100 comprises an alignment mechanism 101 and an optical adhesive (not shown) that is curable via actinic radiation, and that is described in further detail below. In the embodiment of FIGS. 1A and 1B, the optical adhesive comprises a visible light curable adhesive. Moreover, in another preferred aspect, the optical adhesive comprises an adhesive composition containing silica nano-particles dispersed therein, such as non-aggregated, surface-modified silica nano-particles. The optical adhesive is disposed in at least a portion of an alignment groove or channel 112 provided in the alignment mechanism 101.

Please note that while the splice element 100 is referred to as a "splice" device, this term is not meant to be limiting to only an element that completes a fiber splice. In alternative embodiments which are also described herein, the splice device may be used to grip and/or secure one or more fibers separately, not necessarily to splice two fiber ends together.

The alignment mechanism 101 is configured to align two optical fibers (not shown in FIGS. 1A and 1B), which are then bonded, or spliced together using the aforementioned optical adhesive. The fibers can be inserted into the alignment mechanism 101 through entrance openings or apertures 113a and 113b. In the embodiment of FIGS. 1A and 1B, the entrance apertures 113a, 113b can be fully or partially cone or funnel-shaped to provide for more straightforward fiber insertion. As will be described in more detail below, in other embodiments, the alignment mechanism can include multiple alignment grooves or channels for aligning, holding and/or splicing multiple fibers. For example, parallel and separate alignment grooves or channels can be formed in base plate 110 to splice multiple sets of fibers together.

In the embodiment of FIGS. 1A and 1B, the optical fibers are bonded end-to-end in alignment groove or channel 112. In this embodiment, the alignment mechanism 101 includes two plate-like structures, a base plate 110 and a clamp plate 120. The alignment groove can be formed in either base plate 110 or clamp plate 120, or alignment grooves can be formed in both base plate 110 and clamp plate 120. The alignment groove 112 can be formed as a semi-circular cross section shaped groove, or, alternatively, a v-shaped groove. In the embodiment of FIGS. 1A and 1B, alignment groove 112 is formed in base plate 110, while clamp plate 120 can have a flat-shaped major surface. In an alternative aspect, the plates 110, 120 can be formed as planar structures or non-planar structures. In alternative aspects, at least one of the plates can be formed from a flexible material. The plates are brought together to hold one or more fibers in place in the alignment groove prior to curing of the adhesive.

At least one of the base plate 110 and clamp plate 120 is formed from a silica material. The composition and formation of exemplary silica materials, especially net shape cast and cure silica materials, is described in further detail below.

In an alternative embodiment, both the base plate 110 and a clamp plate 120 are formed from a net shape cast and cure silica material. In another embodiment, at least one of the base plate 110 and clamp plate 120 are formed from a transparent net shape cast and cure silica material. In an alternative embodiment, both the base plate 110 and a clamp plate 120 are formed from a transparent net shape cast and cure silica material. Such a transparent net shape cast and cure silica material allows for the use of a visible light source to be directed through the alignment mechanism 101 from the outside of the structure (and either directed along or not along (e.g., transverse to) the alignment groove 112) to cure the optical adhesive disposed therein. By utilizing a net shape cast and cure silica alignment mechanism and an adhesive composition containing silica nano-particles, the temperature performance of the splice element can be stable across a wide temperature range, as the thermal properties of the optical fibers and alignment mechanism are essentially the same.

In further detail, the splice element 100 of FIGS. 1A and 1B can optionally further include a clip 140 which can be used to hold the alignment mechanism together prior to curing of the adhesive. In one aspect, clip 140 comprises a spring clip formed from a suitable material, such as steel. The clip can include a window region to allow adhesive curing light to reach the fiber joint region.

Although not shown in FIGS. 1A-1B, the splice element 100 can be housed in a structure or housing to protect the splice and/or provide eye safety when in use.

Further, the splice element 100 of FIGS. 1A and 1B can include additional structures to facilitate straightforward alignment and installation. For example, as shown in FIGS. 1A and 1B, one or more spacer pads 114 or other structures can be formed on base plate 110 and can be configured to act as spacers to hold the two plates slightly apart, creating a clearance in the alignment groove region for fiber insertion. If splicing a conventional optical fiber, such as standard single mode or multimode optical fiber, such as SMF 28 (available from Corning Inc.), the spacing can be about 25 µm larger than the 125 µm diameter of optical fiber. In addition, plate 110 can further include one or more guide ribs 115 configured to act as slide stop structures that provide registration for capturing the clamp plate 120. In this manner, clamp plate 120 can also include one or more corresponding cut-out or slotted regions 125 that engage with one or more of the guide ribs 115 during the installation/splicing process.

Figure 1C:
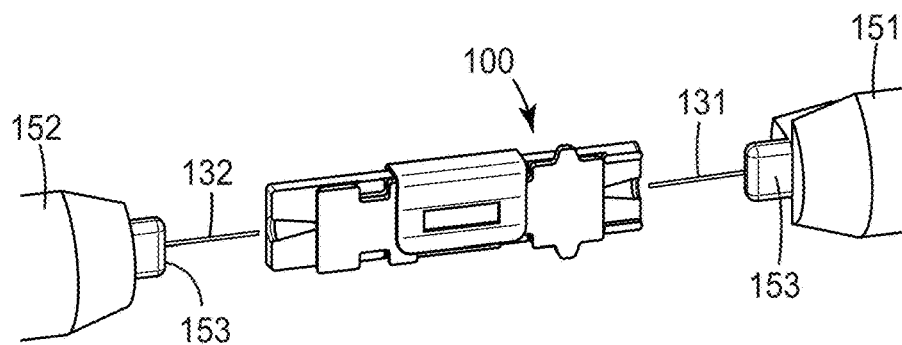
FIGS. 1C-1E are isometric views of a splicing process utilizing the splice element of FIGS. 1A and 1B.
Figure 1D:
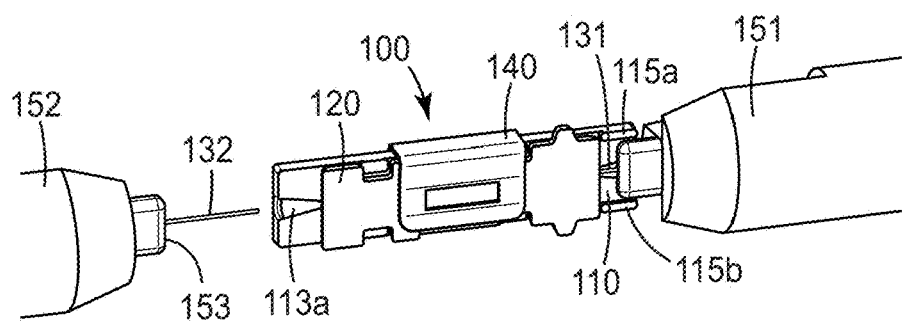
Figure 1E:
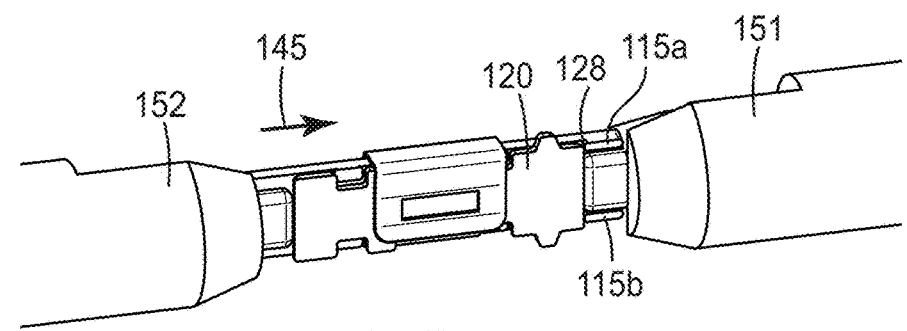

For example, as shown in the sequence of an exemplary splicing process of FIGS. 1C-1E, a first fiber 131 can be spliced to a second fiber 132. The first fiber 131 is held by a first fiber holder 151 (e.g., at a predetermined protrusion distance) and the second fiber 132 is held by a second fiber holder 152. In one exemplary sequence, first fiber holder 151 is inserted in a first end of splice element 100. As fiber 131 is inserted into opening 113b to groove or channel 112, an extension tongue 153 of fiber holder 151 is inserted through guide ribs 115a and 115b to aid with fiber insertion. As mentioned above, the alignment groove 112 can be pre-loaded with an optical adhesive. When the face of fiber holder 151 contacts an end of plate 110, the relative movement of fiber 131 within groove or channel 112 is stopped. The second fiber 132 can then be inserted through opening 113a into groove or channel 112 in the direction of arrow 145. As the extension tongue 153 of fiber holder 152 contacts the clamp plate 120, the clamp plate is slid in the direction of arrow 145 until clamp plate surface 128 contacts extension tongue 153 of fiber holder 151. When the clamp plate 120 is moved a certain distance axially (along fiber axis direction, 145), relative to the base plate 110, the clamp plate 120 drops off the spacer pads 114 and the fiber ends are contacted in the joint region and are concentrically gripped as the base plate and clamp plate are pressed together (e.g., by the pressing force of clip 140). Once actuated, a light source (not shown), such as a conventional blue light source, can be utilized to provide the necessary actinic radiation through the transparent clamp plate 120 (or transparent base plate 110) to cause the adhesive to cure.

In an alternative aspect, the surfaces of silica plates 110 and/or 120 may be coated with an aluminum, copper, or Parylene coating (having a thickness of, e.g., 3 μm and 25 μm). While not required, such conformable materials may be useful to optimize the fiber retention, fiber stress, and concentric alignment. For example, Parylene is transparent, and can be easily applied by evaporation, and is stable in high temperatures. For example, Parylene C is conventionally used to coat printed circuit boards and human implants.

In another embodiment, an exemplary field termination process is provided.

During transportation, the splice element and pre-loaded adhesive can protected from dirt and light exposure using known peel tape tabs on the splice element and/or black blister packaging. Field fibers can be flat cleaved or angle cleaved (depending on the application) and can be cleaved using an instrument such as the 3M™ Easy Cleaver, or another commercial cleaver such as CI-01 provided by Ilsintech.

Field fibers can be inserted into the lead-in cone ends 113a, 113b of the splice element 100. The clamp plate 120 can be displaced axially, such as described above, using the extension tongues 153 on fiber holders 151, 152 to slide the clamp plate 120. A Paradigm light pen (available from 3M Company, Item #76962) can be used to cure the adhesive. The pen is powered via a rechargeable battery and emits blue light in the range of 430 nm to 480 nm. It has light intensity of about 1200 mW/cm² and can provide exposure times of 5, 10, 15, 20 seconds, or continuous mode (120 seconds). An installation tool with a nest (not shown) can be provided to align and hold the light source over the splice window region, during the approximate 20-30 second splice adhesive cure cycle. This type of docking operation can remove craft variability, ensuring intended light exposure to reach the adhesive.

While FIGS. 1A-1E show a splice element 100 that includes an alignment mechanism 101 that actuates via a sliding process, other alignment mechanism/splice element configurations can be utilized (see e.g., the optical connector embodiment of FIGS. 2A-2F or the multi-fiber MT connector of FIGS. 3A-3D, or the butt splice device of FIG. 4), as would be apparent to one of ordinary skill in the art given the present description.

Figure 2A:
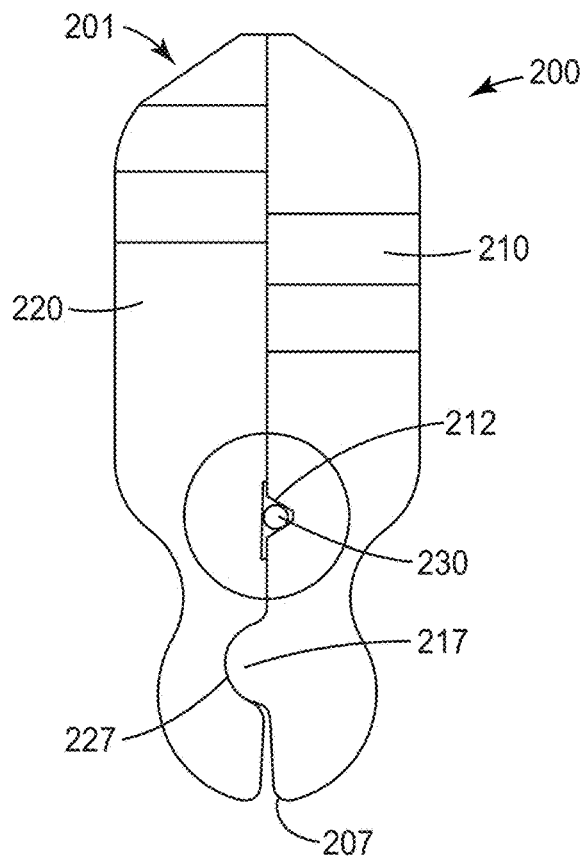
FIGS. 2A-2B are cross section views of a splice device according to another embodiment.
Figure 2B:
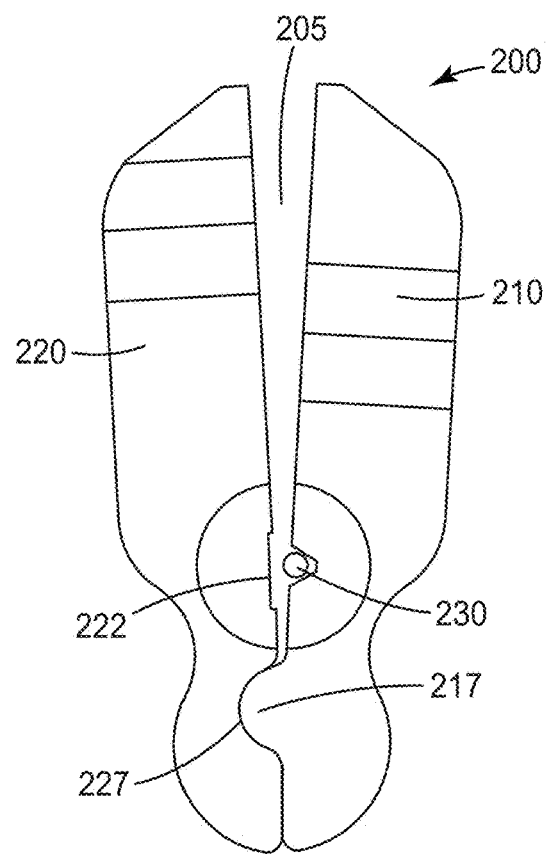
Figure 2C:
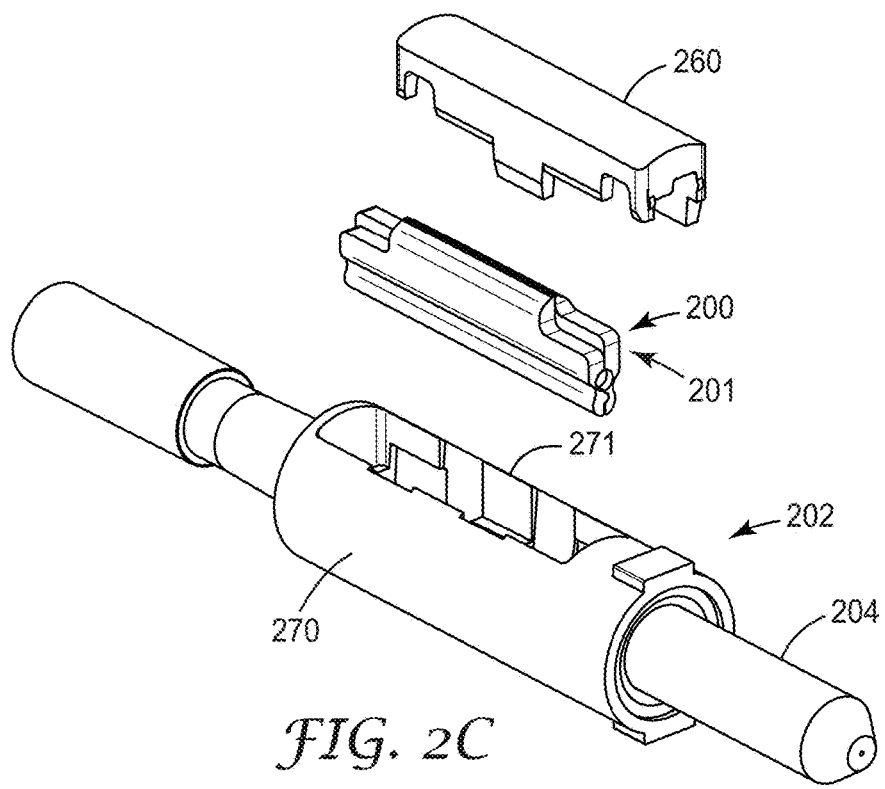
FIGS. 2C-2E are isometric and cross section views of an optical connector according to another embodiment.
Figure 2D:
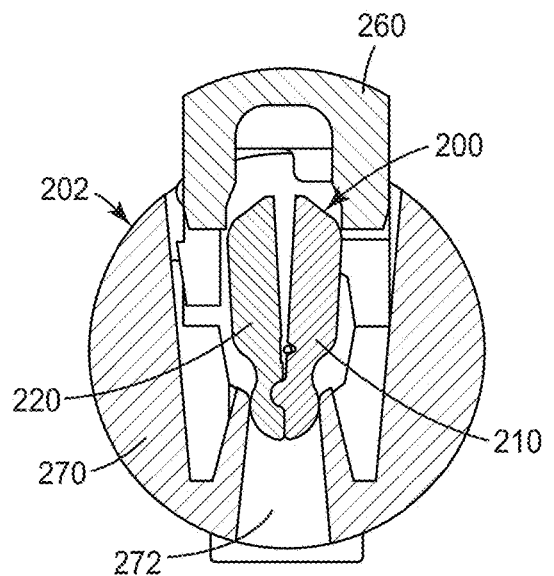
Figure 2E:
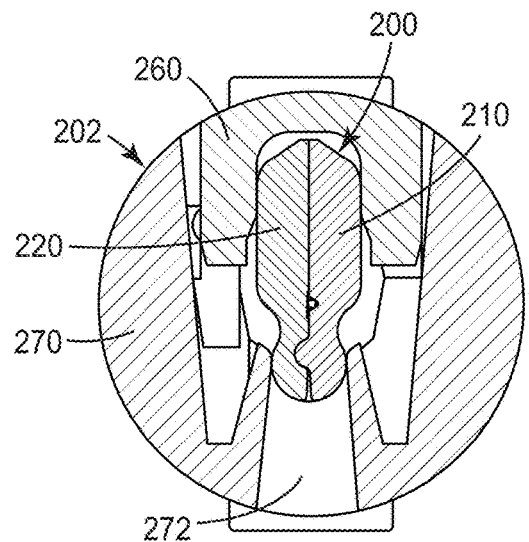

For example, FIGS. 2A-2B show cross section views of an alternatively shaped splice element 200. As shown in FIGS. 2C-2E, splice element 200 can be utilized in an optical connector 202. In this embodiment, splice element 200 comprises an alignment mechanism 201 and an optical adhesive (not shown) that is curable via actinic radiation, and that is described in further detail below. In this embodiment, the optical adhesive comprises a visible light curable adhesive. Moreover, in another preferred aspect, the optical adhesive comprises an adhesive composition containing silica nano-particles dispersed therein, such as non-aggregated, surface-modified silica nano-particles. The optical adhesive is disposed in at least a portion of an alignment groove 212 provided in the alignment mechanism 201.

In a first aspect, the alignment mechanism 201 can be configured to align either two optical fibers (such as a first fiber 230 and a stub fiber (not shown), which are then bonded, or spliced together using the aforementioned optical adhesive, and are utilized in a field mount connector, such as is described in U.S. Pat. Nos. 7,369,738 and 7,280,733. Alternatively, the alignment mechanism 201 can be configured to grip and bond a single optical fiber in a remote grip type optical connector, such as is described in U.S. Pat. No. 7,775,726.

In this embodiment, the alignment mechanism 201 includes two plate-like structures, a base plate 210 and a clamp plate 220. An alignment groove 212 can be formed in either base plate 210 or clamp plate 220, or corresponding alignment grooves can be formed in both base plate 210 and clamp plate 220. The alignment groove 212 can be formed as a semi-circular cross section shaped groove, or, alternatively, a v-shaped groove. In the embodiment of FIGS. 2A and 2B, alignment groove 212 is formed in base plate 210, while clamp plate 220 can have a flat-shaped surface 222 formed in the fiber joint or fiber gripping region. The plates include a pivot structure, such as a protrusion 217 formed in plate 210 and a corresponding recessed portion formed in plate 227 that allow the plates to be placed in an open position (that allows a fiber or fibers to be inserted therein), such as shown in FIG. 2B, or a closed position (that brings the plates together to hold one or more fibers in place in the alignment groove prior to curing of the adhesive), such as shown in FIG. 2A. When placed in the open position of FIG. 2B, an opening or gap 205 is provided between the plates to aid in fiber insertion, and when placed in the closed position of FIG. 2A, a gap 207 is formed near the plate pivot region.

In this embodiment, at least one of the base plate 210 and clamp plate 220 is formed from a silica material. The composition and formation of exemplary silica materials, especially net shape cast and cure silica materials, is described in further detail below. In an alternative embodiment, both the base plate 210 and a clamp plate 220 are formed from a net shape cast and cure silica material. In another embodiment, at least one of the base plate 210 and clamp plate 220 are formed from a transparent net shape cast and cure silica material. In an alternative embodiment, both the base plate 210 and a clamp plate 220 are formed from a transparent net shape cast and cure silica material. Such a transparent net shape cast and cure silica material allows for the use of a visible light source to be directed through the alignment mechanism 201 from the outside of the structure (and either directed along or not along (e.g., transverse to) the alignment groove 212) to cure the optical adhesive disposed therein. By utilizing a net shaped cast and cure silica alignment mechanism and an adhesive composition containing silica nano-particles, the temperature performance of the splice element can be stable across a wide temperature range, as the thermal properties of the optical fibers and alignment mechanism are essentially the same.

In further detail, specifically as shown in FIGS. 2C-2E, the splice element 200 can be utilized in an optical connector 202 that includes a ferrule 204. The connector 202 can have a standard connector format, such as an ST, SC, or LC format. The splice element 200 is configured to be held within a connector body 270 in a splice element housing portion, preferably located in a central cavity 271 of the connector body 270. An actuating cap 260 can be utilized to change the position of the splice element 200 from an open position (see e.g., FIG. 2D) to a closed position (see e.g., FIG. 2E) as the cap 260 is pressed down onto plates 210 and 220.

If the ferrule 204 includes a pre-mounted stub fiber that is to be mated with a field fiber, the stub fiber can be inserted through the ferrule 204, such that the fiber stub end slightly protrudes from or is coincident or coplanar with the end face of ferrule 204. Preferably, this fiber stub end is polished in the factory (e.g., a flat or angle-polish, with or without bevels). A second end of the stub fiber extends part-way into the interior of the connector 202, is guided into alignment groove or channel 212 and is utilized to splice a field optical fiber. The stub and field fibers can comprise standard single mode or multimode optical fiber, such as SMF 28 (available from Corning Inc.).

In operation, as the cap 260 is moved from an open position (FIG. 2D) to a closed position (e.g. downward in the embodiment depicted in FIG. 2E), one or more cam bars located on an interior portion of the cap 260 can slide over splice element plates 210 and 220, urging them toward one another. Two fiber ends are held in place in the alignment groove or channel 212 and butted against each other and are spliced together to provide sufficient optical connection, as the element legs are moved toward one another. A light source (not shown) can be used to cure the pre-loaded optical adhesive to complete the bond.

Alternatively, if the connector is designed as a remote grip type connector, after the field fiber end is prepared, the stripped portion of the fiber can be inserted into the connector 202, particularly within the body 270 until the fiber tip reaches beyond the ferrule end face by a desired amount. The actuating cap 260 can be pressed onto the element 200 to grip the glass fiber. Although not shown, the connector 202 may also include a buffer clamp and the buffer clamp can be actuated to clamp the buffer portion of the fiber. A light source (not shown) can be used to cure the pre-loaded optical adhesive in the alignment groove or channel to secure the position of the fiber within the connector body. Thus, once the adhesive is cured, the fiber may move within the ferrule.

Figure 2F:
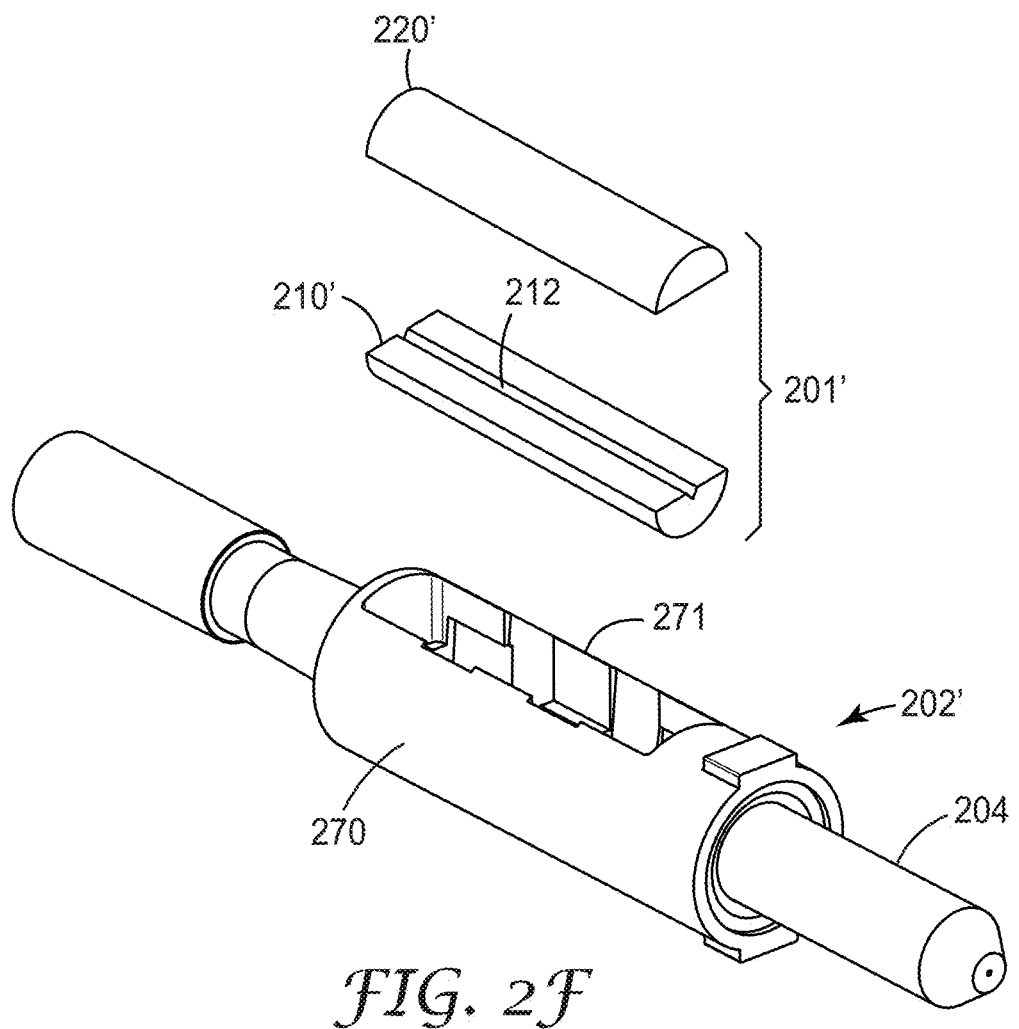
FIG. 2F is an isometric view of an optical connector according to another embodiment.

In another embodiment, the alignment mechanism can be substantially cylindrical in shape. For example, as shown in FIG. 2F, a connector 202' includes a cylindrical alignment mechanism 201' that comprises a base plate 210' and a clamp plate 220' and an optical adhesive (not shown) that is curable via actinic radiation, and that is described in further detail below. When pressed together, the plates 210' and 220' form a cylinder. An alignment groove 212 can be formed in either base plate 210' or clamp plate 220', or corresponding alignment grooves can be formed in both base plate 210' and clamp plate 220'. The alignment groove 212 can be formed as a semi-circular cross section shaped groove, or, alternatively, a v-shaped groove. The alignment groove or channel 212 is configured to receive at least one optical fiber therein.

In this embodiment, at least one of the base plate 210' and clamp plate 220' is formed from a silica material. The composition and formation of exemplary silica materials, especially net shape cast and cure silica materials, is described in further detail below. In an alternative embodiment, both the base plate 210' and a clamp plate 220' are formed from a net shape cast and cure silica material. In another embodiment, at least one of the base plate 210' and clamp plate 220' are formed from a transparent net shape cast and cure silica material. In an alternative embodiment, both the base plate 210' and a clamp plate 220' are formed from a transparent net shape cast and cure silica material. Such a transparent net shape cast and cure silica material allows for the use of a visible light source to be directed through the alignment mechanism 201' from the outside of the structure (and either directed along or not along (e.g., transverse to) the alignment groove 212) to cure the optical adhesive disposed therein. By utilizing a net shaped cast and cure silica alignment mechanism and an adhesive composition containing silica nano-particles, the temperature performance of the splice element can be stable across a wide temperature range, as the thermal properties of the optical fibers and alignment mechanism are essentially the same.

In further detail, optical connector 202' can include a ferrule 204. The connector 202' can have a standard connector format, such as an ST, SC, or LC format. The alignment mechanism 201' is configured to be held within a connector body 270 in a housing portion, preferably located in a central cavity of the connector body 270.

If the ferrule 204 includes a pre-mounted stub fiber that is to be mated with a field fiber, the stub fiber can be inserted through the ferrule 204, such that the fiber stub end slightly protrudes from or is coincident or coplanar with the end face of ferrule 204. A second end of the stub fiber extends part-way into the interior of the connector 202', is guided into alignment groove or channel 212 and is utilized to splice a field optical fiber. The stub and field fibers can comprise standard single mode or multimode optical fiber, such as SMF 28 (available from Corning Inc.). Alternatively, connector 202' can be configured as a remote grip connector that does not include a fiber stub.

In operation, a field fiber can be inserted from the back end of the connector into the alignment groove 212. The clamp plate can be pressed onto the base plate prior to adhesive curing. In one example, two fiber ends are held in place in the alignment groove or channel 212 and butted against each other and are spliced together to provide sufficient optical connection. A light source (not shown) can be used to cure the pre-loaded optical adhesive to complete the bond.

Alternatively, if the connector 202' is designed as a remote grip type connector, after the field fiber end is prepared, the stripped portion of the fiber can be inserted into the connector 202', particularly within the body 270 until the fiber tip reaches beyond the ferrule end face by a desired amount. The clamp plate 220' can be pressed onto the base plate 210' over top of the inserted fiber. Although not shown, the connector 202 may also include a buffer clamp and the buffer clamp can be actuated to clamp the buffer portion of the fiber. A light source (not shown) can be used to cure the pre-loaded optical adhesive in the alignment groove or channel to secure the position of the fiber within the connector body. Thus, once the adhesive is cured, the fiber may move within the ferrule.

In another embodiment, alternative multi-fiber MT type connectors 302 and 302' are shown in FIGS. 3A-3D. Connectors 302 and 302' can have a standard MT format and can include alignment pins 305 for standard connection processes.

Figure 3A:
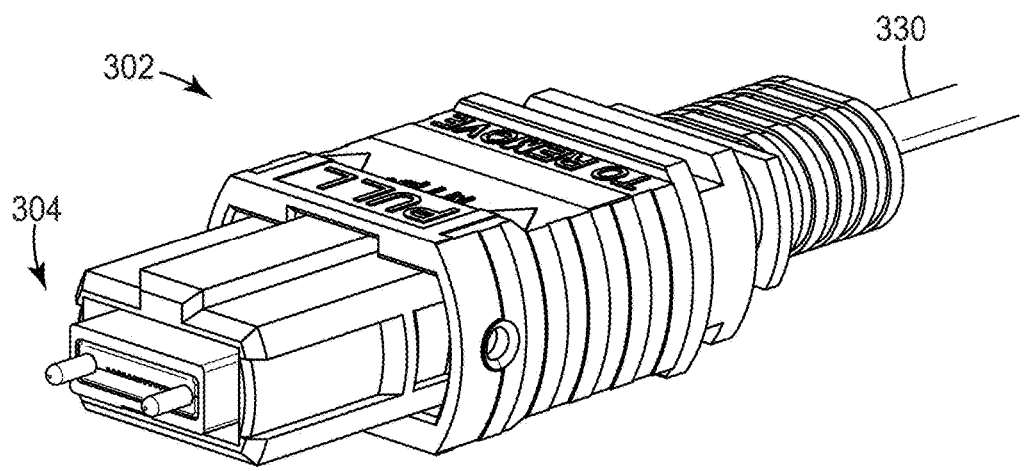
FIGS. 3A-3C are isometric, partial exploded, and end views of a multi-fiber optical connector according to another embodiment.
Figure 3B:
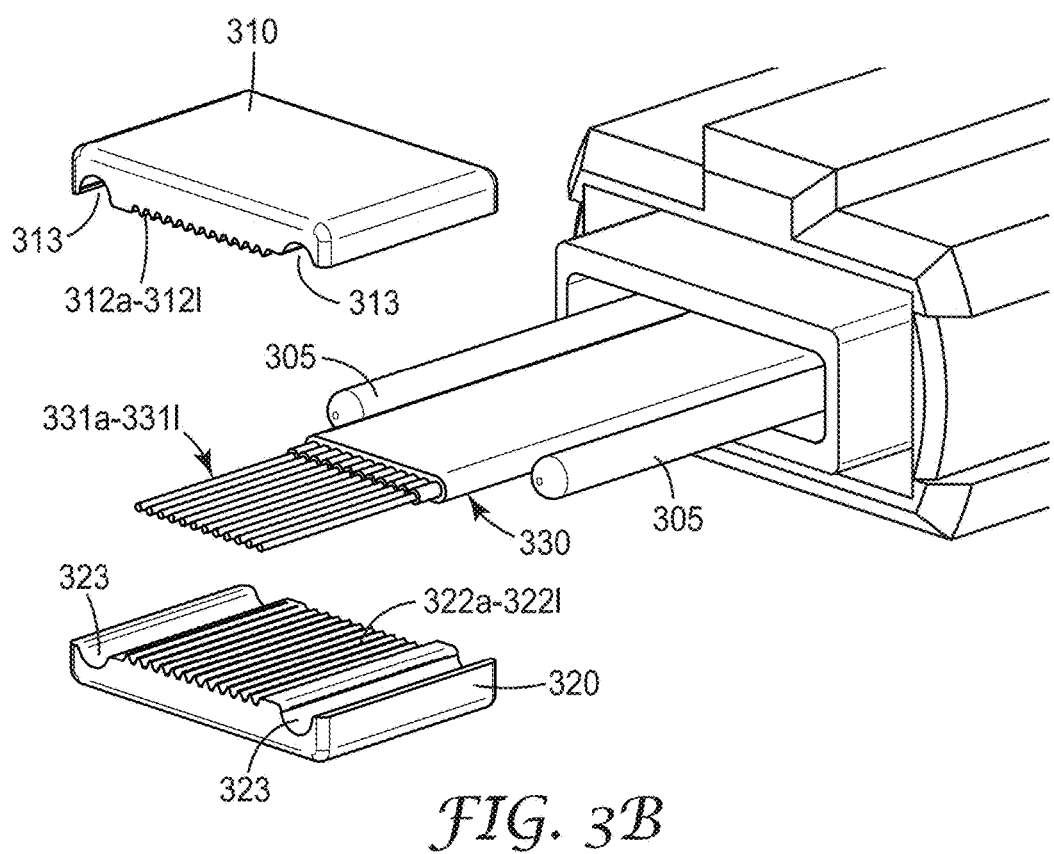
Figure 3C:
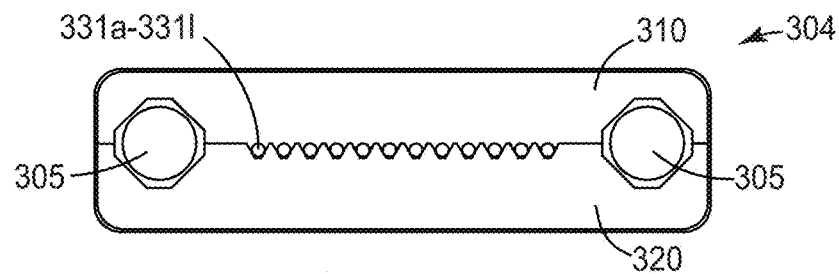

For MT connector 302 shown in FIGS. 3A-3C, the ferrule 304 of the connector includes first and second alignment plates 310, 320 to house and secure a plurality of fibers, such as fibers 331a-331l, which are the ends of the fibers contained in exemplary twelve-fiber ribbon cable 330. Each of the alignment plates 310, 320 includes a series of grooves or channels formed therein (e.g., parallel and spaced channels 312a-312l and channels 322a-322l) which, when mated (see e.g., FIG. 3C), form a diamond shape around each fiber contained in that channel. In this embodiment, an optical adhesive can be pre-loaded or applied to each channel prior to completion of the installation process. Additional side channels 313 and 323 can be provided to receive alignment pins 305.

Figure 3D:
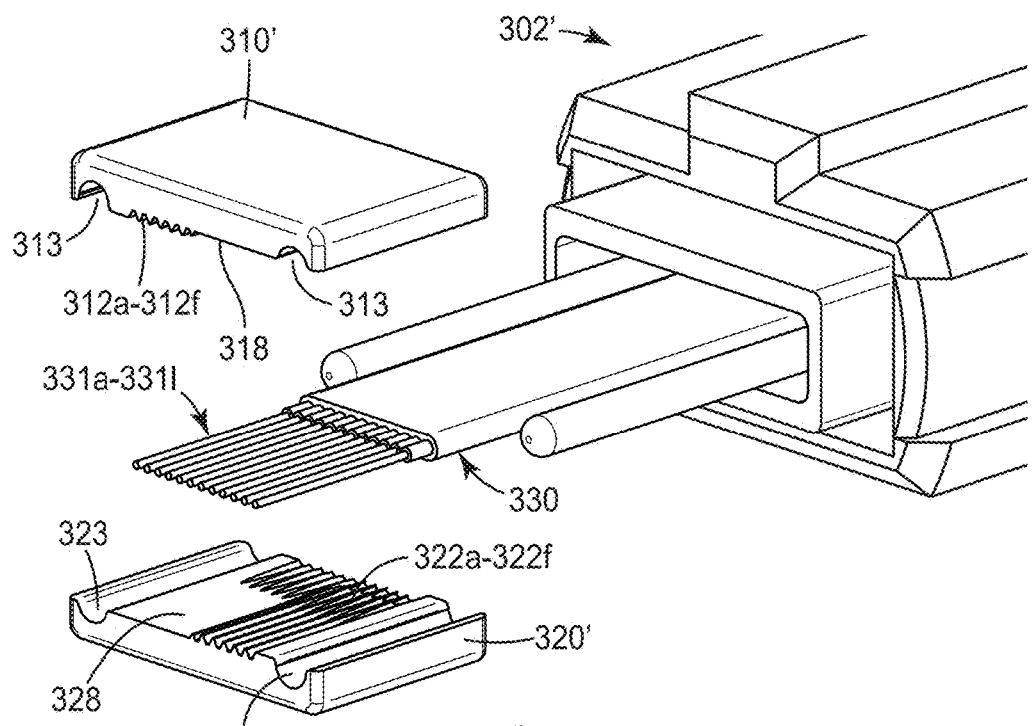
FIG. 3D is a partial exploded view of another multi-fiber optical connector according to another embodiment.

In the alternative design of FIG. 3D, MT connector 302' has a ferrule that includes first and second alignment plates 310', 320' to house and secure a plurality of fibers, such as fibers 331a-331l, which are the ends of the fibers contained in exemplary twelve-fiber ribbon cable 330. In this alternative design, each of the alignment plates 310, 320 includes a series of channels formed therein and a flat portion, staggered so that both halves are identical. For example, plate 310' includes a series of (e.g., channels 312a-312f) and a flat portion 318. Similarly, plate 320' includes a series of channels 322a-322f and a flat portion 328. When the plates are mated together, fibers disposed in channels 312a-312f are pressed against flat portion 328 and fibers disposed in channels 322a-322f are pressed against flat surface 318. In this embodiment, an optical adhesive can be pre-loaded or applied to each channel prior to completion of the installation process. Additional side channels 313 and 323 can be provided to receive alignment pins 305.

In these embodiments, the optical adhesive (not shown) can be curable via actinic radiation, and is described in further detail below. In these embodiments, the optical adhesive comprises a visible light curable adhesive. Moreover, in another preferred aspect, the optical adhesive comprises an adhesive composition containing silica nano-particles dispersed therein, such as non-aggregated, surface-modified silica nano-particles.

In these embodiments, at least one of the plates 310 and 320 (and plates 310' and 320') is formed from a silica material. The composition and formation of exemplary silica materials, especially net shape cast and cure silica materials, is described in further detail below. In an alternative embodiment, both the base plates 310 and 320 (and plates 310' and 320') are formed from a net shape cast and cure silica material. In another embodiment, at least one of plates 310 and 320 (and plates 310' and 320') are formed from a transparent net shape cast and cure silica material. In an alternative embodiment, plates 310 and 320 (and plates 310' and 320') are each formed from a transparent net shape cast and cure silica material. Such a transparent net shape cast and cure silica material allows for the use of a visible light source to be directed through the plates from the outside of the structure (and either directed along or not along (e.g., transverse to) the alignment grooves/channels) to cure the optical adhesive disposed therein. By utilizing a net shaped cast and cure silica alignment mechanism and an adhesive composition containing silica nano-particles, the temperature performance of the ferrule can be stable across a wide temperature range.

Another alternative embodiment utilizes a ruggedized multi-fiber splice to join terminals together, such as the cascaded Index Terminals described in US Publ. No. 2014-0254986, see also US Publ. No. 2009-0317047, both of which are incorporated by reference in their entirety. The terminal indexes or shifts the fiber over one position from input to output. This allows factory mass produced preparation of the terminal and more efficient field installation. By having low loss ceramic materials as described herein, cascaded terminals with multi-fiber splices can fall within a standard power loss budget for FTTH splitter-based PON architectures. An example implementation of a cascaded index terminal is described below with reference to FIG. 8.

In addition, MT connector ferrule embodiments can also be used as a component within a remote grip MT connector, such as described in US Publ. No. 2015-0247979.

In a further alternative embodiment, a connector can be formed with an optically transparent zirconia ferrule, which allows adhesive cure through the ferrule wall. This design utilizes the toughness of zirconia along with the required optical transparency of a sol cast ceramic. Optically transparent sol cast zirconia in the 450 nm region can be provided.

Figure 4:
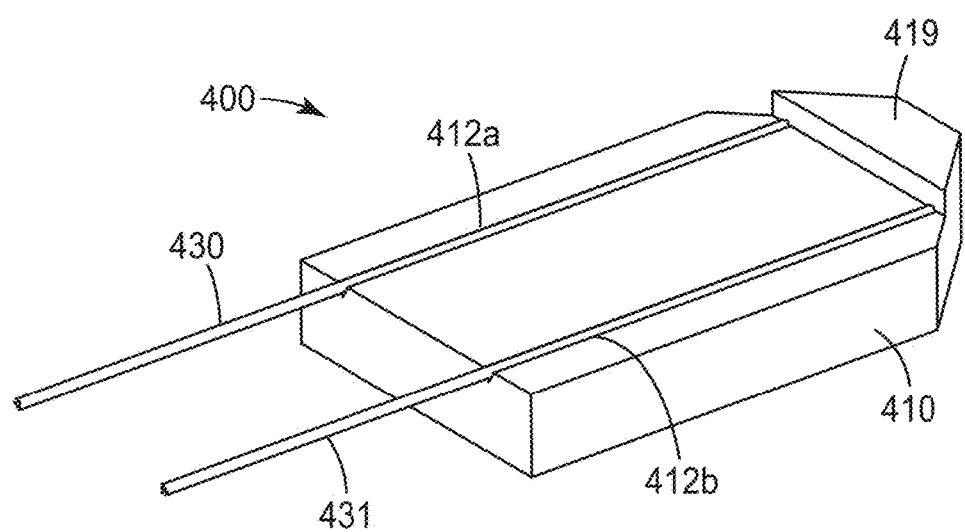
FIG. 4 is an isometric view of a butt splice device according to another embodiment.

In another embodiment, at least a portion of the net shape cast and cure material can be disposed in the light path of an optical device. For example, as shown in FIG. 4, a butt splice device 400 can be provided. Splice 400 can include a base plate 410, formed from the net shaped cast and cure silica described in detail below. In this embodiment, a first fiber 430 is joined or spliced to a second fiber 431 by placing the fibers in alignment grooves 412a and 412b formed in base plate 410, with each groove having an amount of optical adhesive disposed therein. Grooves 412a and 412b are formed substantially parallel to each other. Although not shown, entrance apertures, such as cone-shaped or partial cone-shaped lead-in ports can also be provided in base plate 410. The fibers are cured in place via an actinic source applied to the adhesive. Transmitted light is directed from fiber 430 to fiber 431 (or vice versa) via TIR reflector structure 419, which is also formed as part of base plate 410 during the cast and cure process described below. Although not shown, splice 400 can be placed in an external structure for housing and safety.

Designs such as splice device 400, or other types of loop back splice devices are possible with a precision net shape molded silica ceramic light guide along with the visible cure optical coupling adhesive. This form factor with both fibers side by side allows for side by side fiber splicing in a straightforward manner. Panel type splices are also contemplated with both fibers inserted from the panel face. This structure provides termination speed with preparation (strip, cleave, insert) of both fibers simultaneously. Slack storage is simplified with both fibers handled together for placement in tray storage. In a further embodiment, waveguides for light coupling to optical devices can also be deployed. The net shape cast silica has low absorbance across the full visible and IR spectrum, along with low CTE, which allows for uses for coupling to components and transceivers.

In another embodiment, an optical device can comprise an active device, such as a light source or a detector, and a net shape cast and cure ceramic material, wherein a light path is formed within the net shape cast and cure ceramic material, wherein the net shape cast and cure ceramic material is configured to couple light to or from the active device. For example, the net shape cast and cure ceramic material can comprise a silica or zirconia material. In one example, an integrated ceramic structure can include a focusing or collimating lens or other optical element to couple light from a light source into a fiber received in a fiber alignment channel also formed in the integrated ceramic structure. Alternatively, the ceramic structure can be configured to collect light from an optical fiber received in a fiber alignment groove or channel and direct the light into a detector mounted to the integrated ceramic structure.

The splice elements can be deployed with pre-fabricated distribution cable assemblies (e.g., FlexNap, available from Corning, Inc.) where the access branch point is accommodated. In another aspect, in high fiber count applications, such as a primary flexibility point (PFP), or more common, fiber distribution hub (FDH), where splitters are centrally located, or where other high fiber count connector assemblies are used, such as in data centers, central office. Fiber to the antenna (FTTA) applications, a high fiber count device can be built using the materials described herein. For example, a pre-terminated large fiber count cable assembly can be made using a shaped silica alignment mechanism and light cured optical adhesive. Such a device has an advantage of not having to manage a large bulky cable and many connector ends in the polishing process.

In yet another embodiment, a "plug & play" FTTH access network using splice technology described herein can be used to join network components comprising a distribution cable assembly, one or more terminal assemblies to manage subscriber drops and one or more subscriber drop cable assemblies to connect the end subscribers. Splicing can be accomplished with a bare fiber holder interconnect based on the splicing technology provided herein.

Figure 5:
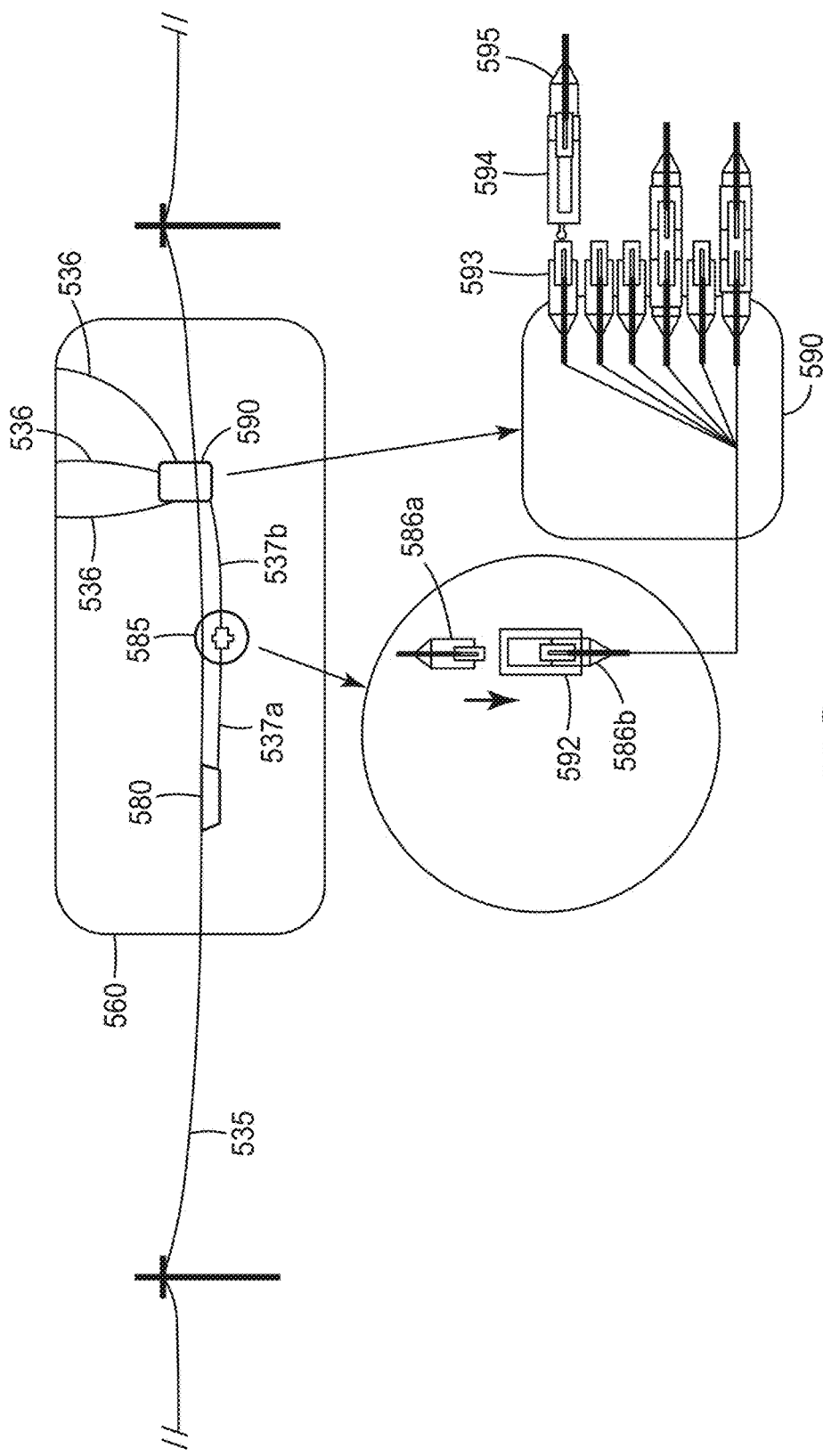
FIG. 5 is a schematic view of an exemplary network according to another embodiment.

For example, FIG. 5 shows such an exemplary neighborhood access point 560 comprising a distribution cable assembly 535, a branch tap point 580, a branch connection 585, and a subscriber terminal assembly 590. In this example, a distribution cable assembly 535 comprises a distribution cable of a plurality of fibers, such as 144 fibers in subgroups of 12 fibers each (144 fiber cable is used for purposes of this description, but the number of fibers could be different). Ruggedized branch tap points 580 can be placed along the distribution cable assembly 535 at a location(s) near where terminal(s) are to be located. In this embodiment, the branch tap point 580 breaks out a 12 fiber subgroup (a branch of 12 fibers is used for purposes of this description but the number of fibers could be different) via a branch connection 585, which connects branch point access cables 537a and 537b of some length to interconnect to the terminal assembly 590 at a later time to, e.g., drop cable assembly 536. In this embodiment, the open end of the 12 fiber access cable has a 12 fiber bare-fiber holder 586a that holds and protects 12 fibers prepped and ready for splicing via a multi-fiber splice device 592 that is connected to a second 12 fiber bare-fiber holder 586b.

The subscriber terminal assembly 590 comprises the 12 fiber access cable 537b with the 12 fiber bare-fiber holder 586b disposed on one end and terminating within the housing of the fiber terminal assembly 590 at the other end. Within the fiber terminal assembly housing, the 12 fiber access cable 537b breaks out to 12 single fiber bare-fiber holders 593 that hold and protect each single fiber prepped and ready for splicing via individual splicing elements 594, such as those described herein (see e.g., splice element 100). At the time of end subscriber hookup, the single fiber splice device 594 facilitates the splicing to an individual subscriber drop cable assembly 536 via a single fiber bare-fiber holder 595.

An advantage the network solution embodiment shown in FIG. 5 is that the network owner "pays as they go" by deferring expensive interconnect hardware until they are ready to sign up paying subscribers. For example, the distribution cable assembly does not contain interconnect hardware (only the 12 fiber bare-fiber holders). Once a paying subscriber is signed up, the network owner can deploy the subscriber terminal that contains only the interconnect hardware to connect to the distribution cable assembly at the branch tap point (and 12 single bare-fiber holders). Only when subscriber is signed up does the drop cable assembly contain the interconnect hardware to connect the drop cable to the subscriber terminal. For a given subscriber terminal, only the ports with paying customers would include the interconnect hardware.

Figure 8:
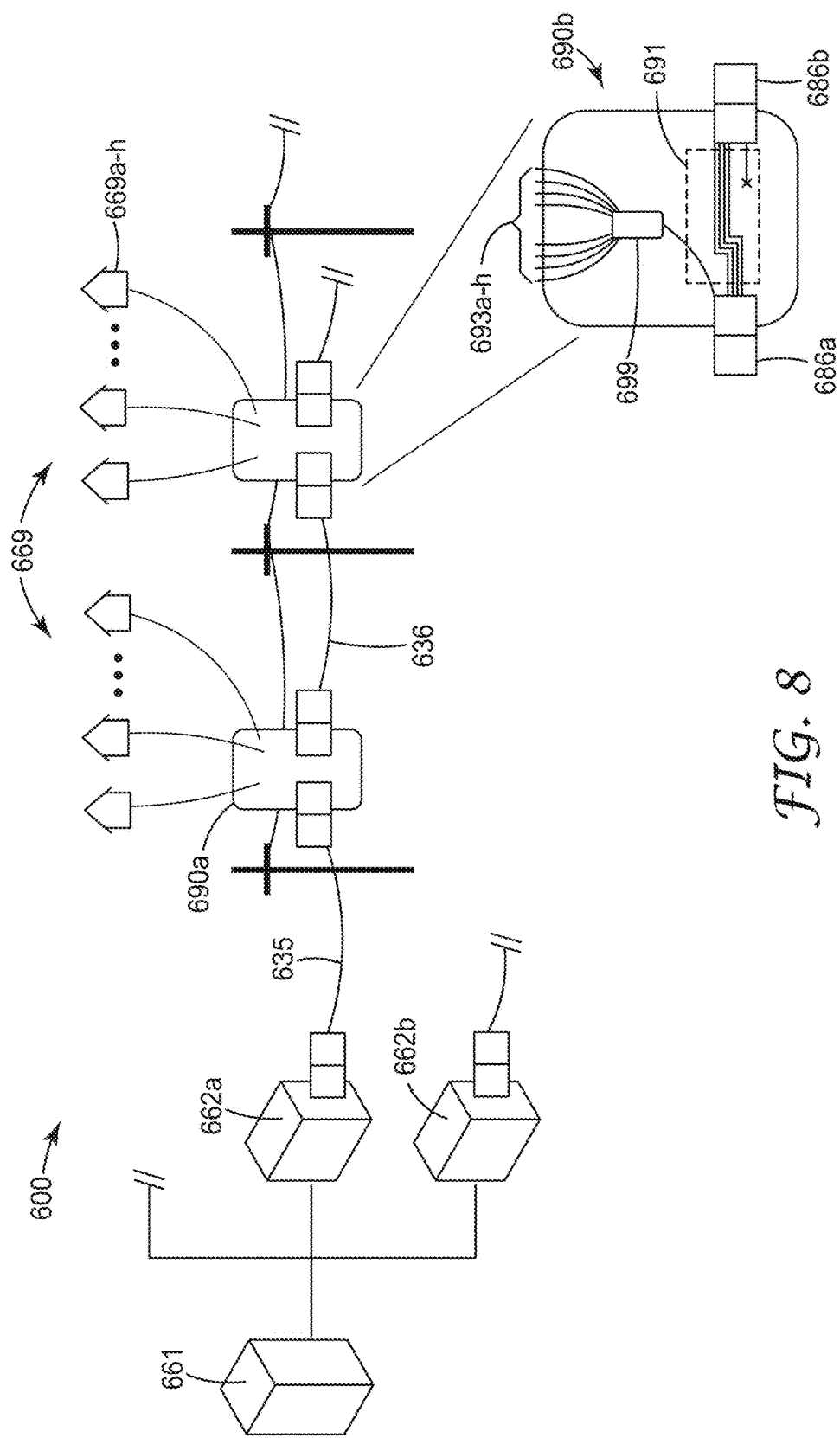
FIG. 8 is a schematic view of a distributed split network according to another embodiment.

In another example implementation, a distributed network 600 using fiber indexing is shown in FIG. 8, where network 600 includes one or more cascaded indexing terminals, such as terminal assemblies 690a and 690b. In this embodiment, data from the central office 661 is fed to one or more neighbor distribution cabinets 662a, 662b (or fiber distribution unit(s) or fiber distribution hub(s)), which in turn provide network access to individual subscribers 669 via a distribution cable 635 of a plurality of fibers (e.g., 12 fibers) and ruggedized subscriber terminal assemblies 690a, 690b. In one aspect, a subscriber terminal assembly 690b receives the distribution cable 636 via a fiber port 686a that can include a first multi-fiber (here, a 12 fiber) bare fiber holder, such as bare fiber holder 586 that is described above. The individual fibers are then indexed via an optical indexing circuit 691 that routes a first fiber to a splitter 699 (such as a 1×8 splitter, or other splitter count), which is split out into 8 single fiber bare fiber ports 693a-h, where the remaining fibers (in this example, 11 fibers) are fed through to an output port 686b that includes a second 12 fiber bare fiber holder (where the 12th fiber position is not used).

Thus, within each fiber terminal assembly 690a, 690b, the multi-fiber access cable 635, 636 breaks out to some number of single fiber bare-fiber holders 693 that hold and protect each single fiber prepped and ready for splicing via individual splicing elements, such as those described herein (see e.g., splice element 100). At the time of end subscriber (e.g., one or more of subscribers 669a-h) hookup, the single fiber splice device facilitates the splicing to an individual subscriber drop cable assembly via a single fiber bare-fiber holder.

In another aspect, a subscriber terminal assembly 690 can receive a multi-fiber (e.g., a 12 fiber) stub cable, which is secured to the terminal housing and spliced into the optical indexing circuit 691 directly, eliminating the need for fiber port 686a.

In another alternative aspect, the input side and output side multi-fiber bare fiber holders can be integrated onto a single substrate, such as a silica substrate having a plurality of fiber guiding/alignment channels formed thereon, to receive and route fibers within the terminal assembly and to provide the index shift. In a further aspect, the optical splitter can also be integrated with the index circuit using a single monolithic substrate.

In another alternative aspect, in order to provide more drops at a single location, multiple terminal assemblies can be provided at a single location (e.g., a first terminal assembly can be directly connected with a second terminal assembly). In this manner, a fiber distribution cable or a stub cable linking the terminal assemblies together can be eliminated.

As with the network solution shown in FIG. 5, an advantage of the network 600 is that the network owner "pays as they go" by deferring expensive interconnect hardware until they are ready to sign up paying subscribers.

In a further alternative aspect, while the fiber network 600 is shown in an outdoor environment, a cascaded index terminal such as terminal 690a, 690b can be configured for use in providing an optical network within a building, such as a multi-dwelling unit (MDU).

Thus, given the description herein, a ruggedized single fiber splice can be created inside a subscriber drop assembly at the terminal. A ruggedized multi-fiber splice can also be utilized at the branch connection point.

In another aspect, an exemplary multifiber splice embodiment is shown in FIGS. 9A-11B.

Figure 9B:
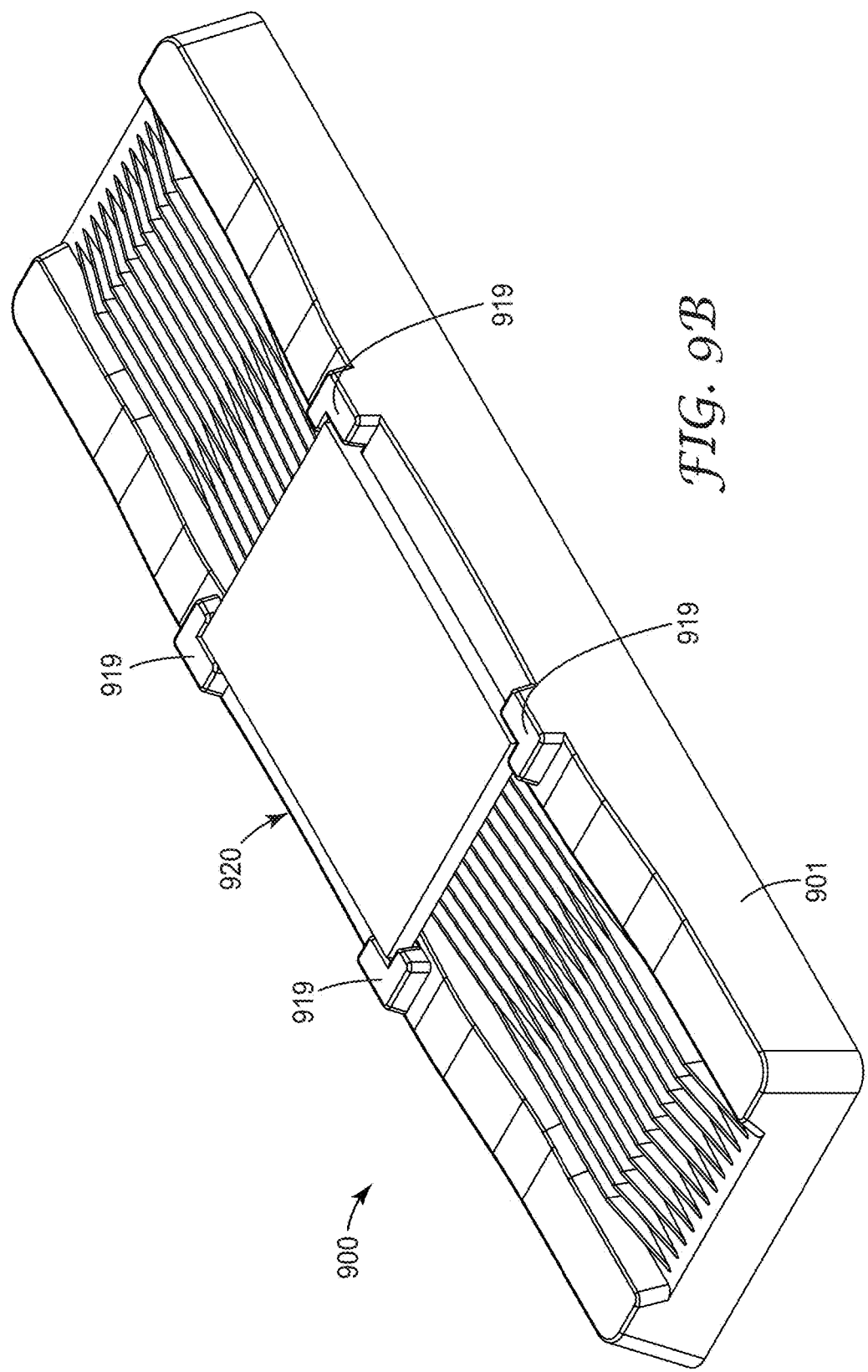

In a first embodiment, FIGS. 9A-9C show a bare fiber holding plate or splice element 900 configured to join a plurality of parallel optical fibers 54, 54' of first and second optical fiber ribbons 50 as shown in FIG. 10C. The body can have the shape of a generally rectangular solid, semi-cylindrical solid or other shape having at least one generally flat major surface. The splice element 900 comprises a splice body 901 having a first end 901a and a second end 901b. Splice body 901 has an integral alignment mechanism comprising a plurality of alignment grooves or channels 912 that extend from the first end to the second end of the splice body. Each alignment channel is configured to guide and support a single optical fiber. In the exemplary embodiment shown in FIG. 9A, the splice element has 12 parallel alignment channels to splice together 2-12 fiber optical ribbons in an end-to-end configuration. In alternative embodiments, the exemplary optical fiber slice element can have fewer or more alignment channels depending on the final application and the number of optical fibers to be spliced. Thus, in some embodiments, the splice element can have two parallel alignment channels for joining a pair of duplex optical fiber cables.

In one embodiment, the alignment mechanism is configured to align a plurality of optical fibers, which are then bonded or spliced together end-to-end using an optical adhesive, or a mechanical clamping device with or without an index matching gel. In some embodiments, the alignment channels 912 can be substantially flat or planar as they extend from the first and second ends to the interconnection region 905, which can be centrally disposed on splice element 100. In another aspect, the alignment channels can have a generally arched profile to aid insertion of the optical fibers into the alignment channels in the proper position. For example, alignment channel 912 can include a generally planar portion 912a at the entrance openings or apertures 913a and 913b which gently rises in rising portion 912b between the entrance openings and the interconnection portion 105 where the alignment channel crests in a shallow dome 912c within the interconnection region as shown in FIG. 11A.

In an alternative embodiment, the alignment channels can be substantially flat as they extend from the first end of the splice element to the second end of said element.

Alignment channels 912 can be continuous or discontinuous. In the exemplary embodiment shown in FIG. 9A, the alignment channels are continuous structures extending from the first entrance opening 913a at the first end 901a of splice body 901 to the second entrance opening 913b at the second end 901a of splice body 901.

The fibers can be inserted into the alignment mechanism through entrance openings or apertures 913a and 913b. In some aspects, the entrance apertures 913a, 913b can comprise a funneling inlet portion formed by the tapering of the partitions 914 between adjacent channels to provide for more straightforward fiber insertion. In other embodiments, the entrance apertures can be fully or partially cone or funnel-shaped to guide the insertion of the optical fibers into the alignment channels 912.

The entrance openings 913a, 913b are characterized by a channel pitch (i.e. the distance between the centerline of adjacent alignment channels). In the embodiment, shown in FIGS. 9A and 9B, the channel pitch at the first end of the splice element is the same as the channel pitch at the second end of the splice element. In this exemplary embodiment, the channel pitch is approximately the same as the inter-fiber spacing in a conventional 12 fiber ribbon. In an alternative embodiment, the channel pitch at the first end of the splice element and the channel pitch at the second end of the splice element can be different. For example, the channel pitch at the first end of the splice element can be set to the fiber spacing of a conventional optical fiber ribbon, while the channel pitch at the second end of the splice element can be at a different value such as when splicing individual optical fibers or when splicing two or more smaller optical fiber ribbons or optical fiber modules to a larger ribbon fiber.

In the exemplary embodiment of FIGS. 9A and 9B, the entrance openings 913a, 913b are disposed in a common plane and all of the fibers being joined by the exemplary splice element enter the guide channels along this common plane. Alternatively, some of the entrance openings can be disposed on a different plane that is vertically offset from the entrance openings. This can be useful when the inter-fiber spacing on one side of the splice element is different than the inter-fiber spacing on the second side of the splice element.

In another aspect, splice element 900 can include a fiber comb portion 915 disposed adjacent to the entrance openings or apertures 913a and 913b on each side of body 901. The fiber comb can be used to support, align and guide the optical fibers being terminated in the exemplary splice element 900. The alignment channels 912 pass through the comb portion. The partitions between the adjacent alignment channels in the comb portion can be taller than along other portions of the alignment channels. The taller partition portions 914a (FIGS. 9A and 11A) allow the individual fibers to be out of position by up to a half fiber diameter while still feeding into the correct alignment channels providing a self-centering mechanism for the optical fibers in the alignment channels.

Splice element 900 can also include a clamp plate 920 (shown in FIGS. 9B and 9C), wherein the clamp plate can be a flat transparent plate disposed over at least the interconnection region 905 of the splice element. Positions posts 919 extend from the upper surface of body 901 adjacent to the interconnection region to assure and maintain the proper positioning of clamping plate 920 over the interconnection region.

Alignment channels 912 can be formed in either body 901 or clamp plate 920, or alignment channels can be formed in both body 901 and clamp plate 920. The alignment channels 912 can have a semi-circular cross section, a trapezoidal cross section, a rectangular cross section or a v-shaped cross section. In the embodiment of FIGS. 9A and 9B, alignment groove 912 is formed in body 901, while clamp plate 920 has a flat-shaped major surface. The body and the clamp plate are brought together to hold one or more fibers in place in the alignment groove prior to curing of the optical adhesive or mechanical clamping of the splice element. An optical adhesive usable with the exemplary optical splice elements described herein, is described for example in U.S. Provisional Patent Application Nos. 62/394,562 and 62/541,864, which are incorporated herein in their entirety. For example, the optical adhesive can be an epoxy-based adhesive composition containing non-aggregated, surface-modified silica nano-particles dispersed in an epoxy resin that is cured by exposure to blue light.

Exemplary light sources for curing the adhesive compositions described herein can have an output density from about 500 mW/cm$^2$ to about 3000 mW/cm$^2$. An exemplary light source may include a conventional blue light source such as a Paradigm™ DeepCure LED curing light available from 3M Company (St. Paul, Minn.), or it can comprise an LED curing array. In an exemplary aspect, the LED light source provides not only the photonic initiation of the polymerization reaction, but can also have sufficient energy to photonically heat the bonding area, enabling the adhesive to achieve a higher glass transition temperature (Tg) than can be generated by the photonic initiation alone. The higher Tg of the adhesive can create more stable optical splices when used to bond optical fibers in an optical splice device, allowing the resulting splice connections to pass more rigorous environmental stress tests.

In an exemplary aspect, the LED array will have a wavelength that is optimized for material curing and modification. Various form factors and features may include an LED array curing device designed to be a portable, hand held unit, for example, an LED light pen, or an LED array, configured to cover a targeted area (e.g. radial, segmented, and organic shapes). Selective control of particular LEDs in the array permits smaller material regions to be exposed. The thermal flux can be managed by a large surface area heat sink and/or forced air flow through the array.

Current approaches to optical curing often involve targeting a reactive material with large external lamps. Uniform radiometric emission levels may need to be on the order of 100 mW/cm$^2$ or much higher. When using LED-based light sources, the spectral width of the LEDs, placement and layouts are carefully defined to provide a uniform light distribution for curing at the desired wavelengths and intensities.

In an exemplary aspect, the LEDs can be arranged in a one-dimensional array, while in other aspects, the LEDs can be arranged in a two-dimensional array. In an exemplary aspect, the LEDs can be arranged in a plurality of banks or strips that are then configured into a two-dimensional array to allow selective exposure over a given cure region. LEDs can be arranged in a regular array with uniform spacing, for example with linear, hexagonal or other geometric placement to maximize light uniformity, minimize the number of LEDs used, or for other reasons. In an exemplary aspect, an array of LEDs may be configured to be evenly distributed over the area intended to be cured, plus a reasonable perimeter, from a small fraction of the total area, to several times the total area, to insure uniform curing of a sample from center to edges.

In one aspect, the exemplary adhesive can be cured using an LED array curing source after about a 60 second exposure, preferably after about a 30 second exposure.

Clamping plate 920 can be a thin flexible glass clamping plate. The clamping plate can be placed in a first or unflexed position to allow space for insertion of the optical fibers and in a second flexed or clamped position, upon application, of an external force (F) that causes the flexible glass clamping plate to close any clearance or free space as well as to align and secure the fibers in the interconnection region. In an exemplary embodiment, an optical adhesive can be irradiated to cure the adhesive permanently fixing the optical fibers in the splice element 900. In one aspect, the force exerted on the clamping plate is permanent, while in other aspects the force can be released after the adhesive is cured. FIGS. 2A-2C illustrate making a splice connection with splice element 900, which will be explained in detail below. In an exemplary aspect, the clamping plate can be rectangular, square, circular or other polygonal shape as needed for a given splice device.

In an alternative aspect, the clamping plate can be a non-silica based flexible clamping plate. For example, the non-silica based flexible clamping plate can be formed of a thin piece of metal such as Invar or stainless steel or a low CTE polymers including a glass filled liquid crystal polymer material such as VECTRA® A130 LCP Glass Reinforced available from Ticona Engineering Polymers (Florence, Ky.). In an exemplary embodiment, the clamping plate can have a thickness between about 25 microns to about 250 microns, preferably between about 75 microns and about 125 microns.

At least one of the splice element body 901 and clamp plate 920 is formed from a silica material, especially a net shape, cast and cure silica material, such as is described in greater detail herein. In an alternative embodiment, both the splice element body 901 and a clamp plate 920 are formed from a net shape cast and cure silica material. In an exemplary embodiment, parts made from net shape cast and cure silica material are transparent. For example, net shape cast and cure silica material can have a transparency of greater than about 90% at a wavelength of light between 430 nm to about 480 nm. Such a transparent net shape cast and cure silica material allows for the use of a visible light source to be directed through one of the splice element body or the clamping plate from the outside of the structure to cure the optical adhesive disposed therein. By utilizing a net shape cast and cure silica alignment mechanism and an adhesive composition containing silica nano-particles, the temperature performance of the splice element can be stable across a wide temperature range, as the thermal properties of the optical fibers and splice element are essentially the same.

In some embodiments, the surfaces of silica splice element 900 and/or clamp plate 920 may be coated with an aluminum, copper, or Parylene coating (having a thickness of, e.g., between 3 µm and 25 µm). While not required, such conformable materials may be useful to optimize the fiber retention, fiber stress, and concentric alignment. For example, Parylene is transparent, can be easily applied by evaporation, and is stable in high temperatures. For example, Parylene C, available from Specialty Coating Systems (Indianapolis, Ind.), is conventionally used to coat printed circuit boards and human implants.

In one exemplary aspect, the exemplary multifiber splice device can be used to join two separate multifiber cables as described previous, while in an alternative embodiment the exemplary multifiber splice device can be used to repair a damaged multifiber cable, by simply cutting out the damaged portion of the cable and splicing the two cable portions as if they were two discrete multifiber cables.

The exemplary splice element can be disposed in a structure or housing (not shown) to protect the splice and/or provide eye safety or facilitate handling when in use.

Figure 10A:
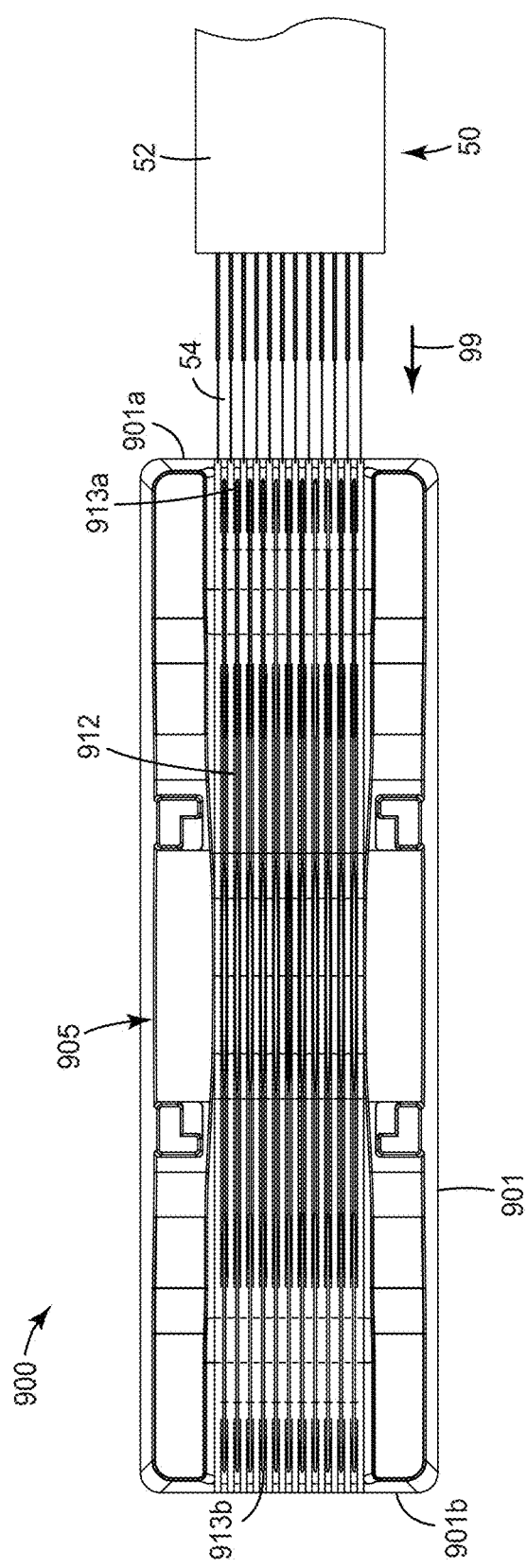
Figure 10B:
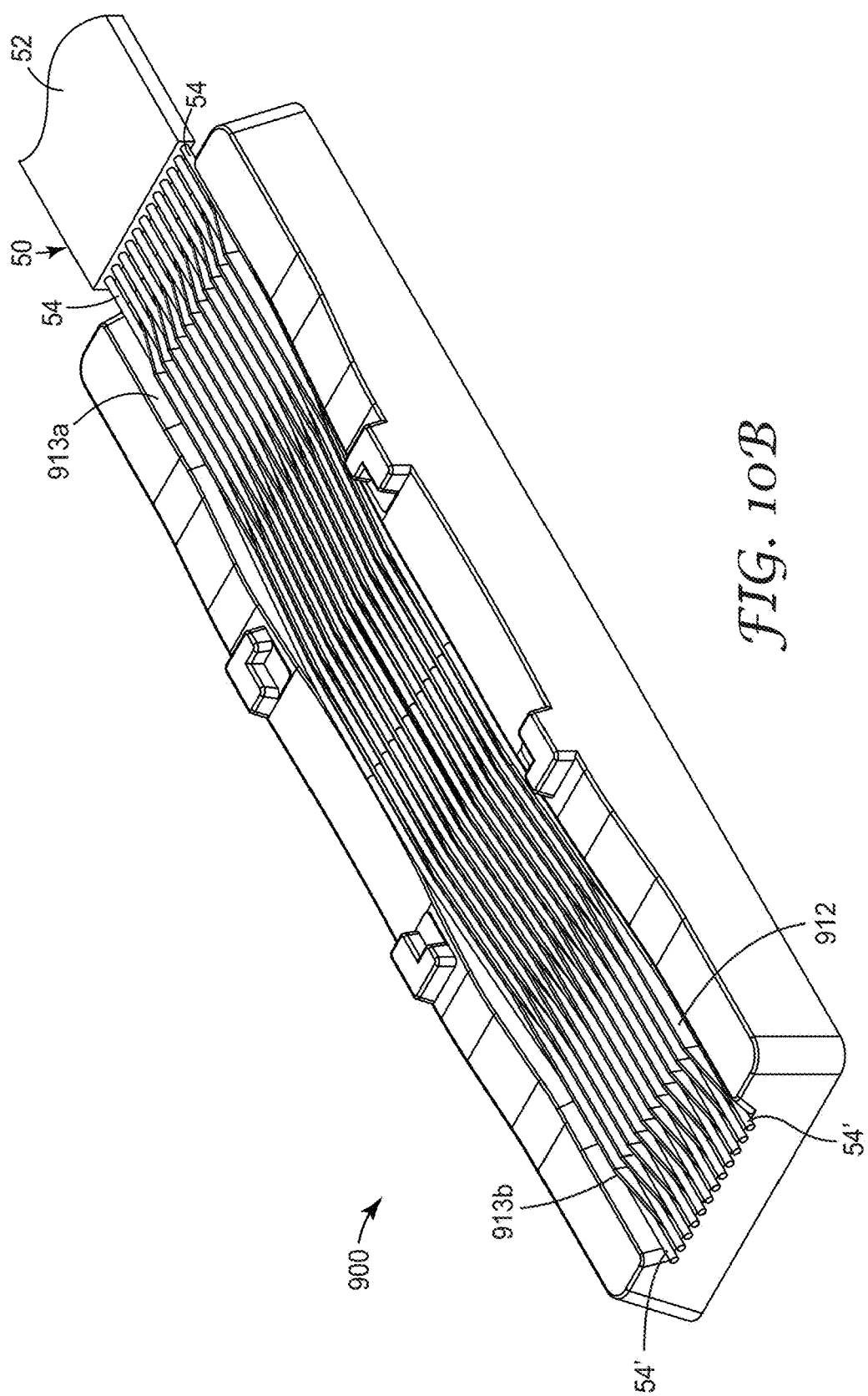

An exemplary splicing process is shown with respect to FIGS. 10A-10C, where a first fiber ribbon 50 comprising a plurality of first optical fibers 54 can be spliced to a second fiber ribbon (not shown) comprising a plurality of second optical fibers 54'. Optical fibers are oriented in a parallel planar array in the fiber ribbon and are surrounded by a ribbon jacket 52. The optical fibers in the exemplary ribbons can be standard single mode or multimode optical fibers, such as SMF 28, OM2, OM3, OM4, OM5 fiber ribbon cables (available from Corning Inc.).

A section of the ribbon jacket 52 is removed from the terminal end of ribbon fiber 50 to expose optical fibers 54. The protective acrylate coating on the optical fibers can be stripped to the desired length. In one aspect, acrylate coating on the optical fibers can be stripped and cleaved to a length of between 2 mm and 15 mm, preferably about 5 mm. In one exemplary embodiment, the fibers can be cleaved so that the end face of the optical fiber is perpendicular to the longitudinal axis of the optical fiber (i.e. cleaved flat). In an alternative embodiment, the fibers can be cleaved at an angle that deviates from perpendicular by about 2° to about 10°, preferably between about 4° to about 8°. In some embodiments, a post-cleave end finishing step may be employed to shape or bevel the ends of the optical fibers. Exemplary post-cleave end finishing processes can include abrasive polishing and/or laser finishing.

The ends of optical fibers 54 of the first fiber ribbon 50 are inserted into entrance openings 913a at the first end 901a of the splice element 900 as indicated by directional arrow 99 shown in FIG. 10A. The fibers are slid through alignment channels 912 until the ends of the optical fibers are disposed in the center of interconnection region 905.

The second fiber ribbon is then prepared as described above. The second optical fibers 54' (FIG. 10B) of the second ribbon 50 are inserted into entrance openings 913b at the second end 901b of the splice element 900 and slid through the corresponding alignment channels until the ends of the optical fibers are disposed in the center of interconnection region 905 and abut against the ends of first optical fibers 54, as shown in FIGS. 10B and 11A. Next as shown in FIGS. 10C and 11B a force, F, is applied to clamp plate 920 causing a portion of the clamp plate to flex toward splice element 900 to close any clearance or free space between the clamp plate and the fibers as well as to align the fibers in the interconnection region. The fiber ends are contacted in the interconnection region where the fiber ends can be generally concentrically gripped when the splice element and clamp plate are pressed together.

In an exemplary aspect, splice element 900 can be pre-loaded with an optical adhesive (not shown) in the interconnection region. After applying the force to the clamp plate, the optical adhesive can be irradiated with an appropriate wavelength of light to cure the adhesive, permanently fixing the optical fibers in the splice element 900. Once actuated, a light source (not shown), such as a conventional blue light source, can be utilized to provide the necessary actinic radiation through the transparent clamp plate 920 (or transparent body 101) to cause the optical adhesive to cure.

In another embodiment, an exemplary field termination process is provided. During transportation, the splice element and pre-loaded adhesive can be protected from dirt and light exposure using known peel tape tabs on the splice element and/or black or optically opaque to visible light blister packaging. Field fibers can be cleaved using an instrument such as the 3M™ Easy Cleaver, or another commercial cleaver such as CI-01 provided by Ilsintech (Korea).

Field fibers can be inserted into the entrance openings 913a, 913b of the splice element 100. The clamp plate 120 can be displaced axially, such as described above. A Paradigm light pen (available from 3M Company, Item #76962), a battery operated LED array, or a corded light source, etc. that emit blue light in the range of 430 nm to 480 nm. can be used to cure the adhesive. An installation tool with a nest (not shown) can be provided to align and hold the light source over the splice window region, during the approximate 20-30 second splice adhesive cure cycle. This type of docking operation can remove craft variability, ensuring intended light exposure to reach the adhesive.

In a further embodiment of the invention, while a preferred application of the splice element and devices described herein is for telecommunication applications, other applications can include sensors or sensing for "smart" applications.

In more detail, as stated previously, the alignment mechanism plates may be formed from a net shape cast and cure silica that is formed with a sol gel. More information regarding the composition and formation of the net shape cast and cure silica is hereby provided.

Description of Net Shape Silica Material

The shaped silica materials (also referred to as shaped gel articles) can be formed from a casting sol that contains colloidal silica particles that are treated with a surface modification composition that includes a silane surface modification agent having a radically polymerizable group. The shaped gel article is dried to either an aerogel or xerogel. The sintered article is formed from the aerogel or xerogel. The sintered article has a shape identical to the mold cavity (except in regions where the mold cavity was overfilled) and to the shaped gel article but reduced in size proportional to the amount of isotropic shrinkage.

The shaped gel articles are formed within a mold cavity using a casting sol that includes (a) surface modified silica particles, the surface modified silica particles being a reaction product of silica particles having an average particle size no greater than 100 nanometers and a silane surface modification composition that includes a silane surface modification agent having a radically polymerizable group, (b) optional polymerizable material that does not include a silyl group, (c) a radical initiator for a radical polymerization reaction, and (d) an organic solvent medium that can solubilize the surface modification composition, the optional polymerizable material, and the radical initiator. The shaped gel article can be handled and processed to form a sintered article that can have a complex shape and/or features, that can be free of cracks, and that can have a uniform density throughout. Because the sintered articles typically contain amorphous rather than crystalline silica, the sintered articles have a transmission comparable to fused quartz above 450 nanometers in the visible and near infrared regions of the electromagnetic spectrum. That is, the sintered articles can be translucent or transparent to the human eye.

A shaped gel article is provided that contains a polymerized product of a casting sol, wherein the casting sol is positioned within a mold cavity during polymerization and wherein the shaped gel article retains both a size and a shape identical to the mold cavity (except in a region where the mold cavity was overfilled) when removed from the mold cavity. The casting sol comprises (a) 2 to 65 weight percent surface modified silica particles, (b) 0 to 40 weight percent polymerizable material that does not contain a silyl group, (c) 0.01 to 5 weight percent radical initiator, and (d) 30 to 90 weight percent organic solvent medium, wherein each weight percent is based on the total weight of the casting sol.

The surface modified silica particles in the casting sol are typically a reaction product of silica particles and a surface modification composition containing a silane surface modification agent having a radically polymerizable group. The silica particles have an average particle size that is up to 100 nanometers. That is, the silica particles can be referred to as being "colloidal particles" and/or "nanoparticles" and/or "colloidal nanoparticles". The average particle size is often up to 90 nanometers, up to 80 nanometers, up to 70 nanometers, up to 60 nanometers, up to 50 nanometers, up to 40 nanometers, up to 30 nanometers, up to 20 nanometers, up to 10 nanometers, or up to 7 nanometers. The average size is typically at least 1 nanometer, at least 2 nanometers, at least 3 nanometers, at least 5 nanometers, or at least 10 nanometers. In some embodiments, the silica particles are in a range of 1 to 100 nanometers, 1 to 80 nanometers, 1 to 60 nanometers, 1 to 40 nanometers, 1 to 20 nanometers, 1 to 10 nanometers, 4 to 100 nanometers, 4 to 80 nanometers, 4 to 60 nanometers, 4 to 40 nanometers, 4 to 20 nanometers, 10 to 100 nanometers, 10 to 80 nanometers, 10 to 60 nanometers, or 10 to 40 nanometers. The average particle size can be determined using transmission electron microscopy (TEM). Typically, the size (e.g., longest dimension) of at least 300 particles in the transmission electron micrograph are measured and averaged.

The silica particles are amorphous. That is, an x-ray diffraction scan of the silica particles does not contain any of the characteristic peaks for crystalline silica. The amorphous character of the silica particles is preferably retained in the casting sol, in the gel composition, and in the sintered article. The amorphous character of the silica contributes to the transparency or translucency of the final sintered articles.

In many embodiments, the silica particles are commercially available in the form of a colloidal dispersion in water. The colloidal dispersion can be referred to as a silica sol. Silica particles in a silica sol are advantageously used to prepare the surface modified silica particles rather than powdered silica particles or dispersions formed from powdered silica particles. Silica particles in silica sols tend to be less agglomerated and/or aggregated compared to dispersions prepared from powdered silica particles. Silica sols, which contain colloidal silica particles, are usually stable dispersions. Dispersions formed from powdered silica particles, on the other hand, often are not colloidal particles and/or are not stable dispersions.

The silica sol often has a basic pH (for example, 8 to 10) or an acidic pH (for example, 3 to 5). The silica particles in the silica sol are usually non-associated. That is, at least 70 percent, at least 80 percent, at least 90 percent, at least 95 percent, at least 98 percent, at least 99 percent, at least 99.5 percent, or at least 99.9 percent of the silica particles are primary particles that are not agglomerated and/or not aggregated. For example, the silica particles are not fumed silica.

The silica sol is typically clear or slightly cloudy. In contrast, dispersions that contain agglomerated or aggregated particles usually tend to have a milky or cloudy appearance except when index matched. The non-associated silica particles are well suited for formation of high density, sintered articles. Non-associated particles tend to result in the formation of casting sols that have low viscosity and high light transmission (e.g., high transmission in visible and ultraviolet regions of the electromagnetic spectrum). Additionally, non-associated particles tend to result in the formation of gel compositions, aerogels, or xerogels with uniform pore structures and in the formation of homogeneous sintered articles.

The extent of association between the primary particles can be determined from the volume-average particle size. The volume-average particle size can be measured using Photon Correlation Spectroscopy. Briefly, the volume distribution (percentage of the total volume corresponding to a given size range) of the particles is measured. The volume of a particle is proportional to the third power of the diameter. The volume-average size is the size of a particle that corresponds to the mean of the volume distribution. If the silica particles are associated, the volume-average particle size provides a measure of the size of the aggregate and/or agglomerate of primary particles. If the particles of silica are non-associated, the volume-average particle size provides a measure of the size of the primary particles. The silica particles typically have a volume-average size up to 100 nanometers. For example, the volume-average size can be up to 90 nanometers, up to 80 nanometers, up to 75 nanometers, up to 70 nanometers, up to 60 nanometers, up to 50 nanometers, up to 40 nanometers, up to 30 nanometers, up to 25 nanometers, up to 20 nanometers, up to 15 nanometers, or even up to 10 nanometers.

A quantitative measure of the degree of association between the primary particles in the sol is the dispersion index. As used herein the "dispersion index" is defined as the volume-average particle size divided by the primary particle size. The primary particle size (e.g., the weighted average primary particle size) is determined using TEM techniques and the volume-average particle size is determined using Photon Correlation Spectroscopy. As the association between primary particles decreases, the dispersion index approaches a value of 1 but can be somewhat higher or lower. The silica particles typically have a dispersion index in a range of from 1 to 7. For example, the dispersion index is often in a range 1 to 5, 1 to 4, 1 to 3, 1 to 2.5, or even 1 to 2.

Photon Correlation Spectroscopy also can be used to calculate the Z-average primary particle size. The Z-average size is calculated from the fluctuations in the intensity of scattered light using a cumulative analysis and is proportional to the sixth power of the particle diameter. The volume-average size will typically be a smaller value than the Z-average size. The silica particles tend to have a Z-average size that is up to 100 nanometers. For example, the Z-average size can be up to 90 nanometers, up to 80 nanometers, up to 70 nanometers, up to 60 nanometers, up to 50 nanometers, up to 40 nanometers, up to 35 nanometers, up to 30 nanometers, up to 20 nanometers, or even up to 15 nanometers.

Various colloidal silica sols (dispersions of silica particles in water) are commercially available. The colloidal silica sols are often either base stabilized (for example, at a pH near 9) or acid stabilized (for example, at a pH near 4). Example colloidal silica sols include those commercially available from Nalco Chemical Company (Naperville, Ill.) under the trade designation NALCO (for example, NALCO 2326, NALCO 2327, NALCO 2329, NALCO 2329K, and NALCO 2329 PLUS) and from Nissan Chemical American Corporation (Houston, Tex.) under the trade designations SNOWTEX (for example, SNOWTEX ST-20L, SNOWTEX ST-O, SNOWTEX ST-OL, SNOWTEX ST-40, SNOWTEX ST-50, and SNOWTEX ST-ZL) and NISSAN (for example, NISSAN MP-1040).

The silica particles are surface modified. The surface modified silica particles are a reaction product of a surface of the silica particles with a surface modification composition. The surface modification composition contains one or more surface modifying agents that each have a silyl group. The silyl group of the surface modification agent can react with a silanol group on the surface of the silica particles. The surface modification composition contains at least one silane surface modifying agent having a radically polymerizable group. In some embodiments, the surface modification composition contains additional surface modification agents in addition to the silane surface modifying agent having a radically polymerizable group.

The silane surface modifying agent having a radically polymerizable group has two reactive groups: (1) a silyl group and (2) a radically polymerizable group. The silyl group can undergo a condensation reaction with a silanol on the surface of the silica particles resulting in the covalent attachment of the remaining portion of the silane surface modification agent that includes the radically polymerizable group. The silane surface modifying composition tends to improve compatibility of the silica particles with the other components of the casting sol and provides a radically polymerizable group that can participate in the curing reaction used to form the gel composition (e.g., the shaped gel article). The silane surface modifying composition additionally can reduce viscosity of the casting sol and increase the transmission of the casting sol.

Some suitable silane surface modifying agents having a radically polymerizable group are (meth)acryloyl-containing compounds of Formula (I).

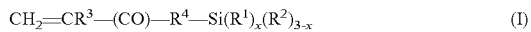

$$CH_2=CR^3-(CO)-R^4-Si(R^1)_x(R^2)_{3-x} \quad \text{(I)}$$

In Formula (I), $R^1$ is a non-hydrolyzable group, $R^2$ is hydroxyl or a hydrolyzable group, and the variable x is an integer equal to 0, 1, or 2. Group $R^3$ is hydrogen or methyl and group $R^4$ is an alkylene. In many embodiments, each $R^1$ is alkyl, aryl, or aralkyl and each $R^2$ is alkoxy, alkoxyalkoxy, acyloxy, aryloxy, or halo. In some more specific embodiments, each $R^1$ is alkyl and each $R^2$ is alkoxy.

Example compounds of Formula (I) include, but are not limited to, (meth)acryloxyalkyltrialkoxysilanes (for example, 3-(meth)acryloyloxypropyltrimethoxysilane, 3-(meth)acryloyloxypropyltriethoxysilane, and 3-(meth)acryloyloxypropyltriisopropoxysilane), (meth)acryloxyalkylalkyldialkoxysilanes (for example, 3-(meth)acryloyloxypropylmethyldimethoxysilane and 3-(meth)acryloyloxypropylmethyldiethoxysilane), (meth)acryloxyalkyldialkylalkoxysilanes (for example, 3-(meth)acryloyloxypropyldimethylmethoxysilane and 3-(meth)acryloyloxypropyldimethylethoxysilane), and 3-(meth)acrylolylamidoalkyltrialkoxysilanes (for example, 3-(meth)acrylolylamidopropyltrimethoxysilane).

Other suitable silane surface modifying agents having a radically polymerizable group are vinyl-containing compounds of Formula (II).

$$CH_2=CH-R^7-Si(R^5)_x(R^6)_{3-x} \quad \text{(II)}$$

In Formula (II), $R^7$ is single bond, alkylene, arylene, or combination thereof. The combination group is usually an alkylene attached to an arylene. $R^5$ is a non-hydrolyzable group, $R^6$ is hydroxyl or a hydrolyzable group, and the variable x is an integer equal to 0, 1, or 2. In many embodiments, each $R^5$ is alkyl, aryl, or aralkyl and each $R^6$ is alkoxy, alkoxyalkoxy, acyloxy, aryloxy, or halo. In specific embodiments, $R^5$ is alkyl and $R^6$ is alkoxy, acyloxy, aryloxy, or alkoxyalkoxy.

Example compounds of Formula (II) include, but are not limited to, styrylalkyltrialkoxysilane (for example, styrylethyltrimethoxysilane), vinyl trialkoxysilanes (for example, vinyltrimethoxysilane, vinyltriethoxysilane, and vinyltriisopropoxysilane), vinylalkyldialkoxysilanes (for example, vinylmethyldiethoxysilane), vinyldialkylalkoxysilanes (for example, vinyldimethylethoxysilane), vinyltriacyloxysilanes (for example, vinyltriacetoxysilane), vinylalkyldiacetoxysilanes (for example, vinylmethyldiacetoxysilane), and vinyltris(alkoxyalkoxy)silanes (for example, vinyltris(2-methoxyethoxy)silane).

Still other suitable silane surface modifying agents having a radically polymerizable group are thiol-containing compounds of Formula (III).

$$HS-R^{10}-Si(R^9)-(R^8)_{3-x} \quad \text{(III)}$$

In Formula (III), $R^{10}$ is an alkylene. $R^9$ is a non-hydrolyzable group, $R^8$ is hydroxyl or a hydrolyzable group, and the variable x is an integer equal to 0, 1, or 2. In many embodiments, each $R^9$ is alkyl, aryl, or aralkyl and each $R^8$ is alkoxy, alkoxyalkoxy, acyloxy, aryloxy, or halo. In specific embodiments, $R^9$ is alkyl and $R^8$ is alkoxy, acyloxy, aryloxy, or alkoxyalkoxy.

Example compounds of Formula (III) include, but are not limited to, (3-Mercaptopropyl) trimethoxysilane, (3-mercaptopropyl) triethoxysilane, (3-mercaptopropyl)methyldimethoxysilane, and (3-mercaptopropyl)methyldiethoxysilane.

Some other suitable silane surface modifying agents having a radically polymerizable group are commercially available, for example, from Gelest (Morrisville, Pa., USA) and Shin-Etsu Silicones (Akron, Ohio, USA).

In addition to the silane surface modifying agent having the radically polymerizable group, the silica particles can be treated with other optional surface modifying agents. These optional surface modifying agents are often silane compounds that have a silyl group but not a radically polymerizable group. The silane compound can have another type of functional group (for example, an epoxy group, a cyano group, an amino group, or a carbamate group) or no other functional group. Another type of functional group can be used, for example, to react with another group of the polymeric material resulting in the formation of crosslinks. Example silane compounds that do not have a radically polymerizable group include, but are not limited to, propyltrimethoxysilane, propyltriethoxysilane, hexyltrimethoxysilane, hexyltriethoxysilane, isooctyltrimethoxysilane, n-octyltriethoxysilane, n-octyltrimethoxysilane, octadecyltrimethoxysilane, decyltrimethoxysilane, decyltriethoxysilane, dodecyltrimethoxysilane, phenyltrimethoxysilane, phenyltriethoxysilane, 3-glycidoxypropyltrimethoxysilane, cyanopropyltriethoxysilane, N-(3-triethoxysilylpropyl) methoxyethoxyethyl carbamate, N-(3-triethoxysilylpropyl) methoxyethoxyethyl carbamate. Another example silane compound is available from Momentive Performance Materials, Wilton, Conn., under the trade designation SILQUEST A1230. Still other suitable silane compounds are commercially available, for example, from Gelest (Morrisville, Pa., USA) and Shin-Etsu Silicones (Akron, Ohio, USA).

The selection of the surface modification agent(s) can influence the shaped gel article that is formed from the casting sol. That is, the selection of surface modification composition can influence the homogeneity of the shaped gel article. The surface modifier composition can be selected, for example, to adjust the compatibility of the silica particles with the polymerizable material and the organic solvent medium within the casting sol. This has been observed to affect, for example, the clarity and the viscosity of the casting sol. In addition, the selection of the surface modification composition can impact the strength of the gel composition (shaped gel article) that is formed.

In some embodiments, a combination of surface modifying agents can be useful. That is, the surface modification composition includes a plurality of surface modification agents. Any combination includes at least one silane surface modification agent having a radically polymerizable group. Some combinations can further include at least one optional surface modification agent such as those described above. In some embodiments, 100 weight percent of the surface modification agents added to the silica particles are silane surface modification agents having a radically polymerizable group. In other embodiments, up to 90 weight percent, up to 80 weight percent, up to 70 weight percent, up to 60 weight percent, or up to 50 weight percent and at least 2 weight percent, at least 5 weight percent, at least 10 weight percent, at least 20 weight percent, at least 30 weight percent, at least 40 weight percent, or at least 50 weight percent of the surface modification agents in the surface modification composition are silane surface modification agents having a radically polymerizable group. For example, the surface modification composition contains 2 to 100 percent, 5 to 100 percent, 10 to 100 percent, 20 to 100 percent, 30 to 100 percent, 40 to 100 percent, 50 to 100 percent, 5 to 90 percent, 10 to 90 percent, 20 to 90 percent, 40 to 90 percent, 50 to 90 percent, 10 to 80 percent, 20 to 80 percent, 40 to 80 percent, or 50 to 80 percent silane surface modification agents having a radically polymerizable group.

Although surface modification of the silica particles can be performed before or after mixing with the other components of the casting sol used to form the gel composition, the silica particles are usually treated with the surface modification composition prior to mixing with the other components of the casting sol. In many embodiments, the amount of the surface modification composition is in a range of 1 to 100 weight percent based on the weight of the silica particles. For example, the amount of surface modification composition can be at least 2 weight percent, at least 5 weight percent, or at least 10 weight percent, or at least 20 weight percent and can be up to 100 weight percent, up to 80 weight percent, up to 60 weight percent, up to 40 weight percent, up to 35 weight percent, up to 30 weight percent, up to 25 weight percent, or up to 20 weight percent. The percent amounts are based on the weight of the silica particles.

The silica content of the surface modified silica particles depends on the size of the silica particles and the molecular weight of the surface modification agent(s). In general, the amount of silica can range from 50 to 99 weight percent based on the total weight of the surface modified silica particles. That is, the surface modified silica particles can contain at least 50 weight percent, at least 55 weight percent, at least 60 weight percent, at least 65 weight percent, at least 70 weight percent, at least 75 weight percent, at least 80 weight percent, at least 85 weight percent, at least 90 weight percent, or at least 95 weight percent silica. The surface modified silica particles can contain up to 99 weight percent, up to 98 weight percent, up to 97 weight percent, up to 96 weight percent, up to 95 weight percent, up to 94 weight percent, up to 92 weight percent, up to 90 weight percent, up to 85 weight percent silica, or up to 80 weight percent. In some embodiments, the amount of silica in the surface modified silica particles is in a range of 60 to 99 weight percent, 70 to 99 weight percent, 80 to 99 weight percent, 90 to 99 weight percent, 50 to 98 weight percent, 60 to 98 weight percent, 70 to 98 weight percent, 80 to 98 weight percent, 90 to 98 weight percent, 50 to 95 weight percent, 60 to 95 weight percent, 70 to 95 weight percent, 80 to 95 weight percent, 90 to 95 weight percent, or 80 to 90 weight percent. The weight percent silica in the surface modified silica particles can be determined by heating the surface modified silica particles in air using thermal gravimetric analysis. The percent silica is equal to the (final weight at 900° C. divided by the weight at 200° C.) multiplied by 100 percent.

Because the specific surface area increases as the silica particle size decreases, smaller surface modified silica particles typically have a lower silica content compared to larger surface modified silica particles. For a given silica particle size, the silica content decreases as the molecular weight of the surface modification agent increases. It is surprising that the surface modified composition can be burned out without cracking the article, especially when small silica particles are used that have a high amount of surface modification.

Some example surface modified silica particles are prepared using silica particles having an average particle size close to 5 nanometers and the silica content of the surface modified silica particles is often in a range of 50 to 98 weight percent, 60 to 98 weight percent, 70 to 98 weight percent, 50 to 95 weight percent, 60 to 95 weight percent, 65 to 95 weight percent, 70 to 95 weight percent, 75 to 95 weight percent, 60 to 90 weight percent, 65 to 90 weight percent, 70 to 90 weight percent, or 75 to 90 weight percent. The weight percent values are based on the total weight of the surface modified silica particles.

Other example surface modified silica particles are prepared using silica particles having an average particle size close to 20 nanometers and the silica content of the surface modified silica particles is often in a range of 70 to 99 weight percent, 75 to 99 weight percent, 80 to 99 weight percent, 85 to 99 weight percent, 70 to 97 weight percent, 75 to 97 weight percent, 80 to 97 weight percent, 85 to 97 weight percent, 70 to 96 weight percent, 75 to 96 weight percent, 80 to 96 weight percent, 85 to 96 weight percent, 70 to 95 weight percent, 75 to 95 weight percent, 80 to 95 weight percent, or 85 to 95 weight percent. The weight percent values are based on the total weight of the surface modified silica particles.

Still other example surface modified silica particles are prepared using silica particles having an average particle size close to 75 nanometers and the silica content of the surface modified silica particles is often in a range of 90 to 99 weight percent, 92 to 99 weight percent, 94 to 99 weight percent, 95 to 99 weight percent, 90 to 98 weight percent, 92 to 98 weight percent, 94 to 98 weight percent, or 95 to 98 weight percent. The weight percent values are based on the total weight of the surface modified silica particles.

Any suitable attachment procedure or reaction conditions can be used to provide the attachment of surface modification agent(s) on the surface of the silica particles. In many embodiments, the silica particles are in the form of a silica sol. To surface modify the silica particles within the silica sol, an optional first organic solvent can be added. Suitable optional first organic solvents include, but are not limited to, 1-methoxy-2-propanol (i.e., methoxy propanol), ethanol, isopropanol, ethylene glycol, N,N-dimethylacetamide, and 1-methyl-2-pyrrolidinone. The optional first organic solvent is often added to enhance the solubility of the surface modifying agents as well as to enhance the dispersion of the surface modified silica particles. The first organic solvent is usually selected to be miscible with water and to have a boiling point that is close to that of water (e.g., within 20° C.). This allows removal of the first organic solvent, if desired, with the water prior to formation of the casting sol and/or the gel composition.

The resulting mixture of the silica sol, optional first organic solvent, and the surface modification composition is reacted at room temperature or at an elevated temperature. In many embodiments, the mixture is heated at elevated temperatures (for example, above room temperature or at least 30° C., at least 40° C., or at least 50° C. and up to 120° C. or even higher, up to 100° C., up to 90° C., up to 80° C., up to 60° C., or up to 50° C.) for a period of at least 1 hour, at least 2 hours, at least 4 hours and up to 24 hours, up to 20 hours, up to 16 hours, up to 12 hours, or up to 8 hours.

The resulting dispersion of the surface modified silica particles can form stable and compatible casting sol compositions. That is, the surface modified silica particles are well dispersed resulting in a uniform and homogenous composition. The surface modified silica particles in the dispersion have a covalently attached surface modifying group that includes a radically polymerizable group. The radically polymerizable group can polymerize with another radically polymerizable group on another silica particle or with other optional polymerizable material added to the casting sol.

The casting sol is usually formed from the dispersion of surface modified silica particles. In many embodiments, a solvent exchange procedure is utilized to replace the water and any other optional first organic solvents with a second organic solvent having a boiling point equal to at least 150° C. In this procedure, the second organic solvent (along with any optional additional polymerizable material) can be added to the dispersion of surface modified silica particles. Water and any optional first organic solvent can be removed by evaporation resulting in the formation of the casting sol. The evaporation step can be accomplished, for example, by distillation, rotary evaporation, or oven drying. The evaporation step typically does not remove the second organic solvent.

In one embodiment, the amount of silica particles (which is part of the surface modified silica particles) included in the casting sol does not exceed 30 volume percent based on a total volume of the casting sol. The amount of silica is often in a range of 1 to 30 volume percent based on the volume of the casting sol. In some examples, the volume of silica is at least 2 volume percent, at least 3 volume percent, at least 4 volume percent, or at least 5 volume percent. The amount can be up to 25 volume percent, up to 20 volume percent, up to 15 volume percent, or up to 10 volume percent. In some embodiments, the amount of silica in the casting sol is in a range of 1 to 30 volume percent, 1 to 25 volume percent, 1 to 20 volume percent, 1 to 15 volume percent, 2 to 30 volume percent, 2 to 25 volume percent, 2 to 20 volume percent, 2 to 15 volume percent, 5 to 30 volume percent, 5 to 25 volume percent, 5 to 20 volume percent, or 5 to 15 volume percent.

In addition to the surface modified silica particles, the casting sol includes an organic solvent medium. The organic solvent medium can include any organic solvent that is miscible with the surface modification composition, any optional polymerizable materials included in the casting sol, and the radical initiator. The organic solvent medium is selected to provide a casting sol that is a stable dispersion. The organic solvent medium typically contains less than 15 weight percent water, less than 10 percent water, less than 5 percent water, less than 3 percent water, less than 2 percent water, less than 1 weight percent, or even less than 0.5 weight percent water after the solvent exchange (e.g., distillation) process.

The casting sol often includes at least 30 to 90 weight percent organic solvent medium. In some embodiments, the casting sol contains at least 35 weight percent, at least 40 weight percent, at least 45 weight percent, or at least 50 weight percent organic solvent medium. The casting sol can contain up to 85 weight percent, up to 80 weight percent, up to 75 weight percent, up to 70 weight percent, up to 65 weight percent, up to 60 weight percent, up to 55 weight percent, up to 50 weight percent, or up to 45 weight percent organic solvent medium. For example, the casting sol can contain 30 to 80 weight percent, 30 to 75 weight percent, 30 to 70 weight percent, 30 to 60 weight percent, 30 to 50 weight percent, 30 to 45 weight percent, 40 to 90 weight percent, 40 to 80 weight percent, 40 to 70 weight percent, 40 to 60 weight percent, 50 to 90 weight percent, 50 to 80 weight percent, 50 to 70 weight percent, 60 to 90 weight percent, or 60 to 80 weight percent organic solvent medium. The weight percent values are based on the total weight of the casting sol.

The organic solvent medium often contains at least 30 weight percent of an organic solvent (a second organic solvent) having a boiling point equal to at least 150° C. In some embodiments, the organic solvent medium contains at least 40 weight percent, at least 50 weight percent, at least 60 weight percent, at least 70 weight percent, at least 80 weight percent, at least 90 weight percent, at least 95 weight percent, at least 97 weight percent, at least 98 weight percent, or at least 99 weight percent of the second organic solvent having a boiling point equal to at least 150° C. The boiling point is often at least 160° C., at least 170° C., at least 180° C., or at least 190° C.

Suitable second organic solvents that have a boiling point equal to 150° C. are typically selected to be miscible with water. Further, these second organic solvents are often selected to be soluble in supercritical carbon dioxide or liquid carbon dioxide. The molecular weight of the second organic solvent is usually at least 25 grams/mole, at least 30 grams/mole, at least 40 grams/mole, at least 45 grams/mole, at least 50 grams/mole, at least 75 grams/mole, or at least 100 grams/mole. The molecular weight can be up to 300 grams/mole or higher, up to 250 grams/mole, up to 225 grams/mole, up to 200 grams/mole, up to 175 grams/mole, or up to 150 grams/mole. The molecular weight is often in a range of 25 to 300 grams/mole, 40 to 300 grams/mole, 50 to 200 grams/mole, or 75 to 175 grams/mole.

The second organic solvent is often a glycol or polyglycol, mono-ether glycol or mono-ether polyglycol, di-ether glycol or di-ether polyglycol, ether ester glycol or ether ester polyglycol, carbonate, amide, or sulfoxide (e.g., dimethyl sulfoxide). The second organic solvents usually have one or more polar groups. The second organic solvent does not have a polymerizable group; that is, the organic solvent is free of a group that can undergo free radical polymerization. Further, no component of the organic solvent medium has a polymerizable group that can undergo free radical polymerization.

Suitable glycols or polyglycols, mono-ether glycols or mono-ether polyglycols, di-ether glycols or di-ether polyglycols, and ether ester glycols or ether ester polyglycols are often of Formula (IV).

$$R^{11}O-(R^{12}O)_n-R^{11} \qquad (IV)$$

In Formula (IV), each $R^H$ independently is hydrogen, alkyl, aryl, or acyl. Suitable alkyl groups often have 1 to 10 carbon atoms, 1 to 6 carbon atoms, or 1 to 4 carbon atoms. Suitable aryl groups often have 6 to 10 carbon atoms and are often phenyl or phenyl substituted with an alkyl group having 1 to 4 carbon atoms. Suitable acyl groups are often of formula $-(CO)R^{13}$ where $R^{13}$ is an alkyl having 1 to 10 carbon atoms, 1 to 6 carbon atoms, 1 to 4 carbon atoms, 2 carbon atoms, or 1 carbon atom. The acyl is often an acetate group ($-(CO)CH_3$). In Formula (IV), each $R^{12}$ is typically ethylene or propylene. The variable n is at least 1 and can be in a range of 1 to 10, 1 to 6, 1 to 4, or 1 to 3.

Glycols or polyglycols of Formula (IV) have two $R^{11}$ groups equal to hydrogen. Examples of glycols include, but are not limited to, ethylene glycol, propylene glycol, diethylene glycol, dipropylene glycol, triethylene glycol, and tripropylene glycol.

Mono-ether glycols or mono-ether polyglycols of Formula (IV) have a first $R^{11}$ group equal to hydrogen and a second $R^{11}$ group equal to alkyl or aryl. Examples of mono-ether glycols or mono-ether polyglycols include, but are not limited to, ethylene glycol monohexyl ether, ethylene glycol monophenyl ether, propylene glycol monobutyl ether, diethylene glycol monomethyl ether, diethylene glycol monoethyl ether, diethylene glycol monopropyl ether, diethylene glycol monobutyl ether, diethylene glycol monohexyl ether, dipropylene glycol monomethyl ether, dipropylene glycol monoethyl ether, dipropylene glycol monopropyl ether, triethylene glycol monomethyl ether, triethylene glycol monoethyl ether, triethylene glycol monobutyl ether, tripropylene glycol monomethyl ether, and tripropylene glycol monobutyl ether.

Di-ether glycols or di-ether polyglycols of Formula (IV) have two $R^{11}$ groups equal to alkyl or aryl. Examples of di-ether glycols or di-ether polyglycols include, but are not limited to, ethylene glycol dipropyl ether, ethylene glycol dibutyl ether, dipropylene glycol dibutyl ether, diethylene glycol dimethyl ether, diethylene glycol diethyl ether, triethylene glycol dimethyl ether, tetraethylene glycol dimethyl ether, and pentaethylene glycol dimethyl ether.

Ether ester glycols or ether ester polyglycols of Formula (IV) have a first $R^{11}$ group equal to an alkyl or aryl and a second $R^{11}$ group equal to an acyl. Examples of ether ester glycols or ether ester polyglycols include, but are not limited to, ethylene glycol butyl ether acetate, diethylene glycol butyl ether acetate, and diethylene glycol ethyl ether acetate.

Other suitable organic solvents are carbonates of Formula (V).

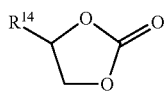

In Formula (V), $R^{14}$ is hydrogen or an alkyl such as an alkyl having 1 to 4 carbon atoms, 1 to 3 carbon atoms, or 1 carbon atom. Examples include ethylene carbonate and propylene carbonate.

Yet other suitable organic solvents are amides of Formula (VI).

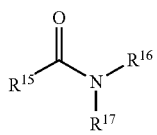

In Formula (VI), group $R^{15}$ is hydrogen, alkyl, or combines with $R^{16}$ to form a five-membered ring including the carbonyl attached to $R^{15}$ and the nitrogen atom attached to $R^{16}$. Group $R^{16}$ is hydrogen, alkyl, or combines with $R^{15}$ to form a five-membered ring including the carbonyl attached to $R^{15}$ and the nitrogen atom attached to $R^{16}$. Group $R^{17}$ is hydrogen or alkyl. Suitable alkyl groups for $R^{15}$, $R^{16}$, and $R^{17}$ have 1 to 6 carbon atoms, 1 to 4 carbon atoms, 1 to 3 carbon atoms, or 1 carbon atom. Examples of amide organic solvents of Formula (VI) include, but are not limited to, formamide, N,N-dimethylformamide, N,N-dimethylacetamide, N,N-diethylacetamide, N-methyl-2-pyrrolidone, and N-ethyl-2-pyrrolidone.

In some casting sols, the only radically polymerizable groups are those that are covalently attached to the silica particles (i.e., those that are part of the surface modified silica particles). These radically polymerizable groups are those that originate from the silane surface modification agent having a radically polymerizable group. In other casting sols, there are additional polymerizable materials that have a polymerizable group that can undergo radical polymerization (e.g., the polymerizable group is free radical polymerizable). In many embodiments, the polymerizable group is an ethylenically unsaturated group such as a (meth)acryloyl group, which is a group of formula —(CO)—$CR^c$=$CH_2$ where $R^c$ is hydrogen or methyl, or a vinyl group, which is a group of formula —CH=$CH_2$ that is not a (meth)acryloyl group. In still other embodiments, the polymerizable group is a thiol group (—SH).

The amount of polymerizable material in the casting sol can depend on the volume fraction and size of the silica particles included in the surface modified silica particles. Typically, enough polymerizable material is added such that the shaped gel article is strong enough to be removed from the mold cavity without breaking. In general, gel compositions can be made at silica volume fractions in a range of 1 to 30 volume percent or in a range of 2 to 30 volume percent. At high volume fractions, it may not be necessary to add any polymerizable material to the casting sol to obtain strong gel compositions (i.e., strong shaped gel articles). As the volume fraction of silica decreases, it may be necessary to add polymerizable material to the casting sol for sufficient gel strength. The size of the silica particles can also influence the amount of polymerizable material that is needed. For the same volume fraction of silica, less polymerizable material may be required for smaller particles than for larger ones. That is, the smaller particles often have higher amounts of covalently attached radically polymerizable groups on the surface. For a given silica particle size, the type of surface modification agent(s) can influence the amount of polymerizable material added. In some cases, if the surface modification composition includes a combination of surface modification agents (i.e., a surface modification agent with a radically polymerizable group in combination with the silane surface modification agent without a radically polymerizable group), more polymerizable material may be needed compared to when the surface modification composition includes only a silane surface modification agent with a radically polymerizable group.

Any suitable polymerizable material can be included in the casting sol. As used herein, however, the polymerizable material does not include those that have a silyl group because such compounds are considered to be a silane surface modification agent having a radically polymerizable group. The polymerizable material is often a polar monomer, a monomer having a plurality of radically polymerizable groups, an alkyl (meth)acrylate, a vinyl-containing monomer where the vinyl group is not a (meth)acryloyl group, a thiol-containing monomer, and mixtures thereof.

The overall composition of the polymerizable material is often selected so that the polymerized material is soluble in the organic solvent medium. Homogeneity of the organic phase is often preferable to avoid phase separation of the organic component in the gel composition. This tends to result in the formation of smaller and more homogeneous pores (pores with a narrower size distribution) in the gel composition and in the subsequently formed xerogel or aerogel. Further, the overall composition of the polymerizable material can be selected to adjust compatibility with the organic solvent medium and to adjust the strength, flexibility, and uniformity of the gel composition. Still further, the overall composition of the polymerizable material can be selected to adjust the burnout characteristics of the organic material prior to sintering.

The weight ratio of the organic solvent medium to the polymerizable material is usually at least 1. This weight ratio can help ensure that the viscosity of the casting sol and the volume fraction of silica are in a suitable range. The weight ratio is often at least 1.5, at least 2, at least 2.5, or at least 3 and can be up to 10, up to 8, up to 6, or up to 5. For example, the weight ratio is often in a range of 1 to 10, 1 to 8, 1 to 6, 1 to 5, 1 to 4, 1.5 to 6, 2 to 6, or 2 to 4.

In many embodiments, the polymerizable material includes a monomer having a plurality of polymerizable groups. The number of polymerizable groups can be in a range of 2 to 6 or even higher. In many embodiments, the number of polymerizable groups is in a range of 2 to 5 or 2 to 4. The polymerizable groups are typically (meth)acryloyl groups.

Exemplary monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary monomers with three or four (meth)acryloyl groups include, but are not limited to, trimethylolpropane triacrylate (e.g., commercially available under the trade designation TMPTA-N from Cytec Industries, Inc. (Smyrna, Ga., USA) and under the trade designation SR-351 from Sartomer (Exton, Pa., USA)), pentaerythritol triacrylate (e.g., commercially available under the trade designation SR-444 from Sartomer), ethoxylated (3) trimethylolpropane triacrylate (e.g., commercially available under the trade designation SR-454 from Sartomer), ethoxylated (4) pentaertythriol tetraacrylate (e.g., commercially available under the trade designation SR-494 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), and di-trimethylolpropane tetraacrylate (e.g., commercially available under the trade designation SR-355 from Sartomer).

Exemplary monomers with five or six (meth)acryloyl groups include, but are not limited to, dipentaerythritol pentaacrylate (e.g., commercially available under the trade designation SR-399 from Sartomer) and a hexa-functional urethane acrylate (e.g., commercially available under the trade designation CN975 from Sartomer).

Some polymerizable compositions contain 0 to 100 weight percent of a monomer having a plurality of polymerizable groups based on a total weight of the polymerizable material. For example, the amount can be in a range of 10 to 100 weight percent, 10 to 80 weight percent, 20 to 80 weight percent, 30 to 80 weight percent, 40 to 80 weight percent, 10 to 70 weight percent, 10 to 60 weight percent, 10 to 50 weight percent, or 10 to 40 weight percent. The presence of the monomer having a plurality of polymerizable groups tends to enhance the strength of the gel composition formed when the casting sol is polymerized. Such gel compositions can be easier to remove from the mold without cracking. The amount of the monomer with a plurality of the polymerizable groups can be used to adjust the flexibility and the strength of the gel composition.

In some embodiments, the polymerizable material includes a polar monomer. As used herein, the term "polar monomer" refers to a monomer having a radically polymerizable group and a polar group. The polar group typically contains an acidic group, a hydroxyl group, a primary amido group, a secondary amido group, a tertiary amido group, or an ether group (i.e., a group containing at least one alkylene-oxy-alkylene group of formula —R—O—R— where each R is an alkylene having 1 to 4 carbon atoms).

Suitable polar monomers having an acidic group include, but are not limited to, (meth)acrylic acid, itaconic acid, fumaric acid, crotonic acid, citraconic acid, maleic acid, oleic acid, ß-carboxyethyl acrylate, 2-(meth)acrylamidoethanesulfonic acid, 2-(meth)acrylamido-2-methylpropane sulfonic acid, vinylsulfonic acid, and the like. In many embodiments, the polar monomer with an acidic group is (meth)acrylic acid.

Suitable polar monomers having a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), and hydroxyalkyl (meth)acrylamides (e.g., 2-hydroxyethyl (meth)acrylamide or 3-hydroxypropyl (meth)acrylamide), ethoxylated hydroxyethyl (meth)acrylates (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, and N-octyl (meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Exemplary polar monomers with an ether group include, but are not limited to, alkoxylated alkyl (meth)acrylates such as ethoxyethoxyethyl (meth)acrylate, 2-methoxyethyl (meth)acrylate, and 2-ethoxyethyl (meth)acrylate, and poly (alkylene oxide) (meth)acrylates such as poly(ethylene oxide) (meth)acrylates and poly(propylene oxide) (meth) acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

The amount of a polar monomer is often in a range of 0 to 50 weight percent, 0 to 40 weight percent, 0 to 35 weight percent, 0 to 30 weight percent, 5 to 50 weight percent, 5 to 40 weight percent, 5 to 30 weight percent, 10 to 50 weight percent, 10 to 40 weight percent, 10 to 30 weight percent, 15 to 50 weight percent, 15 to 40 weight percent, or 15 to 30 weight percent based on a total weight of the polymerizable material.

In some embodiments, the polymerizable material includes an alkyl (meth)acrylate or a mixture of alkyl (meth)acrylates. Suitable alkyl (meth)acrylates often have an alkyl group with a linear, branched, or cyclic structure. Examples of suitable alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)

acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isobornyl (meth)acrylate, isononyl (meth)acrylate, isoamyl (meth)acrylate, 3,3,5-trimethylcyclohexyl (meth)acrylate, n-decyl (meth)acrylate, isodecyl (meth)acrylate, isobornyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylate. In some embodiments, the alkyl (meth)acryaltes are a mixture of various isomers having the same number of carbon atoms as described in PCT Publication No. WO 2014/151179. For example, an isomer mixture of octyl (meth)acrylate (Colby et al.) can be used.

The amount of an alkyl (meth)acrylate monomer is often in a range of 0 to 60 weight percent, 0 to 50 weight percent, 0 to 45 weight percent, 0 to 40 weight percent, 5 to 60 weight percent, 5 to 50 weight percent, 5 to 45 weight percent, 5 to 40 weight percent, 10 to 60 weight percent, 10 to 50 weight percent, 10 to 45 weight percent, 10 to 40 weight percent, 15 to 60 weight percent, 15 to 50 weight percent, 15 to 45 weight percent, or 15 to 40 weight percent based on a total weight of the polymerizable material.

The total amount of polymerizable material in the casting sol is in a range of 0 to 40 weight percent based on the total weight of the casting sol. The amount can be at least 1 weight percent, at least 2 weight percent, at least 3 weight percent, at least 5 weight percent, or at least 10 weight percent and up to 35 weight percent, up to 30 weight percent, up to 25 weight percent up to 20 weight percent, or up to 15 weight percent. In some embodiments, the amount is in a range of 0 to 30 weight percent, 0 to 20 weight percent, 0 to 10 weight percent, 1 to 40 weight percent, 1 to 30 weight percent, 1 to 20 weight percent, 5 to 40 weight percent, 5 to 30 weight percent, 5 to 20 weight percent, 10 to 40 weight percent, or 10 to 30 weight percent based on the total weight of the casting sol.

In some applications, it can be advantageous to minimize the weight ratio of polymerizable material to surface modified silica particles in the casting sol. This tends to reduce the amount of decomposition products of organic material that needs to be burned out prior to formation of the sintered article. On the other hand, having a weight ratio of polymerizable materials to surface modified silica particles up to 5 or more can still result in the production of good sintered articles. The weight ratio of polymerizable material to silica particles is often at least 0.05, at least 0.1, at least 0.15, at least 0.2, at least 0.25, at least 0.3, at least 0.4, or at least 0.5 and can be up to 5 or even higher, up to 4, up to 3, up to 2, up to 1.5, or up to 1. For example, the ratio can be in a range of 0.05 to 5, 0.1 to 5, 0.5 to 5, 0.05 to 3, 0.1 to 3, 0.5 to 3, 0.05 to 2, 0.1 to 2, 0.5 to 2, or 0.5 to 1.5.

The casting sol used to form the gel composition contains an initiator for a radical polymerization reaction (e.g., a free radical polymerization reaction). The radical initiator can be either a thermal initiator or a photoinitiator. In many embodiments, the radical initiator is a photoinitiator and the polymerization reaction is initiated by application of actinic radiation. That is, the radically polymerizable groups are polymerized using a photoinitiator rather than a thermal initiator. Surprisingly, the use of a photoinitiator rather than a thermal initiator tends to result in a more uniform cure throughout the gel composition ensuring uniform shrinkage and crack-free articles in subsequent steps involved in the formation of sintered articles. In addition, the outer surface of the cured part is often more uniform and more defect free when a photoinitiator is used rather than a thermal initiator.

Photoinitiated polymerization reactions often lead to shorter curing times and fewer concerns about competing inhibition reactions compared to thermally initiated polymerization reactions. The curing times can be more easily controlled than with thermal initiated polymerization reactions that must be used with opaque casting sols.

In most embodiments, the photoinitators are selected to respond to ultraviolet and/or visible radiation. Stated differently, the photoinitiators usually absorb light in a wavelength range of 200 to 600 nanometers, 300 to 600 nanometers, 300 to 450 nanometers, 400 to 500 nanometers, or 410 to 475 nanometers. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenyl acetophenone (commercially available under the trade designation IRGACURE 651 from BASF Corp. (Florham Park, N.J., USA) or under the trade designation ESACURE KB-1 from Sartomer (Exton, Pa., USA)). Other exemplary photoinitiators are substituted benzophenones such as 1-hydroxycyclohexyl benzophenone (available, for example, under the trade designation "IRGACURE 184" from Ciba Specialty Chemicals Corp., Tarrytown, N.Y.). Still other exemplary photoinitiators are substituted alpha-ketones such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include camphoquinone, bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

Alternatively, suitable thermal initiators include various azo compound such as those commercially available under the trade designation VAZO from E. I. DuPont de Nemours Co. (Wilmington, Del., USA) including VAZO 67, which is 2,2'-azobis(2-methylbutane nitrile), VAZO 64, which is 2,2'-azobis(isobutyronitrile), VAZO 52, which is 2,2'-azobis(2,4-dimethylpentanenitrile), and VAZO 88, which is 1,1'-azobis(cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa.) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

If a thermal initiator is used, the casting sol is often heated to a temperature of at least 40° C. or at least 50° C. and up to 120° C., up to 100° C., up to 80° C., or up to 60° C. For example, the casting sol can be heated in a range of 40° C. to 80° C., in a range of 40° C. to 70° C., in a range of 40° C. to 60° C., in a range of 50° C. to 80° C., in a range of 50° C. to 70° C., or in a range of 50° C. to 60° C. The temperature is held for any suitable time such as at least 30 minutes or at least 60 minutes.

The radical initiator is typically present in an amount in the range of 0.01 to 5 weight percent. For example, the amount of the radical initiator is often at least 0.05 weight percent, at least 0.1 weight percent, at least 0.2 weight percent, or at least 0.5 weight percent. The amount can be up to 4 weight percent, up to 3 weight percent, up to 2.5 weight percent, up to 2 weight percent, or up to 1 weight percent, In some embodiments, the amount of the radical initiator is in a range of 0.05 to 5 weight percent, 0.05 to 4 weight percent, 0.05 to 3 weight percent, 0.05 to 2 weight percent, 0.1 to 5 weight percent, 0.1 to 3 weight percent, 0.1 to 2 weight percent, 0.2 to 5 weight percent, 0.2 to 3 weight percent, 0.2 to 2.5 weight percent, or 0.2 to 2 weight percent based on a total weight of the casting sol.

The casting sol used to form the gel composition can include an optional inhibitor. The inhibitor can help prevent undesirable side reactions and can help moderate the polymerization reaction. The inhibitor is often added prior to evaporation of water and an optional first organic solvent after surface modification of the silica particle with the silane surface modification agent with a radically polymerizable group. The presence of the inhibitor minimizes the extent of premature polymerization reactions during the evaporation step.

Suitable inhibitors are often 4-hydroxy-TEMPO (4-hydroxy-2,6,6-tetramethylpiperidinyloxy) or a phenol derivative such as, for example, butylhydroxytoluene or p-methoxyphenol. The inhibitor is often used in an amount in a range of 0 to 0.5 weight percent based on the weight of the casting sol. For example, the inhibitor can be present in an amount equal to at least 0.001 weight percent, at least 0.005 weight percent, at least 0.01 weight percent. The amount can be up to 1 weight percent, up to 0.5 weight percent, or up to 0.1 weight percent.

Overall, the casting sol that is used to form the gel composition contains (a) 2 to 65 weight percent surface modified silica particles, (b) 0 to 40 weight percent polymerizable material that does not contain a silyl group, (c) 0.01 to 5 weight percent radical initiator, and (d) 30 to 90 weight percent organic solvent medium, wherein each weight percent is based on the total weight of the casting sol. The casting sol includes no more than 50 weight percent silica (which corresponds to no more than 30 volume percent silica).

In some embodiments, the casting sol contains (a) 4 to 45 weight percent surface modified silica particles, (b) 5 to 35 weight percent polymerizable material that does not contain a silyl group, (c) 0.01 to 5 weight percent radical initiator, and (d) 40 to 80 weight percent organic solvent medium, wherein each weight percent is based on the total weight of the casting sol. The casting sol includes no more than 36 weight percent silica (which corresponds to no more than 22 volume percent silica).

In some embodiments, the casting sol contains (a) 10 to 36 weight percent surface modified silica particles, (b) 10 to 30 weight percent polymerizable material that does not contain a silyl group, (c) 0.01 to 5 weight percent radical initiator, and (d) 50 to 70 weight percent organic solvent medium, wherein each weight percent is based on the total weight of the casting sol. The casting sol includes no more than 28 weight percent silica (which corresponds to no more than 17 volume percent silica).

The casting sol can be used to prepare a shaped gel article and then a sintered article. That is, a method of making a sintered article is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) forming a dried shaped gel article by removing the organic solvent medium, (e) removing either the shaped gel article or the dried shaped gel article from the mold cavity, (f) heating the dried shaped gel article to form a sintered article. The sintered article has a shape identical to the mold cavity (except in regions where the mold cavity was overfilled) and to the shaped gel article but reduced in size proportional to an amount of isotropic shrinkage.

The casting sol is placed into a mold cavity prior to curing (i.e., polymerization) to form the gel composition (shaped gel article). The shaped gel article takes on a shape defined by the mold cavity. Each mold has at least one mold cavity. If a photoinitiator is used, the casting sol is typically exposed to ultraviolet and/or visible radiation while in contact with a surface of the mold cavity. If a thermal initiator is used, the casting sol is typically heated while in contact with a surface of the mold cavity. The polymerizable groups (such as the radically polymerizable groups attached to the silica particles and any other optional polymerizable material) within the casting sol undergoes radical polymerization (e.g., free radical polymerization). Because at least some of the polymerizable groups are attached to the surface of the silica particles, polymerization results in the formation of a three-dimensional gel composition that binds together silica particles. This usually leads to a strong and resilient gel composition. This also can lead to homogeneous gel compositions with small, uniform pore sizes that can be sintered at relatively lower temperatures. The silica particles typically do not phase separate during curing to form the gel composition.

The casting sol often has a high optical transmission due to the small size and non-associated form of the surface modified silica particles. High optical transmission of the casting sol can be desirable in the preparation of transparent or translucent sintered articles. As used herein, "optical transmission" refers to the amount of light that passes through a sample (e.g., a silica sol, a casting sol, a gel composition, or a sintered article) divided by the total amount of light incident upon the sample. The percent optical transmission may be calculated using the equation $$100(I/I_O)$$

where I is the light intensity passing though the sample and $I_O$ is the light intensity incident on the sample. Good transmission through the casting sol helps ensure that adequate curing occurs during the formation of the gel composition with ultraviolet radiation and provides a greater depth of cure within the gel composition.

The optical transmission of the casting sol may be determined using an ultraviolet/visible spectrophotometer set, for example, at a wavelength of 420 nanometers or 600 nanometers with a 1 centimeter path length. The optical transmission is a function of the amount of silica particles in the casting sol and the silica particle size. The percent transmission of a casting sol composition containing 20 weight percent silica particles is typically at least 10 percent when measured at 420 nanometers in a 1 centimeter sample cell (i.e., the spectrophotometer has a 1 centimeter path length). In some examples, the percent transmission under these same conditions is at least 15 percent, at least 20 percent, at least 30 percent, at least 40 percent, and at least 50 percent. The percent transmission of a casting sol composition containing 20 weight percent silica particles is typically at least 50 percent when measured at 600 nanometers in a 1 centimeter sample cell. In some examples, the percent transmission under these same conditions is at least 60 percent, at least 70 percent, at least 80 percent, or least 90 percent or higher. The casting sol is translucent and not opaque. In some embodiments, the cured gel compositions are translucent. For example, if the average silica particle size is close to 5 nanometers, the casting sol, the gel composition, the aerogel, the xerogel, and the sintered article can be translucent or transparent.

The transmission of the ultraviolet/visible radiation (in the case of a photoinitiator) or, alternatively, the applied heat (in the case of a thermal initiator) should be sufficiently high to form a gel composition that is uniform. The transmission or applied heat should be sufficient to allow polymerization to occur uniformly throughout the mold cavity. That is, percent cure should be uniform or fairly uniform throughout the gel composition formed within the mold cavity.

The casting sol typically has a viscosity that is sufficiently low so that it can effectively fill small, complex features of a mold cavity. In many embodiments, the casting sols have viscosities that are Newtonian or nearly Newtonian. That is, the viscosity is independent of shear rate or has only a slight dependence on shear rate. The viscosity can vary depending on the percent solids of the casting sol, the size of the silica particles, the composition of the organic solvent medium, the presence or absence of optional non-polymerizable surface modification agents, and the composition of the polymerizable material. In some embodiments, the viscosity is at least 2 centipoises, at least 5 centipoises, at least 10 centipoises, at least 25 centipoises, at least 50 centipoises, at least 100 centipoises, at least 150 centipoises, or at least 200 centipoises. The viscosity can be up to 500 centipoises, up to 300 centipoises, up to 200 centipoises, up to 100 centipoises, up to 50 centipoises, up to 30 centipoises, or up to 10 centipoises. For example, the viscosity can be in a range of 2 to 500 centipoises, 2 to 200 centipoises, 2 to 100 centipoises, 2 to 50 centipoises, 2 to 30 centipoises, 2 to 20 centipoises, or 2 to 10 centipoises.

The combination of low viscosity and small particle size of the silica particles advantageously allows the casting sol to be filtered before polymerization. The casting sol is often filtered prior to placement within the mold cavity. Filtering can be beneficial for removal of debris and impurities that can negatively impact the properties of the gel composition and properties of the sintered article such as optical transmission and strength. Suitable filters often retain material having a size greater than 0.22 micrometers, greater than 0.45 micrometers, greater than 1 micrometer, greater than 2 micrometers, or greater than 5 micrometers. Traditional ceramic molding compositions cannot be easily filtered due to particle size, particle association, and/or viscosity.

In some embodiments, the mold has multiple mold cavities or multiple molds with a single mold cavity can be arranged to form a belt, sheet, continuous web or die that can be used in a continuous process of preparing shaped gel articles.

The mold can be constructed of any material or combinations of materials commonly used for a mold. That is, the mold can be fabricated from a metallic material including an alloy, ceramic material, glass, quartz, or polymeric material. Suitable metallic materials include, but are not limited to nickel, titanium, aluminum, chromium, silicon, iron, carbon steel, and stainless steel. Suitable polymeric materials include, but are not limited to, a silicone, polyester, polycarbonate, poly(ether sulfone), poly(methyl methacrylate), polyurethane, polyvinylchloride, polystyrene, polypropylene, or polyethylene. In some cases, the entire mold is constructed of one or more polymeric materials. In other cases, only the surfaces of the mold that are designed to contact the casting sol, such as the surface of the one or more mold cavities, are constructed of one or more polymeric materials. For example, when the mold is made from metal, glass, ceramic, or the like, one or more surfaces of the mold can optionally have a coating of a polymeric material.

The mold having one or more mold cavities can be replicated from a master tool. The master tool can have a pattern that is the inverse of the pattern that is on the working mold in that the master tool can have protrusions that correspond to the cavities on the mold. The master tool can be made of metal, such as nickel or an alloy thereof, or other materials such as polymeric materials or ceramic materials. To make the mold, a polymeric sheet can be heated and placed next to the master tool. The polymeric sheet can then be pushed against the master tool to emboss the polymeric sheet, thereby forming a working mold. It is also possible to extrude or cast one or more polymeric materials onto a master tool to prepare the working mold. Many other types of mold materials, such as metal, can be embossed by a master tool in a similar manner. Disclosures related to forming working molds from master tools include U.S. Pat. No. 5,125,917 (Pieper), U.S. Pat. No. 5,435,816 (Spurgeon), U.S. Pat. No. 5,672,097 (Hoopman), U.S. Pat. No. 5,946,991 (Hoopman), U.S. Pat. No. 5,975,987 (Hoopman), and U.S. Pat. No. 6,129,540 (Hoopman).

The mold cavity can have any desired three-dimensional shape. Some molds have a plurality of uniform mold cavities with the same size and shape. The mold cavity can have a surface that is smooth (i.e., lacking features) or can have features of any desired shape and size. The resulting shaped gel articles can replicate the features of the mold cavity even if the dimensions are quite small. This is possible because of the relatively low viscosity of the casting sol (casting sol) and the use of silica particles having an average particle size no greater than 100 nanometers. For example, the shaped gel article can replicate features of the mold cavity that have a dimension up to 500 micrometers, up to 100 micrometers, less than 50 micrometers, less than 20 micrometers, less than 10 micrometers, less than 5 micrometers, less than 1 micrometer, or less than 0.5 micrometers.

If a photoinitiator is used, the mold cavity has at least one surface that allows transmission of ultraviolet and/or visible radiation to initiate the polymerization of the casting sol within the mold cavity. In some embodiments, this surface is selected to be constructed of a material that will transmit at least 50 percent, at least 60 percent, at least 70 percent, at least 80 percent, at least 90 percent, or at least 95 percent of the incident ultraviolet and/or visible radiation. Higher transmission may be needed as the thickness of the molded part increases. The surface is often glass or a polymeric material such as polyethylene terephthalate, poly(methyl methacrylate), or polycarbonate.

In some cases, the mold cavity is free of a release agent. This can be beneficial because it can help ensure that the contents of the mold stick to the mold walls and maintain the shape of the mold cavity. In other cases, release agents can be applied to the surfaces of the mold cavity to ensure clean release of the shaped gel article from the mold.

The mold cavity, whether coated with mold release agent or not, can be filled with the casting sol. The casting sol can be placed into the mold cavity by any suitable methods. Examples of suitable methods include pumping through a hose, using a knife roll coater, or using a die such as a vacuum slot die. A scraper or leveler bar can be used to force the casting sol into the one or more cavities, and to remove any of the casting sol that does not fit into the mold cavity.

Any portion of casting sol that does not fit into the one or more mold cavities can be recycled and used again later, if desired. In some embodiments, it may be desirable to form a shaped gel article that is formed from multiple adjacent mold cavities. That is, it may be desirable to allow the casting sol to cover a region between two mold cavities to form a desired shaped gel article.

Because of its low viscosity, the casting sol can effectively fill small crevices or small features in the mold cavity. These small crevices or features can be filled even at low pressures. The mold cavity can have a smooth surface or can have a complex surface with one or more features. The features can have any desired shape, size, regularity, and complexity. The casting sol can typically flow effectively to cover the surface of the mold cavity regardless of the complexity of the shape of the surface. The casting sol is usually in contact with all surfaces of the mold cavity.

Dissolved oxygen can be removed from the casting sol, either before the casting sol is placed within the mold or while the casting sol is in the mold cavity. This can be achieved by vacuum degassing or purging with an inert gas such as nitrogen or argon. Removing dissolved oxygen can reduce the occurrence of unwanted side reactions, particularly unwanted reactions that involve oxygen. Because such side reactions are not necessarily detrimental to the product, and do not occur in all circumstances, removing dissolved oxygen is not required.

Polymerization of the casting sol occurs upon exposure to ultraviolet and/or visible radiation (if a photoinitiator is used) or upon exposure to heat (if a thermal initiator is used) and results in the formation of a gel composition, which is a polymerized (cured) product of the casting sol. The gel composition is a shaped gel article having a shape that is the same as the mold (e.g., the mold cavity). The gel composition is a solid or semi-solid matrix with liquid entrapped therein. The organic solvent medium in the gel composition is mainly the organic solvent such as one that has a boiling point greater than 150° C.

Due to the homogeneous nature of the casting sol and the use of ultraviolet/visible radiation to cure the polymeric material, the resulting gel composition tends to have a homogeneous and crack-free structure. The homogeneous structure has small pores that are fairly uniform in size. This homogeneous structure advantageously leads to low temperature (e.g., less than 1200° C.) isotropic shrinkage during further processing to form a sintered article.

The casting sol typically cures (i.e., polymerizes) with little or no shrinkage. This is beneficial for maintaining the fidelity of the gel composition relative to the mold. Without being bound by theory, it is believed that the low shrinkage may be contributable to the combination of high organic solvent medium concentrations in the gel compositions as well as the bonding of the silica particles together through the polymerized surface modification agent that is attached to the surface of the particles.

Preferably, the gelation process (i.e., the process of forming the gel composition) allows the formation of shaped gel articles of any desired size that can then be processed without inducing crack formation. For example, preferably the gelation process leads to a shaped gel article having a structure that will not collapse when removed from the mold. Preferably, the shaped gel article is stable and sufficiently strong to withstand drying and sintering.

After polymerization, the shaped gel article is treated to remove the organic solvent medium that may be present. This can be referred to as drying the gel composition or the shaped gel article regardless of the method used to remove the organic solvent. The shaped gel article can be removed from the mold prior to drying or, alternatively, drying can occur while the shaped gel article is positioned within the mold and the dried article can be removed from the mold.

In some embodiments, removal of the organic solvent medium occurs by drying the shaped gel article at room temperature (e.g., 20° C. to 25° C.) or at an elevated temperature. Any desired drying temperature up to 200° C. can be used. If the drying temperature is higher, the rate of organic solvent medium removal may be too rapid and cracking can result. The temperature is often no greater than 175° C., no greater than 150° C., no greater than 125° C., or no greater than 100° C. The temperature for drying is usually at least 25° C., at least 50° C., or at least 75° C. A xerogel results from this process of organic solvent removal.

That is, a method of making a xerogel is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) removing the organic solvent medium from the shaped gel article by evaporation to form the xerogel, and (e) removing either the shaped gel article or the xerogel from the mold cavity, wherein the xerogel has a shape identical to the mold cavity (except in regions where the mold cavity was overfilled) and to the shaped gel article but reduced in size proportional to an amount of isotropic shrinkage.

Forming a xerogel can be used for drying shaped gel articles with any dimensions but is most frequently used for the preparation of relatively small sintered articles. As the gel composition dries either at room temperature or at elevated temperatures, the density of the structure increases. Capillary forces pull the structure together resulting in some linear shrinkage such as up to about 35 percent, up to 30 percent or up to 25 percent. The shrinkage is typically dependent on the amount of silica particles present and the overall composition. The linear shrinkage is often in a range of 5 to 35 percent, 10 to 35 percent, 5 to 30 percent, or 10 to 30 percent. Because the drying typically occurs most rapidly at the outer surfaces, density gradients are often established throughout the structure. Density gradients can lead to the formation of cracks. The likelihood of crack formation increases with the size and the complexity of the shaped gel article and with the complexity of the structure. In some embodiments, xerogels are used to prepare sintered bodies having a longest dimension no greater than about 1 centimeter.

In some embodiments, the xerogels contain some residual organic solvent medium. The residual organic solvent medium can be up to 6 weight percent based on the total weight of the xerogel. For example, the xerogel can contain up to 5 weight percent, up to 4 weight percent, up to 3 weight percent, up to 2 weight percent, or up to 1 weight percent organic solvent medium.

If the shaped gel article has fine features that can be easily broken or cracked, it is often preferable to form an aerogel intermediate rather than a xerogel. A shaped gel article of any size and complexity can be dried to an aerogel. An aerogel is formed by drying (e.g., under supercritical conditions) the shaped gel article. A supercritical fluid, such as supercritical carbon dioxide, can be contacted with the shaped gel article in order to remove solvents that are soluble in or miscible with the supercritical fluid. The organic solvent medium can be removed by supercritical carbon dioxide.

That is, a method of making an aerogel is provided. The method includes (a) providing a mold having a mold cavity, (b) positioning a casting sol, which is the same as described above, within the mold cavity, (c) polymerizing the casting sol to form a shaped gel article that is in contact with the mold cavity, (d) removing the organic solvent medium from the shaped gel article by supercritical extraction to form the aerogel, and (e) removing either the shaped gel article or the aerogel from the mold cavity, wherein the aerogel has a shape identical to the mold cavity (except in regions where the mold cavity was overfilled) and to the shaped gel article but reduced in size proportional to an amount of isotropic shrinkage.

There is minimal or no capillary effect for the type of drying used to form an aerogel. The linear shrinkage is often in a range of 0 to 25 percent, 0 to 20 percent, 0 to 15 percent, 5 to 15 percent, or 0 to 10 linear percent. The volume shrinkage is often in a range of 0 to 50 percent, 0 to 40 percent, 0 to 35 percent, 0 to 30 percent, 0 to 25 percent, 10 to 40 percent, or 15 to 40 percent. Both the linear and volume shrinkage are dependent on the percent silica present in the structures as well as the amount and type of polymerizable material and the organic solvent medium composition. The density typically remains uniform throughout the structure. Supercritical extraction is discussed in detail in van Bommel et al., *J. Materials Sci.*, 29, 943-948 (1994), Francis et al., *J. Phys. Chem.*, 58, 1099-1114 (1954) and McHugh et al., *Supercritical Fluid Extraction: Principles and Practice*, Butterworth-Heinemann, Stoneham, Mass., 1986.

The use of the second organic solvent having a boiling point equal to at least 150° C. and miscible in supercritical carbon dioxide advantageously eliminates the need to soak the shaped gel article in a solvent such as alcohol (e.g., ethanol) to replace water prior to supercritical extraction. This replacement is needed to provide a liquid that is soluble with (can be extracted by) the supercritical fluid. The soaking step often results in the formation of a rough surface on the shaped gel article. The rough surface created from the soaking step may result from residue deposition (e.g., organic residue) during the soaking step. Without the soaking step, the shaped gel article can better retain the original glossy surface it had upon removal from the mold cavity.

Supercritical extraction can remove all or most of the organic solvent medium, including any organic solvent having a boiling point equal to at least 150° C. The removal of the organic solvent results in the formation of pores within the dried structure. Preferably, the pores are sufficiently large to allow gases from the decomposition products of the polymeric material to escape without cracking the structure when the dried structure is further heated to burnout the organic material and to form a sintered article.

In some embodiments, the aerogels contain some residual organic solvent medium such as the second organic solvent with a boiling point equal to at least 150° C. The residual organic solvent medium can be up to 6 weight percent based on the total weight of the aerogel. For example, the aerogel can contain up to 5 weight percent, up to 4 weight percent, up to 3 weight percent, up to 2 weight percent, or up to 1 weight percent organic solvent having a boiling point equal to at least 150° C.

In some embodiments, aerogels have a specific surface area (i.e., a BET specific surface area) in a range of 20 $m^2$/gram to 800 $m^2$/gram or in a range of 20 to 600 $m^2$/gram. For example, the surface area is at least 30 $m^2$/gram, at least 40 $m^2$/gram, at least 50 $m^2$/gram, at least 75 $m^2$/gram, at least 100 $m^2$/gram, least 125 $m^2$/gram, at least 150 $m^2$/gram, or at least 175 $m^2$/gram. The surface area can be up to 800 $m^2$/gram, up to 600 $m^2$/gram, up to 550 $m^2$/gram, up to 500 $m^2$/gram, up to 450 $m^2$/gram, up to 400 $m^2$/gram, up to 350 $m^2$/gram, up to 300 $m^2$/gram, up to 275 $m^2$/gram, up to 250 $m^2$/gram, up to 225 $m^2$/gram, or up to 200 $m^2$/gram.

The volume percent silica in the xerogel is often in a range of 1 to 45 volume percent. For example, the volume percent of the silica is often at least 2 volume percent, at least 3 volume percent, at least 4 volume percent or at least 5 volume percent. Xerogels having a lower volume percent silica tend to be quite fragile and may crack during supercritical extraction or subsequent processing. Additionally, if there is too much polymeric material present, the pressure during subsequent heating may be unacceptably high resulting in the formation of cracks. Xerogels with more than 45 volume percent silica content tend to crack during the calcination process when the polymeric material decomposes and vaporizes. It may be more difficult for the decomposition products to escape from the denser structures. The volume percent silica is often up to 40 volume percent, up to 40 volume percent, up to 35 volume percent, up to 30 volume percent, up to 25 volume percent, up to 20 volume percent, up to 15 volume percent, or up to 10 volume percent. The volume percent is often in a range of 3 to 45 volume percent, 3 to 40 volume percent, 3 to 35 volume percent, 3 to 30 volume percent, 3 to 25 volume percent, 3 to 20 volume percent, 3 to 15 volume percent, 4 to 40 volume percent, 4 to 20 volume percent, 5 to 40 volume percent, or 5 to 20 volume percent.

The volume percent silica in the aerogel is often in a range of 1 to 35 volume percent. For example, the volume percent of the silica is often at least 2 volume percent, at least 3 volume percent, at least 4 volume percent or at least 5 volume percent. Aerogels having a lower volume percent silica tend to be quite fragile and may crack during supercritical extraction or subsequent processing. Additionally, if there is too much polymeric material present, the pressure during subsequent heating may be unacceptably high resulting in the formation of cracks. Aerogels with more than 35 volume percent silica content tend to crack during the calcination process when the polymeric material decomposes and vaporizes. It may be more difficult for the decomposition products to escape from the denser structures. The volume percent silica is often up to 30 volume percent, up to 25 volume percent, up to 20 volume percent, up to 15 volume percent, or up to 10 volume percent. The volume percent is often in a range of 3 to 35 volume percent, 3 to 30 volume percent, 3 to 25 volume percent, 3 to 20 volume percent, 3 to 15 volume percent, 4 to 35 volume percent, 4 to 20 volume percent, 5 to 35 volume percent, 5 to 30 volume percent, or 5 to 20 volume percent.

After removal of the organic solvent medium, the resulting xerogel or aerogel is heated to remove the polymeric material or any other organic material that may be present and to build strength through densification. The majority of the polymeric material is removed by the time the temperature reaches 600° C. and/or by holding the temperature at 600° C. The rate of temperature increase is usually carefully controlled so that the pressure resulting from the decomposition and vaporization of the organic material does not result in pressures within the structures sufficient to generate cracks. Thermogravimetric analysis and dilatometry can be used to determine the appropriate rate of heating. These techniques track the weight loss and shrinkage that occur at different heating rates. The heating rates in different temperature ranges can be adjusted to maintain a slow and near constant rate of weight loss and shrinkage until the organic material is removed. Careful control of organic removal facilitates the formation of sintered articles with minimal or no cracking.

In some embodiments, the temperature is first increased from about 20° C. to about 200° C. at a moderate rate such as in a range of 10° C./hour to 30° C./hour. This is followed by increasing the temperature to about 400° C., to about 500° C., or to about 600° C. relatively slowly (e.g., at a rate of 1° C./hour to less than 10° C./hour). This slow heating rate facilitates vaporization of the organic material without cracking the structure. The density of the shaped article at this point is often less than 40 percent of theoretical density. For some applications where porosity is desired, no further densification may be necessary.

In some embodiments, the sample is further densified (sintered) to provide an article having a density in a range of 40 percent to 93 percent of theoretical density. Such articles will typically have pores open to the surface and may be suitable for various applications such as, for example, catalysis and filtration. To prepare articles within this density range, the temperature is often raised up to 900° C., up to 950° C., up to 975° C., up to 1000° C., or up to 1025° C. The rate of temperature increase can be constant or can be varied over time. The temperature can be increased to a certain temperature, held at that temperature for a period of time, and then increased further at the same rate or at a different rate. This process can be repeated multiple times, if desired. In some example, the temperature is gradually increased from 600° C. to a temperature in the range of 900° C. to 1025° C. (e.g., 50° C./hour to 100° C./hour). The temperature often can be increased rapidly such as at a rate greater than 50° C./hour (e.g., 50° C./hour to 600° C./hour). The temperature can be held at any temperature for up to 5 minutes, up to 10 minutes, up to 20 minutes, up to 30 minutes, up to 60 minutes, or up to 120 minutes or even longer. The sintering can occur under atmospheric conditions (no special environmental conditions are required).

If a sintered article having a density greater than 93 percent of the theoretical density (such in a range of 95 to 99.9 percent of theoretical density) is desired, the article is often cooled after being heated sufficiently to achieve a density in a range of 40 to 93 percent of theoretical density. This cooled article optionally can be soaked in an acidic solution such as an aqueous solution of nitric acid. Soaking can be effective in removing undesirable ionic impurities because of the porous nature of the articles at this stage of the process. If ionic impurities are not removed, they can nucleate crystallization of the silica during sintering. The crystallization can lead to opacity, cracking, and warpage in the final article.

More specifically, the cooled article can be soaked in an aqueous solution of 1.4 weight percent nitric acid. This soaking step is often for at least 8 hours, at least 16 hours, or at least 24 hours. After soaking, the article is removed from the nitric acid solution and washed thoroughly with water. The article then can be soaked in water for any desired period of time such as at least 30 minutes, at least 1 hour, at least 2 hours, or at least 4 hours. In some cases the water soak can be up to 24 hours or greater. The soaking in water step can be repeated several times, if desired, by replacing the water with fresh water. The soaking time often depends on the size of the sample.

After soaking, the article is typically dried in an oven to remove the water. For example, the article can be dried by heating in an oven set at a temperature equal to at least 80° C., at least 90° C., or at least 100° C. For example, the temperature can be in a range of 80° C. to 150° C., 90° C. to 150° C., or 90° C. to 125° C. for at least 30 minutes, at least 60 minutes, or at least 120 minutes.

After the optional soaking step, the dried article is usually sintered to a density equal to at least 95 percent of the theoretical density. Conditions are selected to avoid and/or minimize crystallization of silica. The presence of crystalline silica can decrease translucency, result in the formation of cracks, and result in warpage or distortion of the shape. The temperature is often raised up to 1200° C., up to 1175° C., up to 1150° C., up to 1125° C., up to 1100° C., up to 1075° C., up to 1050° C., or up to 1025° C. The rate of heating can typically be quite rapid such as at least 100° C./hour, at least 200° C./hour, at least 400° C./hour, or at least 600° C./hour. The temperature can be held for any desired time to produce sintered articles having the desired density. In some embodiments, the temperature is held for at least 1 hour, at least 2 hours, or at least 4 hours. The temperature can be held for 24 hours or even longer, if desired. The density of the dried article increases during the sintering step and the porosity is substantially reduced. The sintering can occur under atmospheric conditions (no special environmental conditions are required). Advantageously, sintering occurs at no greater than 1200° C. This allows the use of less expensive furnaces.

In many embodiments, the sintered article has a density that is at least 99 percent of the theoretical value. For example, the density can be at least 99.2 percent, at least 99.5 percent, at least 99.6 percent, at least 99.7 percent, at least 99.8 percent, at least 99.9 percent, or at least 99.95 percent or even at least 99.99 percent of the theoretical density. As the density approaches the theoretical density, the translucency of the sintered articles tends to improve. Sintered articles having a density that is at least 99 percent of the theoretical density often appear translucent or transparent to the human eye.

The sintered article usually contains amorphous silica. At least 90 weight percent, at least 92 weight percent, at least 95 weight percent, at least 96 weight percent, at least 97 weight percent, at least 98 weight percent, at least 99 weight percent, at least 99.5 weight percent, at least 99.9 weight percent, or 100 weight percent of the silica is amorphous. The amorphous character allows the sintered article to appear translucent or transparent to the human eye. That is, crystalline material tends to decrease transmission of visible light through the sintered article.

The transmission, absorbance, and reflectance of light through the sintered article is often comparable to that of fused quartz in the visible range of the electromagnetic spectrum above 450 nanometers (e.g., in the range of 450 to 750 nanometers) and in the near infrared range of the electromagnetic spectrum above 750 nanometers (e.g., in the range of 750 to 1650 nanometers). Thus, the sintered articles can be used in many applications where fused quartz is used. The transmission is typically higher when smaller silica particles such as those having an average diameter close to 5 nanometers are used when near theoretical density is not achieved. Additionally, the transmission is typically improved by decreasing porosity (i.e., by sintering to a density closer to theoretical density).

The shape of the sintered article is typically identical to that of the shaped gel article. Compared to the shaped gel article, the sintered article has undergone isotropic size reduction (i.e., isotropic shrinkage). That is, the extent of shrinkage in one direction is within 5 percent, within 2 percent, within 1 percent, or within 0.5 percent of the shrinkage in the other two directions. Stated differently, a net shaped sintered article can be prepared from the shaped gel articles. The shaped gel articles can have complex features that can be retained in the sintered article but with smaller dimensions based on the extent of isotropic shrinkage. That is, net shaped sintered articles can be formed from the shaped gel articles.

The amount of isotropic linear shrinkage between the shaped gel article and the sintered article is often in a range of 30 to 80 percent or in a range of 45 to 55 percent. The amount of isotropic volume shrinkage is often in a range of 70 to 99 percent, 80 to 95 percent, or 85 to 95 percent. These large amounts of isotropic shrinkage result from the relatively low amount of silica particles (1 to 30 volume percent) included in the casting sol used to form the gel composition (shaped gel article). Conventional teaching has been that high volume fractions of the inorganic oxides are needed to obtain fully dense sintered articles. Surprisingly, gel compositions can be obtained from casting sols with a relatively low amount of the silica particles that are sufficiently strong to be removed from molds (even molds having intricate and complex shapes and surfaces), dried, heated to burnout organic matter, and sintered without cracking. It is also surprising that the shape of the sintered articles can match that of the shaped gel article and the mold cavity so well in spite of the large percent shrinkage. The large percent shrinkage can be an advantage for some applications. For example, it allows the manufacture of smaller parts than can be obtained using many other ceramic molding processes.

The isotropic shrinkage tends to lead to the formation of sintered articles that are typically free of cracks and that have a uniform density throughout. Any cracks that form are often associated with cracks that result from the removal of the shaped gel article from the mold cavity rather than cracks that form during formation of the aerogel or xerogel, during burnout of the organic material, or during the sintering process. In some embodiments, particularly for larger articles or for articles with complex features, it may be preferable to form an aerogel rather than a xerogel intermediate.

Sintered articles with any desired size and shape can be prepared. The longest dimension can be up to 1 centimeter, up to 2 centimeters, up to 5 centimeters, or up to 10 centimeters or even longer. The longest dimension can be at least 1 centimeter, at least 2 centimeters, at least 5 centimeters, at least 10 centimeters, at least 20 centimeters, at least 50 centimeters, or at least 100 centimeters.

The sintered articles can have smooth surfaces or surfaces that include various features, such as the surface features described herein. The features can have any desired shape, depth, width, length, and complexity. For example, the features can have a longest dimension less than 500 micrometers, up to 100 micrometers, less than 50 micrometers, less than 25 micrometers, less than 10 micrometers, less than 5 micrometers, less than 1 micrometer, or less than 0.5 micrometers. Stated differently, sintered articles having a complex surface or multiple complex surfaces can be formed from a shaped gel article that has undergone isotropic shrinkage.

The sintered articles are net shaped articles formed from the shaped gel articles, which are formed within a mold cavity. The sintered article can often be used without any further milling or processing because they so closely mimic the shape of the shaped gel article, which has the same shape as the mold cavity used in its formation.

The sintered articles are typically strong and translucent or transparent. These properties are the result, for example, of starting with a silica sol that contains colloidal silica particles that are non-associated. These properties are also the result of preparing a gel composition that is homogenous. That is, the density and composition of the gel composition are uniform throughout the shaped gel article. These properties are also the result of preparing a dried gel shaped article (either a xerogel or aerogel) that has small uniform pores throughout. These pores are removed by sintering to form the sintered article. The sintered articles can have a high theoretical density.

In more detail, as stated previously, the splice element and other devices described herein can include an optical adhesive that comprises an adhesive composition containing silica nano-particles dispersed therein, such as non-aggregated, surface-modified silica nano-particles. Such further detail is hereby provided.

Description of the Optical Adhesive

The exemplary adhesive may be used to join at least one optical fiber to a second optical signal transfer media. The second signal transfer media may be a second optical fiber, an optical wave guide, a lens, and an opto-electric transceiver. The interconnection point between the at least one optical fiber to a second optical signal transfer media may be used in either an indoor or an outdoor environment.

When the exemplary adhesive is used to interconnect two optical fibers it will result in a permanent optical fiber splice. In this configuration, some of the adhesive may be disposed in the optical signal path. Thus, the exemplary adhesive should have high optical transmission (>98%) at the wavelength of the signal to be carried by the optical fiber and should be index matched to core of the optical fiber +/−0.5%, preferably +/−0.1% of the index of the core of the fiber to reduce signal losses due to back reflection. For multimode fiber, the telecommunication wavelengths are 850 nm and 1300, and for single mode optical fiber, the telecommunication wavelength band about is 1250 nm-1675 nm.

Alternatively, a non-indexed matched adhesive can be utilized, especially when splicing angle-cleaved fibers.

In many optical applications, the adhesive bond is desirably thermally stable. The adhesive bond desirably does not allow movement of the optical fibers under a mechanical load. The fiber retention of the adhesive should be at least 1.5 lbs.

The exemplary adhesive should have a low do/dT so that adhesive remains index matched to the optical fibers over the outside plant temperature conditions. Thus, the adhesive should have a low thermal expansion (i.e. less than 30 ppm) and a glass transition temperature of at least 50° C.

In use, the exemplary adhesive will be used to join two optical fibers in a splice device. The exemplary adhesive can be disposed in at least a portion of the fiber alignment groove or channel.

The exemplary adhesive should meet the fiber pullout strength requirements of the outside plant optical fiber splice standard, without requiring a long-term external mechanical clamp to hold the splice plates of the exemplary splice device. The adhesive will be preloaded into the splice device at the factory, eliminating need for field craft to mix or dispense. Thus the rheology of the uncured exemplary adhesive should be such that the adhesive does not migrate prior to the creation of the optical fiber splice and curing of the adhesive. Because the exemplary device may be made in the field, the tools required to activate the cure of the adhesive should be simple and safe to use in the field. As a result, in some cases, UV curable and thermally curable adhesive formulations are less desirable than formulations providing for visible light curable adhesive.

Preferably, the adhesive is curable by light of wavelengths from about 400 nm to about 700 nm, preferably from about 400 nm to about 600 nm, which includes a portion of the blue and green area of the spectrum, most preferably more preferably between 430 nm to about 480 nm. Thus, adhesive compositions described herein can be epoxy based adhesives that utilize a blue light curing mechanism to cure the adhesive. These exemplary adhesives offer the advantages of rapid cure (less than 60 seconds, preferably less than 45 seconds, more preferably less than 30 seconds) while avoiding the mixing, dispensing and heating required by conventional optical adhesives and the adhesive performs well over the broad temperature range dictated by the outside plant optical fiber splicing standards.

While a blue light cure adhesive is described above, in alternative aspects, the adhesive can comprise a UV-cure adhesive or a thermal cure adhesive.

The exemplary adhesives are highly filled to reduce the thermal expansion of the cured adhesive and lower the do/dT of the adhesives. There are many commercially available adhesives that have a low coefficient of thermal expansion which incorporate conventional fillers such as alumina, quartz or other inorganic particles. These conventional fillers are unacceptable for applications where optical transmission through the adhesive is required. Because the average size of these fillers is generally larger than optical wavelengths (e.g., wavelengths in the visible or infrared regions of the electromagnetic spectrum), the fillers scatter the light and prevent the transmission of the light through the adhesive. The use of nanoparticle fillers over the micron sized filler particles commonly used in commercial index matching gels allows more intimate optical fiber contact between the end faces of the optical fibers being joined.

The need for a low refractive index precludes the use of common phenol based epoxy materials such diglycidyl ethers of bisphenol A, diglycidyl ethers of bisphenol F, novolac epoxy resins, resorcinol based epoxy resins, etc.

Suitable epoxy resins for use in the exemplary adhesive should have a refractive index less than 1.500 and can include monomeric or oligomeric epoxy compounds that can be aliphatic, alicyclic, or heterocyclic. The terms "epoxy resin" and "epoxide" and "epoxy-containing material" are used interchangeably. These materials generally have, on the average, more than 1 polymerizable epoxy group per molecule. Some epoxy resins have at least 1.5 or at least 2 polymerizable epoxy groups per molecule. The average molecular weight of the epoxy-containing materials can vary from about 58 g/mole to about 1000 g/mole or more.

Some suitable epoxy resins include vinylcyclohexene dioxide; 3,4-epoxycyclohexylmethyl-3,4-epoxycyclohexane carboxylate; bis(3,4-epoxy-6-methylcyclohexylmethyl) adipate; bis(2,3-epoxycyclopentyl) ether; aliphatic epoxy modified from polypropylene glycol; dipentene dioxide; epoxy functional silicone containing resins; bis(3,4-epoxycyclohexyl)adipate; 2-(3,4-epoxycyclohexyl-5,5-spiro-3,4-epoxy) cyclohexane-meta-dioxane; vinylcyclohexene monoxide; polyfunctional glycidyl ethers such as diglycidyl ether of 1,4-butanediol; diglycidyl ether of neopentyl glycol; diglycidyl ether of cyclohexanedimethanol; trimethylol ethane triglycidyl ether; trimethylol propane triglycidyl ether and the like.

Still other useful epoxy resins include epoxy-functional silicones such as those described in U.S. Pat. No. 4,279,717 (Eckberg et al.), which are commercially available from the General Electric Company. These epoxy resins are polydimethylsiloxanes in which 1 to 20 mole percent of the silicon atoms have been substituted with epoxyalkyl groups (preferably, epoxy cyclohexylethyl, as described in U.S. Pat. No. 5,753,346 (Leir et al.)). Some exemplary materials can include 1,3-di[2-(3,4-epoxycyclohexyl)ethyl]-1,1,3,3-tetramethyldisiloxane and epoxypropoxypropyl terminated polydimethysiloxane.

In some embodiments, the adhesive composition contains at least 25 wt. %, at least 30 wt. %, at least 35 wt. % or at least 40 weight percent epoxy resin based on the weight of the adhesive composition. Some adhesive compositions contain, up to 45 wt. %, or up to 40 wt. % epoxy resin. For example, the adhesive compositions can contain 25 wt. % to 45 wt. %, 30 wt. % to 45 wt. %, 25 wt. % to 40 wt. %, or 30 wt. % to 40 wt. % epoxy resin based on the weight of the adhesive composition.

The adhesive composition can further include a polyol in addition to the epoxy resin. As used herein, the term "polyol" refers to an organic compound having two or more hydroxy groups. The polyol can be added as a chain extender for the epoxy resin and can be a source of protons for the cationic polymerization reaction. When a polyol is added, any process used to remove water and the optional water-miscible solvent is conducted either prior to the addition of the polyol or under conditions that do not remove the polyol.

Suitable diols (i.e., polyols with two hydroxy groups) include, but are not limited to, 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, sorbitol, diethylene glycol, triethylene glycol, tetraethylene glycol, glycerine, 2-ethyl-2-(hydroxymethyl)-1,3-propanediol, 2-ethyl-1,3-pentanediol, 1,4-cyclohexanedimethanol, and 1,4-benzene-dimethanol.

When a polyol is present in the adhesive composition, the polyol is typically present in an amount, up to 10 wt. %, or up to 5 wt. % based on the weight of the adhesive composition. The polyol can be present in an amount of at least 0.5 wt. %, at least 1 wt. %, at least 2 wt. %, or at least 3 wt. % based on the weight of the adhesive composition. The polyol is often present in an amount of 0.5 wt. % to 10 wt. %, 1 wt. % to 10 wt. %, 0.5 wt. % to 5 wt. %, or 1 wt. % to 5 wt. % based on the weight of the adhesive composition.

The adhesive composition contains surface-modified nanoparticles, in particular surface-modified silica nanoparticles. The surface-modified nanoparticles are added to the exemplary adhesive to modify the adhesive's mechanical, thermal and optical properties. For example, the surface-modified nanoparticles can be added to the adhesive to reduce the coefficient of thermal expansion (CTE) of the adhesive. The CTE of an unfilled epoxy can be greater than 60 μm/m-° C. When bonding an optical fiber to a rigid substrate, the CTE of the adhesive should be as low as possible so that the adhesive does not exert undue forces on the fiber due to changing temperature which could result in signal loss or breakage of the optical fiber. In order to make a significant change to the CTE of the adhesive, the adhesive needs to be highly loaded with a filler having a low CTE. However, the addition of high levels of nanoparticles can have a detrimental effect on the rheology of the particle-loaded adhesive which can make it difficult to dispense or complicate insertion of the fiber into the adhesive. For example, at high loadings, the viscosity of a resin system can become excessively high, even to the point of becoming gel-like. It is well-known that the smaller the nanoparticle size, the lower the particle loading must be to avoid excessive viscosity build. In addition, the presence of nanoparticles can lead to viscosity increases with increases in temperature, shear rate, or both.

To overcome these effects, the exemplary adhesive composition contains a combination of two different sized, surface-modified silica nanoparticles, or in other words comprises a bimodal distribution of surface-modified silica nanoparticles. As used herein, the term "surface modified nanoparticles" refer to the attachment of surface treatment agents into the surface of the nanoparticle. The term "nanoparticles" refer to particles having an average diameter no greater than 500 nm. The term "diameter" refers not only to the diameter of substantially spherical particles but also to the longest dimension of non-spherical particles.

The term "bimodal distribution of surface-modified silica nanoparticles" refers to a collection of particles having particles with two primary sizes. In some embodiments, the bimodal distribution of the surface-modified nanoparticles can have first particles having a first average particle size, D1, between 70 nm and 200 nm, inclusive. In some embodiments, the first average particle size of the first particles is at least 70 nm, at least 80 nm, or even at least 90 nm. In some embodiments, the first average particle size of the first particles is no greater than 200 nm, no greater than 150 nm, or even no greater than 100 nm.

The bimodal distribution of the surface-modified nanoparticles of the present disclosure also includes second particles having a second average particle size. The second average diameter, D2, of the second particles is less than the first average diameter of the first particles (i.e. D2<D1). In some embodiments, the second average particle size of the second particles, is no greater than 60 nm, e.g., no greater than 50 nm, or no greater than 30 nm. In some embodiments, D2 is at least 5 nm, e.g., at least 10 nm, or even at least 20 nm. In some embodiments, D2 is between 15 and 60 nm, inclusive.

As described herein, the sizes of the first and second particles are defined relative to each other such that the first average particle size of the first particles, D1, is greater than the second average particle size of the second particles, D2. In some embodiments, the ratio of the first average particle size of the first particles to the second average particle size of the second particles, D1:D2, is at least 2:1. Generally, the ratio of D1:D2 is no greater than 7:1. In some embodiments, the ratio of D1:D2 is between 2:1 and 7:1.

As used herein, the weight percent of nanoparticles in the adhesive composition is based on all nanoparticles present in the adhesive composition. Generally, the percent by weight of nanoparticles is based on the combined weight of the resin component and the nanoparticles in the adhesive composition, and is no greater than 70 wt. %. In some embodiments, the adhesive composition contains at least at least 40 wt. % of nanoparticles.

The use of nanoparticles in adhesive compositions is of particular interest when working in optical communication applications. Because the wavelengths of light used in optical communication applications are longer than the diameter of the silica nanoparticles (e.g., the wavelengths used are often about 10 to 20 times longer than the average diameter of the silica nanoparticles), the silica nanoparticles typically do not scatter the optical signal when it passes through an adhesive with nanoparticles. More particularly, the silica nanoparticles usually allow high transmission of visible and infrared wavelengths of light through the adhesive.

Suitable silica nanoparticles are often available in the form of a sol, which is a colloidal dispersion of amorphous silica nanoparticles in a liquid medium. The liquid medium can be water, an organic solvent, or water/organic solvent mixture.

It is preferable that the silica nanoparticles have a relatively uniform size (i.e., diameter) and remain non-aggregated in the liquid medium, (i.e. less than 1 wt. %, less than 0.5 wt. %, or less than 0.2 wt. % of the silica nanoparticles in the adhesive composition are aggregated). As used herein, the term "non-aggregated" means that the silica nanoparticles or the surface-modified silica nanoparticles are substantially free of aggregated nanoparticles, which refers to clusters or clumps or nanoparticles that are firmly associated with one another and that can typically only be separated with high shear. Particle aggregation can result in precipitation, gellation, a substantial viscosity increase, or light scattering in the final adhesive composition Silica hydrosols, having water as the liquid medium, are commercially available in a variety of particle sizes and concentrations from Nyacol Products, Inc. (Ashland, Md.), Nalco Chemical Co. (Naperville, Ill.), and DuPont Chemical Co. (Wilmington, Del.). The concentration of silica nanoparticles is often in the range of 10 to 50 wt. % based on the weight of the hydrosol. Concentrations of silica nanoparticles in the range of 30 to 50 wt. % based on the weight of the hydrosol are often preferred because less water needs to be removed after surface modification.

The silica nanoparticles are surface modified using a surface modification mixture that contains (a) silica nanoparticles, (b) a silane surface modifying agent in a sufficient amount to form a monolayer on the surface of the silica nanoparticles, (c) an excess amount of water, and (d) an optional water-miscible solvent. After reaction with the surface modifying agent, the silica nanoparticles are typically non-aggregated and usually have a monolayer of the surface-modifier covalently attached to the surface.

Suitable silane surface modifying agents include, but are not limited to, alkyltrialkoxysilanes such as methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, butyltrimethoxysilane, butyltriethoxysilane, hexyltrimethoxysilane, n-octyltrimethoxysilane, n-octyltriethoxysilane, isooctyltrimethoxysilane, dodecyltrimethoxysilane, and octadecyltrimethoxysilane; aryltrialkoxysilanes such as styrylethyltrimethoxysilane, phenyltrimethoxysilane, phenyltriethoxysilane, and p-tolyltriethoxysilane; 3-glycidoxypropyltrialkoxysilane such as glycidoxypropyltrimethoxysilane; alkyltrichlorosilanes such as methyltrichlorosilane; aryltrichlorosilanes such as phenyltrichlorsilane, phenylethyltrichlorosilane, phenoxytrichlorosilane, and p-tolyltrichlorosilane; and combinations thereof.

The surface modification mixture contains water and an optional water-miscible solvent. Suitable optional water-miscible solvents include, but are not limited to, alcohols (e.g., methanol, ethanol, n-propanol, isopropanol, 1-methoxy-2-propanol, or butanol), ethers (e.g., diethyl ether or tetrahydrofuran), dimethylformamide, dimethylsulfoxide, acetonitrile, and the like. The optional water-miscible solvent is typically chosen to have a boiling point that allows removal at a temperature suitable for removal of the water.

In some embodiments, there is no optional water-miscible solvent in the surface-modification mixture. In other embodiments, the volume ratio of water to water-miscible solvent is at least 99:1 (i.e., 99 parts of water to 1 part water-miscible solvent), at least 98:2, at least 95:5, at least 90:10, at least 85:15, at least 80:20, at least 75:25, at least 70:30, at least 65:35, at least 60:40, at least 55:45, at least 50:50, at least 45:55, or at least 40:60. The optional water-miscible solvent can be used to increase the solubility of the surface modifying agent.

Suitable reaction conditions (e.g. time and temperature) for covalently bonding the surface modification agent to the surface of the silica nanoparticles can vary depending on the presence or absence of a water-miscible solvent, the nature of the water-miscible solvent, and the presence or absence of a catalyst to accelerate the reaction. The catalyst can include, but is not limited to, ammonia, amines and fluoride ions.

The surface-modified silica nanoparticles are dispersed in an epoxy resin. At least most of the water and optional water-miscible solvent in the surface-modification mixture is removed by evaporation or distillation. The removal of the water and optional water-miscible solvent can occur either before or after addition of the epoxy resin (i.e., either before or after formation of the dispersion). Suitable methods of removing the water and optional water-miscible solvent include, but are not limited to, rotary evaporation, thin film evaporation, simple distillation, azeotropic distillation, or spray drying.

The adhesive composition often contains at least 50 wt. %, at least 55 wt. %, at least 60 wt. %, or at least 70 wt. % surface-modified silica nanoparticles based on the weight of the adhesive composition. Some adhesive compositions contain up to 75 wt. %, up to 70 wt. %, up to 65 wt. %, or up to 60 wt. % surface-modified silica nanoparticles. For example, the adhesive composition can contain 50 to 75 wt. %, 50 to 70 wt. %, 50 to 65 wt. %, 55 to 65 wt. %, or 55 to 75 wt. % surface-modified silica nanoparticles.

The photoinitiator system can initiate the cationic polymerization of the exemplary adhesive formulation and more preferably will accelerate the polymerization. The photoinitiator system is one which is capable of light absorption in the visible range, i.e., between about 400 nm and about 700 nm. In preferred assemblies, the photoinitiator absorbs light between about 400 nm and about 600 nm, more preferably between 500 nm to about 600 nm, in the green and a portion of the blue portion of the spectrum. Components in the photoinitiator system include at least one initiator, at least one sensitizer, and optionally, an electron donor.

Useful sensitizers should be soluble in the epoxy monomers, capable of light absorption in the appropriate wavelengths, and shelf stable for reasonable periods of time.

Suitable sensitizers are believed to include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones), ketocoumarins, aminoarylketones and p-substituted aminostyryl ketone compounds are preferred sensitizers. For applications requiring high sensitivity, it is preferred to employ a sensitizer containing a julolidinyl moiety. For applications requiring deep cure (e.g., where the adhesive or the substrates attenuate radiation of similar wavelengths), it is preferred to employ sensitizers having an extinction coefficient below about 1000, more preferably below about 100, at the desired wavelength of irradiation for photopolymerization.

Suitable ketones of the above formula include monoketones such as 2,2-dihydroxybenzophenone, 4,4-dihydroxybenzophenone, or 2,4-dihydroxybenzophenone, di-2-pyridyl ketone, di-2-furanyl ketone, di-2-thiophenyl ketone, benzoin, fluorenones, quinones, e.g., chloroquinone, 2-aza-3-carboxy-9-fluorenone, and the like, chalcone, Michler's ketone, 2-fluoro-9-fluorenone, 2-chlorothioxanthone, acetophenone, benzophenone, 1- or 2-acetonaphthone, 9-acetylantracene, 2-acetylphenanthrene, 3-acetylphenanthrene or 9-acetylphenanthrene, 4-acetylbiphenyl, propiophenone, n-butyrophenone, valerophenone, 2-acetylpyridine, 3-acetylpyridine or 4-acetylpyridine, 3-acetylcoumarin and the like. Suitable diketones include aralkyldiketones such as anthraquinone, phenanthrenequinone, o-, m- and p-diacetylbenzene, 1,3-diacetylanthracene, 1,4-diacetylanthracene, 1,5-diacetylanthracene, 1,6-diacetylanthracene, 1,7-diacetylanthracene and 1,8-diacetylnaphthalene, 1,5-diacetylanthracene, 1,8-diacetylanthracene and 9,10-diacetylanthracene, and the like. Suitable α-diketones include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-dihydroxylbenzil, 3,3'-dihydroxylbenzil and 4,4'-dihydroxylbenzil, furil, di-3, 3'-indolylethanedione, 2,3-bornanedione (camphorquinone), 1,2-cyclohexanedione, 1,2-naphthaquinone, acenaphthaquinone, and the like.

In one aspect, the sensitizer can be initially colored prior to curing of the adhesive composition, undergo a reaction when exposed to the activating light which results in a color change to indicate the onset of cure in the adhesive composition. Other sensitizers could optionally include Rose Bengal, Methylene Violet, Fluorescein, Eosin Yellow, Eosin Y, Ethyl Eosin, Fosin Bluish, Erythrosin Yellowish Blend, 4',5'-Dibromofluorescein.

The photoinitiator system can also include an electron donor. A wide variety of donors can be used; the donor should be soluble in the monomer, and have good shelf stability. Suitable donors are capable of increasing the speed of cure or depth of cure of a composition upon exposure to light of the desired wavelength.

The optional electron donors can include amines (including aminoaldehydes and aminosilanes), amides (including phosphoramides), anthrocenes, ethers (including thioether), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid, and salts of tetraphenylboronic acid. The donor can be unsubstituted or substituted with one or more non-interfering substituents. Particularly preferred donors contain an electron donor atom such as a nitrogen, oxygen, phosphorus, or sulfur atom, and an abstractable hydrogen atom bonded to a carbon or silicon atom alpha to the electron donor atom.

Preferred amine donor compounds include alkyl-, aryl-, alkaryl- and aralkyl-amines such as methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl-1,6-hexanediamine, piperazine, 4,4'-trimethylenedipiperidine, 4,4'-ethylenedipiperidine, p-N,N-dimethylaminophenethanol and p-N,N-dimethylaminobenzonitrile; aminoaldehydes such as p-N,N-dimethylaminobenzaldehyde, p-N,N-diethylaminobenzaldehyde, 9-julolidine carboxaldehyde and 4-morpholinobenzaldehyde; and aminosilanes such as trimethylsilylmorpholine, trimethylsilylpiperidine, bis(dimethylamino)diphenylsilane, tris(dimethylamino)methylsilane, N,N-diethylaminotrimethylsilane, tris(dimethylamino)phenylsilane, tris(methylsilyl)amine, tris(dimethylsilyl)amine, bis(dimethylsilyl) amine, N,N-bis(dimethylsilyl)aniline, N-phenyl-N-dimethylsilylaniline and N,N-dimethyl-N-dimethylsilylamine. Tertiary aromatic alkylamines, particularly those having at least one electron-withdrawing group on the aromatic ring, have been found to provide especially good shelf stability. Good shelf stability has also been obtained using amines that are solids at room temperature.

Preferred amide donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide and tripiperidinophosphine oxide.

The present invention features a photoinitiator for a cationically polymerizable adhesive composition. In one embodiment, the system includes an onium salt such as an iodonium salt or a sulphonium salt. The iodonium salt for the photoinitiator system may be, for example, diaryliodonium hexafluorophosphate, diaryliodonium hexafluoroantimonate, diaryliodonium tetrakis(pentafluorophenyl)borate, 4-octyloxyphenyl phenyliodonium hexafluoroantimonate, 4-(2-hydroxytetradecyloxyphenyl)phenyliodonium hexafluoroantimonate, 4-(1-methylethyl)phenyl 4-methylphenyliodonium tetrakis(pentafluorophenyl)borate, or combinations thereof.

The individual components of the photoinitiator system are provided in photopolymerizingly effective amounts (i.e., amounts effective to yield a photoinitiator system that can initiate photopolymerization of the cationically polymerizable resin or, more preferably, that can accelerate the rate of polymerization). Preferably, the visible light sensitizer is present at about 0.05-5.0 weight percent based on the reactive component of the adhesive composition, more preferably, at about 0.10-2.0 weight percent. The onium salt is preferably present at about 0.05-10.0 weight percent based on the reactive component of the adhesive composition, more preferably at about 0.10-5.0 weight percent, and most preferably at about 0.50-3.0 weight percent. The optional electron donor compound or compounds (i.e. anthracenes) are preferably present at about 0.01-5.0 weight percent, based on the reactive component of the adhesive composition, more preferably about 0.05-1.0 weight percent, and most preferably about 0.05-0.50 weight percent when they are present in the adhesive composition.

Particularly useful anthracene-based compounds include: 2-ethyl-9,10-dimethoxyanthracene (EDMOA), 9,10-dimethylanthracene, 9,10-diethoxyanthracene, 1,4-dimethoxyanthracene, 9-methylanthracene, 2-ethylanthracene, 2-tert-butylanthracene, 2,6-di-tert-butylanthracene, 9,10-diphenyl-2,6-di-tert-butylanthracene, and combinations thereof. All of these compounds with the exception of the 2,6-di-tert-butylanthracene derivatives are available from Sigma-Aldrich, St. Louis, Mo.

Additional optional materials can be can be added to the adhesive composition such as rheological modifiers, and a colorant that signals when there has been sufficient exposure to a light source to cure the adhesive. For example, the adhesive can change from transparent to red when it is cured, using methods described in, e.g., U.S. Pat. No. 6,331,080, incorporated by reference herein in its entirety. As such, a variety of color shifts after curing light exposure can be utilized, for example from pink to colorless, light blue to blue tint, pink to orange, violet to colorless, and hot pink to orange. This additional material could be used as a simple aid for the craft to confirm adequate exposure and adhesive cure.

The uncured adhesive should be viscous enough not to migrate during storage and handling of optical components having the uncured adhesive preloaded in the factory.

The cured adhesive composition can have a Tg at or over 50° C. after blue light exposure, a refractive index between about 1.44 to about 1.46, preferably about 1.45 at 1330 nm and a do/dT less than $-20\ E^{-5}/°$ C., preferably less than less than $-15\ E^{-5}/°$ C., and more preferably less than $-10\ E^{-5}/°$ C. In an alternative aspect, the Tg can be less than 50° C.

Thus, a simple optical splice assembly can be utilized for a wide variety of products starting with single and multi-fiber splices. The ceramic net shape molding, enables use of thermally stable optically transparent silica ceramic, without expensive grinding operations.

The embodiments herein can provide long term reliability with lightly stressed components. Low optical loss, stable optical performance over outside plant temperature conditions of −40° C. to +75° C., as specified in Telcordia GR-765-CORE "Single Fiber Single Mode Optical Splices and Splicing Systems". The silica substrate CTE can be matched to the silica optical fibers, around $1\ E^{-6}/°$ C. Any CTE mismatch between the fiber ends would cause the gap between the fiber tips to change, which would stress the joint adhesive. No optical index matching gels are required. By matching the CTE of the alignment mechanism plate(s) to the optical fibers, the dependency on optical coupling gels to fill the dynamic gap is eliminated. The optical adhesive has ⅓ do/dT as compared to conventional optical coupling gels. This adhesive has the potential to reduce the return loss or reflection at the interface, when the adhesive index of refraction is matched to the silica fibers. Moreover, no expensive or delicate optical fusion machine is required. Such fusion machines require a source of electrical power, time to heat to shrink the protective sleeve, and are precision instruments which are easily damaged if dropped.

The various embodiments described herein allow for straightforward craft feedback of splice or holding performance, using one of several methods, such as (1) viewing the splice joint through the transparent substrate and adhesive to confirm contact and alignment; (2) viewing the optical fiber core profile and gap between the two fibers and estimating loss similar to the approach used by fusion instruments; (3) using this transparent material "window" to extract light and assess splice joint loss, wherein if the splice is installed in a live link of known transmission power, the leaked light may be detected and used to assess splice performance; and (4) using an optical source to inject test light at a distant connector interface, and leaked light at the splice can be detected.

EMBODIMENTS

Various embodiments are provided.

Embodiment 1A is an optical network, comprising a fiber distribution cable and a terminal assembly, wherein the subscriber terminal receives a plurality of optical fibers from the fiber distribution cable and distributes one or more individual fibers to one or more single fiber bare-fiber holders mounted to the subscriber terminal that hold and protect each single fiber prepared and configured for splicing via a splicing element, wherein the splicing element includes an alignment mechanism having a base plate and a clamp plate, at least one of the base plate and clamp plate being formed from a silica material, and at least one of the base plate and clamp plate having an alignment groove configured to receive the first and second optical fibers in an end-to-end manner, and an optical adhesive disposed in at least a portion of the alignment groove, wherein the optical adhesive is curable via actinic radiation.

Embodiment 2A is the optical network of embodiment 1A comprising a distributed split network.

Embodiment 3A is the optical network of any preceding embodiment further comprising an optical indexing circuit disposed in the terminal assembly.

Embodiment 4A is the optical network any preceding embodiment, wherein the fiber distribution cable comprises a multi-fiber stub cable.

Embodiment 5A is the optical network of embodiment comprising a branch tap.

Embodiment 6A is an optical network for inside a multi-dwelling unit comprising the optical network of embodiment 1A.

Embodiment 7A is the optical network of any preceding embodiment, wherein the optical adhesive is blue light curable.

Embodiment 8A is the optical network of any preceding embodiment, wherein the optical adhesive comprises an adhesive composition containing non-aggregated, surface-modified silica nano-particles dispersed in an epoxy resin.

Embodiment 9A is the optical network of any preceding embodiment, wherein the optical adhesive changes color from an uncured state to a cured state.

Embodiment 10A is the optical network of any preceding embodiment, wherein the base plate includes the alignment groove formed on a major surface therein Embodiment 11A is the optical network of any preceding embodiment, further comprising a clip configured to receive the base plate and clamp plate therein and impart a pressing force on the base plate and clamp plate.

Embodiment 12A is the optical network of any preceding embodiment, wherein at least one of the base plate and clamp plate is substantially transparent.

Embodiment 13A is the optical network of any preceding embodiment, wherein the base plate is substantially rectangular in shape.

Embodiment 14A is the optical network of any preceding embodiment, wherein the base plate further comprises partial funnel shaped entrance openings at both ends of the alignment groove, the partial funnel shaped entrance openings being wider than the alignment groove.

Embodiment 15A is the optical network of any preceding embodiment, wherein the clamping plate comprises an alignment groove formed in a major surface therein.

Embodiment 16A is the optical network of any preceding embodiment, wherein the base plate further comprises a plurality of pad structures formed on a major surface thereof, the pads configured to space the base plate and clamp plate from each other to create clearance for the insertion of the first and second optical fibers.

Embodiment 17A is the optical network of any preceding embodiment, wherein the alignment mechanism is substantially cylindrical in shape.

Embodiment 18A is the optical network of any preceding embodiment, wherein the base plate includes a plurality of alignment grooves formed on a major surface therein.

Embodiment 19A is the optical network of any preceding embodiment, wherein the plurality of alignment grooves are parallel and spaced apart from each other on the major surface.

Embodiment 20A is the optical network of any preceding embodiment, wherein the cured fiber splice experiences less than 0.05 dB insertion loss.

Embodiment 21A is the optical network of any preceding embodiment, wherein the cured fiber splice experiences less than 3 dB of return loss variation when temperature cycled from −40° C. to +75° C.

Embodiment 22A is the optical network of any preceding embodiment, wherein the cured fiber splice experiences a pullout strength of greater than 1.5 lbs-F.

Embodiment 23A is the optical network of any preceding embodiment, wherein the silica material comprises a sol-based cast net shaped sintered silica material.

Embodiment 24A is the optical network of any preceding embodiment, wherein the silica material comprises a ceramic injection molded material.

Embodiment 25A is the optical network of any preceding embodiment, further comprising a second terminal assembly.

Embodiment 26A is the optical network of embodiment 25A, wherein the terminal assembly is linked to the second terminal assembly via a fiber distribution cable.

Embodiment 27A is the optical network of embodiment 25A, wherein the terminal assembly is directly coupled to the second terminal assembly at a single location.

Experiments

Figure 6:
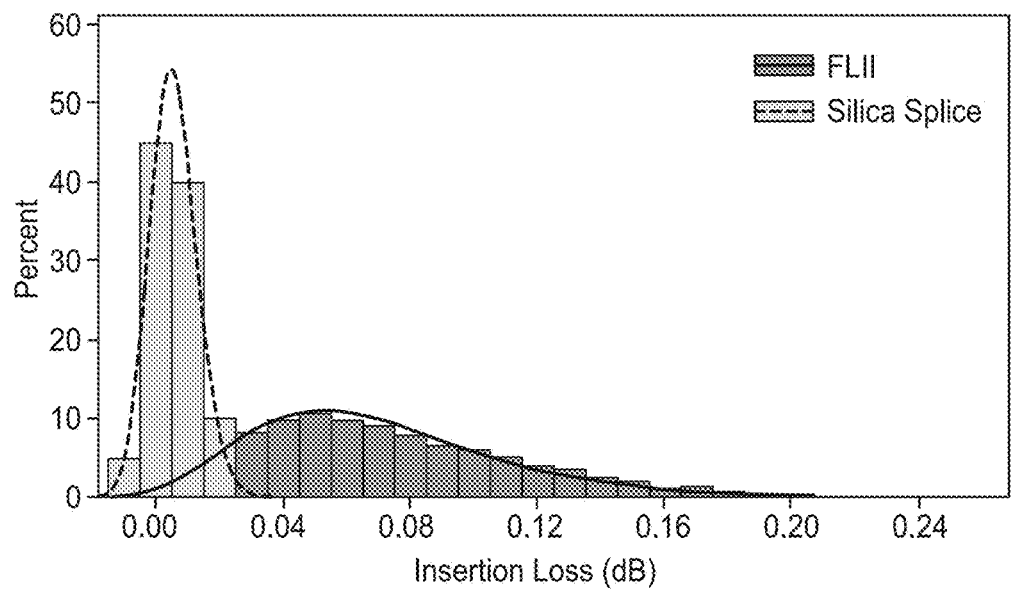
FIG. 6 is a plot showing experimental splice loss performance.

A first experiment was performed, where a population of 20 splices were built using a silica substrate (having a structure and composition similar to that described above) and a visible light cure adhesive having a composition similar to those described above. FIG. 6 shows the splice loss performance compared to conventional mechanical splice (FL II) utilizing a metal splice element and an index matching gel. The insertion loss for the experimental splice elements was less than about 0.03 dB.

Figure 7:
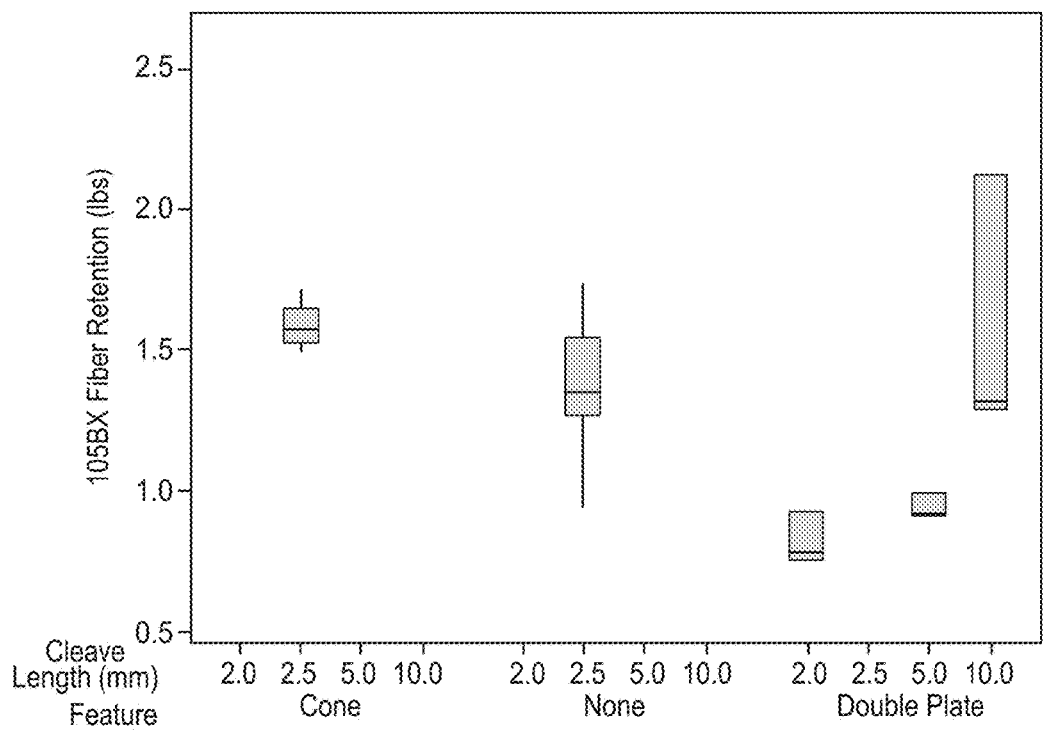
FIG. 7 is a plot showing results from an experimental pullout strength measurement.

In another experiment, adhesive fiber retention or pullout strength was measured with a light curable optical adhesive, similar to those described above, with a variety of clamping plate loads, and fiber lead-in shapes. Using a lead-in cone with 2.5 lbs of plate to plate clamping force, resulted in a tightly distributed pullout strength of greater than 1.5 Lb-F, as shown in FIG. 7.

In another experiment, a temperature cycling measurement was performed in accordance with a Telcordia GR-765 temperature cycling test (−40° C. to +75° C.) using a fused silica substrate and a light curable optical adhesive, similar to those described above. The results showed that even though the adhesive is a more brittle material as compared to a conventional index matching gel, the adhesive will not crack over the temperature range, as the thermally stable substrate does not experience substantial expansion and contraction as it is temperature cycled.

In another experiment, splice element return loss was measured over a temperature cycle (−40° C. to +75° C.) using a silica substrate similar to the materials described above and a light curable optical adhesive, similar to those described above. The splice element showed a return loss variation of about 1.3 dB.

Various modifications, equivalent processes, as well as numerous structures to which the present invention may be applicable will be readily apparent to those of skill in the art to which the present invention is directed upon review of the present specification.

We claim:

1. An optical network, comprising:
a fiber distribution cable; and
a terminal assembly, wherein the terminal assembly receives a plurality of optical fibers from the fiber distribution cable and distributes one or more individual fibers to one or more single fiber bare-fiber holders mounted to the terminal assembly that hold and protect each single fiber prepared and configured for splicing via a splicing element, wherein the splicing element includes an alignment mechanism having a base plate and a clamp plate, the base plate having a plurality of pad structures formed on a major surface thereof, the pads configured to space the base plate and clamp plate from each other to create clearance for the insertion of first and second optical fibers, at least one of the base plate and clamp plate being formed from a silica material, and at least one of the base plate and clamp plate having an alignment groove configured to receive the first and second optical fibers in an end-to-end manner, and an optical adhesive disposed in at least a portion of the alignment groove, wherein the optical adhesive is curable via actinic radiation.

2. The optical network of claim 1 comprising a distributed split network.

3. The distributed split network of claim 2 further comprising an optical indexing circuit disposed in the terminal assembly.

4. The optical network of claim 1, wherein the fiber distribution cable comprises a multi-fiber stub cable.

5. The optical network of claim 1 comprising a branch tap.

6. An optical network for inside a multi-dwelling unit comprising the optical network of claim 1.

7. The optical network of claim 1, wherein the optical adhesive is blue light curable.

8. The optical network of claim 1, wherein the optical adhesive comprises an adhesive composition containing non-aggregated, surface-modified silica nano-particles dispersed in an epoxy resin.

9. The optical network of claim 1, wherein the optical adhesive changes color from an uncured state to a cured state.

10. The optical network of claim 1, wherein the base plate includes the alignment groove formed on a major surface therein.

11. The optical network of claim 1, further comprising a clip configured to receive the base plate and clamp plate therein and impart a pressing force on the base plate and clamp plate.

12. The optical network of claim 1, wherein at least one of the base plate and clamp plate is substantially transparent.

13. The optical network of claim 1, wherein the clamp plate comprises a flexible material.

14. The optical network of claim 1, wherein the base plate further comprises partial funnel shaped entrance openings at both ends of the alignment groove, the partial funnel shaped entrance openings being wider than the alignment groove.

15. The optical network of claim 1, wherein the clamp plate comprises an alignment groove formed in a major surface therein.

16. The optical network of claim 1, wherein the base plate includes a plurality of alignment grooves formed on a major surface therein.

17. The optical network of claim 1, wherein the silica material comprises a sol-based cast net shaped sintered silica material.

18. The optical network of claim 1, further comprising a second terminal assembly.

19. The optical network of claim 18, wherein the terminal assembly is linked to the second terminal assembly via a fiber distribution cable.

20. An optical network, comprising:
a fiber distribution cable; and
a terminal assembly, wherein the terminal assembly receives a plurality of optical fibers from the fiber distribution cable and distributes one or more individual fibers to one or more single fiber bare-fiber holders mounted to the terminal assembly that hold and protect each single fiber prepared and configured for splicing via a splicing element, wherein the splicing element includes an alignment mechanism having a base plate and a clamp plate, at least one of the base plate and clamp plate being formed from a silica material, and at least one of the base plate and clamp plate having an alignment groove configured to receive the first and second optical fibers in an end-to-end manner, and an optical adhesive disposed in at least a portion of the alignment groove, wherein the optical adhesive comprises an adhesive composition containing non-aggregated, surface-modified silica nano-particles dispersed in an epoxy resin.

21. An optical network, comprising:
a fiber distribution cable; and
a terminal assembly, wherein the terminal assembly receives a plurality of optical fibers from the fiber distribution cable and distributes one or more individual fibers to one or more single fiber bare-fiber holders mounted to the terminal assembly that hold and protect each single fiber prepared and configured for splicing via a splicing element, wherein the splicing element includes an alignment mechanism having a base plate and a clamp plate, at least one of the base plate and clamp plate being formed from a sol-based cast net shaped sintered silica material, and at least one of the base plate and clamp plate having an alignment groove configured to receive the first and second optical fibers in an end-to-end manner, and an optical adhesive disposed in at least a portion of the alignment groove, wherein the optical adhesive is curable via actinic radiation.

* * * * *